United States Patent
James et al.

(10) Patent No.: US 10,464,797 B2
(45) Date of Patent: Nov. 5, 2019

(54) POST-MIX BEVERAGE SYSTEM

(71) Applicant: PepsiCo, Inc., Purchase, NY (US)

(72) Inventors: Nikia James, Stamford, CT (US);
Andrew June Ro, Ridgefield, NJ (US);
Bruno Telesca, Hawthorne, NY (US);
Brent William Lindberg, St. Charles, IL (US); Jenna Walsh, Batavia, IL (US)

(73) Assignee: PepsiCo, Inc., Purchase, NY (US)

( * ) Notice: Subject to any disclaimer, the term of this patent is extended or adjusted under 35 U.S.C. 154(b) by 146 days.

(21) Appl. No.: 14/997,044

(22) Filed: Jan. 15, 2016

(65) Prior Publication Data

US 2017/0203947 A1  Jul. 20, 2017

(51) Int. Cl.
*B67D 1/00* (2006.01)
*B67D 1/08* (2006.01)
(Continued)

(52) U.S. Cl.
CPC .......... *B67D 1/0078* (2013.01); *A47J 31/407* (2013.01); *B65D 51/2821* (2013.01);
(Continued)

(58) Field of Classification Search
CPC .. B67D 1/0078; B67D 1/0021; B67D 1/0809; B67D 1/001; B67D 1/0016;
(Continued)

(56) References Cited

U.S. PATENT DOCUMENTS

| 2,073,273 A | 3/1937 | Korn et al. |
| 2,451,195 A | 10/1948 | Brown |

(Continued)

FOREIGN PATENT DOCUMENTS

| AT | 395301 B | 11/1992 |
| CN | 201334159 Y | 10/2009 |

(Continued)

OTHER PUBLICATIONS

International Search Report and Written Opinion of the International Searching Authority, issued in International Application No. PCT/US2017/012694, 15 pages.

*Primary Examiner* — Paul R Durand
*Assistant Examiner* — Andrew P Bainbridge
(74) *Attorney, Agent, or Firm* — Sterne, Kessler, Goldstein & Fox P.L.L.C.

(57) ABSTRACT

A beverage dispensing system comprises a container, an attachment mechanism, and a cartridge. The container may hold a mixing solution or liquid, such as water, to be mixed with the contents of the cartridge. The attachment mechanism is generally located within the container. The attachment mechanism may comprise an engagement assembly, a piercing portion, and a valve assembly. The engagement assembly may generally receive the cartridge within the attachment mechanism. The piercing portion may generally pierce the cartridge, thereby releasing the contents of the cartridge into the container. The valve assembly may generally open upon engagement of the cartridge with the attachment mechanism. The cartridge generally engages with the attachment mechanism to open the cartridge to be dispensed into the container, thereby combining the contents of the cartridge with the liquid within the container to create a drinkable beverage.

25 Claims, 41 Drawing Sheets

(51) Int. Cl.
*A47J 31/40* (2006.01)
*B67D 3/00* (2006.01)
*B65D 81/32* (2006.01)
*B65D 85/00* (2006.01)
*B65D 51/28* (2006.01)
*B67B 7/00* (2006.01)

(52) U.S. Cl.
CPC ......... *B65D 81/3222* (2013.01); *B65D 85/00* (2013.01); *B67B 7/26* (2013.01); *B67D 1/001* (2013.01); *B67D 1/0016* (2013.01); *B67D 1/0021* (2013.01); *B67D 1/0804* (2013.01); *B67D 1/0805* (2013.01); *B67D 1/0807* (2013.01); *B67D 1/0809* (2013.01); *B67D 3/0012* (2013.01); *B67D 3/0019* (2013.01); *B67D 3/0067* (2013.01); *B67D 2001/0093* (2013.01); *B67D 2001/0812* (2013.01); *B67D 2001/0821* (2013.01); *B67D 2210/00036* (2013.01)

(58) Field of Classification Search
CPC ...... B67D 1/0804–0805; B67D 1/0807; B67D 1/0892; B67D 3/0019; B67D 3/0012; B67D 3/0067; B67D 2001/0093; B67D 2001/0812; B67D 1/0067; A47J 31/407; B67B 7/26; B65D 51/2821; B65D 81/3222; B65D 85/00
USPC ... 222/80–91, 325–327, 145.1, 145.5–145.6; 206/219–222; 220/521; 426/112, 115; 604/410, 416; 100/211–213
See application file for complete search history.

(56) References Cited

U.S. PATENT DOCUMENTS

| | | | |
|---|---|---|---|
| 2,778,739 A | 1/1957 | Rodth | |
| 2,899,886 A | 8/1959 | Rodth | |
| 2,968,560 A | 1/1961 | Goros | |
| 3,030,874 A | 4/1962 | Fiori | |
| 3,083,101 A | 3/1963 | Noury | |
| 3,264,975 A * | 8/1966 | Williams | A47J 19/022 100/211 |
| 3,295,998 A | 1/1967 | Goros | |
| 3,403,617 A | 10/1968 | Lampe | |
| 3,561,349 A | 2/1971 | Endo et al. | |
| 3,790,029 A | 2/1974 | Ward | |
| 4,136,202 A | 1/1979 | Favre | |
| 4,220,259 A * | 9/1980 | Lagneaux | A47J 31/407 222/103 |
| 4,324,338 A * | 4/1982 | Beall | A47G 19/2205 206/217 |
| 4,391,309 A | 7/1983 | Steiner | |
| 4,471,689 A * | 9/1984 | Piana | B65D 85/8043 422/282 |
| 4,759,472 A | 7/1988 | Strenger | |
| 4,808,346 A | 2/1989 | Strenger | |
| 4,846,052 A | 7/1989 | Favre et al. | |
| 4,867,993 A | 9/1989 | Nordskog | |
| 4,886,674 A | 12/1989 | Seward et al. | |
| 4,915,261 A | 4/1990 | Strenger | |
| 5,008,013 A | 4/1991 | Favre et al. | |
| 5,011,700 A | 4/1991 | Gustafson et al. | |
| 5,083,677 A | 1/1992 | Bailey et al. | |
| 5,172,831 A | 2/1992 | Burrows | |
| 5,197,374 A | 3/1993 | Fond | |
| 5,220,259 A | 6/1993 | Wener et al. | |
| 5,242,702 A | 9/1993 | Fond | |
| 5,246,142 A | 9/1993 | DiPalma et al. | |
| 5,277,103 A | 1/1994 | Cox | |
| 5,323,832 A | 6/1994 | Burrows | |
| 5,325,765 A | 7/1994 | Sylvan et al. | |
| 5,327,815 A | 7/1994 | Fond et al. | |
| 5,343,799 A | 9/1994 | Fond | |
| 5,347,916 A | 9/1994 | Fond et al. | |
| 5,398,595 A | 3/1995 | Fond et al. | |
| 5,398,596 A | 3/1995 | Fond | |
| 5,402,707 A | 4/1995 | Fond et al. | |
| 5,472,719 A | 12/1995 | Favre | |
| 5,649,472 A | 7/1997 | Fond et al. | |
| 5,656,311 A | 8/1997 | Fond | |
| 5,656,316 A | 8/1997 | Fond et al. | |
| 5,897,899 A | 4/1999 | Fond | |
| 5,927,549 A | 7/1999 | Wood | |
| 5,948,455 A | 9/1999 | Schaeffer et al. | |
| 5,980,959 A | 11/1999 | Frutin | |
| 6,003,728 A * | 12/1999 | Elliott | B65D 47/0804 206/219 |
| 6,025,000 A | 2/2000 | Fond et al. | |
| 6,026,732 A | 2/2000 | Kollep et al. | |
| 6,068,871 A | 5/2000 | Fond et al. | |
| 6,079,315 A | 6/2000 | Beaulieu et al. | |
| 6,109,168 A | 8/2000 | Illy et al. | |
| 6,117,471 A | 9/2000 | King | |
| 6,161,819 A | 12/2000 | Edwards | |
| 6,165,523 A | 12/2000 | Story | |
| 6,182,554 B1 | 2/2001 | Beaulieu et al. | |
| 6,240,832 B1 | 6/2001 | Schmed et al. | |
| 6,245,371 B1 | 6/2001 | Gutwein et al. | |
| 6,305,576 B1 | 10/2001 | Leoncavallo | |
| 6,358,545 B1 | 3/2002 | Chandler et al. | |
| 6,372,270 B1 * | 4/2002 | Denny | A47G 19/22 206/219 |
| 6,386,392 B1 | 5/2002 | Argentieri et al. | |
| 6,405,637 B1 | 6/2002 | Cai | |
| 6,606,938 B2 | 8/2003 | Taylor | |
| 6,607,762 B2 | 8/2003 | Lazaris et al. | |
| 6,619,188 B1 | 9/2003 | Meador | |
| 6,645,537 B2 | 11/2003 | Sweeney et al. | |
| 6,655,260 B2 | 12/2003 | Lazaris et al. | |
| 6,740,345 B2 | 5/2004 | Cai | |
| 6,758,130 B2 | 7/2004 | Sargent et al. | |
| 6,758,372 B2 | 7/2004 | Studer et al. | |
| 6,777,007 B2 | 8/2004 | Cai | |
| 6,805,041 B2 | 10/2004 | Colston et al. | |
| 6,810,788 B2 | 11/2004 | Hale | |
| 6,849,285 B2 | 2/2005 | Masek et al. | |
| 6,869,627 B2 | 3/2005 | Perkovic et al. | |
| D506,926 S | 7/2005 | Halliday et al. | |
| 6,948,420 B2 | 9/2005 | Kirschner et al. | |
| 6,951,275 B2 | 10/2005 | Serra Galdos | |
| 6,966,251 B2 | 11/2005 | Yoakim | |
| 6,971,304 B1 | 12/2005 | Lin | |
| 6,976,578 B1 * | 12/2005 | Kenihan | B65D 51/2835 206/219 |
| 6,994,015 B2 | 2/2006 | Bruinsma | |
| 6,997,103 B2 | 2/2006 | Shaw et al. | |
| 7,028,604 B2 | 4/2006 | Cortese | |
| 7,032,745 B2 | 4/2006 | Saulle | |
| 7,032,818 B2 | 4/2006 | Thomas et al. | |
| 7,059,239 B2 | 6/2006 | Balkan | |
| 7,077,053 B2 | 7/2006 | Kraan | |
| 7,097,074 B2 | 8/2006 | Halliday et al. | |
| 7,100,496 B2 | 9/2006 | Majer Doglioni | |
| 7,131,369 B2 | 11/2006 | Gantt et al. | |
| 7,153,530 B2 | 12/2006 | Masek et al. | |
| 7,165,488 B2 | 1/2007 | Bragg et al. | |
| 7,210,401 B1 | 5/2007 | Rolfes et al. | |
| 7,213,506 B2 | 5/2007 | Halliday et al. | |
| 7,219,598 B2 | 5/2007 | Halliday et al. | |
| 7,226,628 B2 | 6/2007 | Cai | |
| 7,231,869 B2 | 6/2007 | Halliday et al. | |
| 7,243,597 B2 | 7/2007 | Hu et al. | |
| 7,243,598 B2 | 7/2007 | Halliday et al. | |
| 7,255,039 B2 | 8/2007 | Halliday et al. | |
| 7,258,061 B2 | 8/2007 | Campbell et al. | |
| 7,279,188 B2 | 10/2007 | Arrick et al. | |
| 7,287,461 B2 | 10/2007 | Halliday et al. | |
| 7,308,851 B2 | 12/2007 | Halliday | |
| 7,316,178 B2 | 1/2008 | Halliday et al. | |
| 7,318,372 B2 | 1/2008 | Cooke | |

(56) References Cited

U.S. PATENT DOCUMENTS

| | | | |
|---|---|---|---|
| 7,320,274 B2* | 1/2008 | Castellani | A47J 31/0673 99/289 R |
| 7,322,277 B2 | 1/2008 | Halliday et al. | |
| 7,328,651 B2 | 2/2008 | Halliday et al. | |
| 7,340,990 B2 | 3/2008 | Halliday et al. | |
| D567,021 S | 4/2008 | Bach et al. | |
| 7,350,456 B2 | 4/2008 | Blanc et al. | |
| 7,439,859 B2 | 10/2008 | Humphrey | |
| 7,635,012 B2 | 12/2009 | Johns et al. | |
| 7,992,735 B2 | 8/2011 | Bullard et al. | |
| 8,091,735 B2 | 1/2012 | Girard et al. | |
| 8,113,364 B1 | 2/2012 | Asadi | |
| 8,297,456 B1 | 10/2012 | Anderson | |
| 8,443,993 B1 | 5/2013 | Desselle | |
| 8,541,039 B2* | 9/2013 | Lackey | C02F 1/003 426/394 |
| 8,550,240 B2* | 10/2013 | Marcus | A61J 1/03 206/217 |
| 8,590,700 B2* | 11/2013 | Yang | B65D 51/2871 206/219 |
| 8,590,753 B2* | 11/2013 | Marina | A47J 31/407 222/129 |
| 8,684,231 B2* | 4/2014 | Lane | B65D 47/08 206/219 |
| 8,695,819 B1 | 4/2014 | Anderson | |
| 9,193,517 B2* | 11/2015 | Fontana | B65D 83/00 |
| 9,242,773 B1* | 1/2016 | Anderson | B65D 47/0838 |
| 9,321,570 B2 | 4/2016 | Kim et al. | |
| 9,896,258 B2* | 2/2018 | Lee | B65D 51/2835 |
| 2001/0048957 A1 | 12/2001 | Lazaris et al. | |
| 2001/0052294 A1 | 12/2001 | Schmed et al. | |
| 2002/0015768 A1 | 2/2002 | Masek et al. | |
| 2002/0020659 A1 | 2/2002 | Sweeney et al. | |
| 2002/0023543 A1 | 2/2002 | Schmed et al. | |
| 2002/0048321 A1 | 4/2002 | Katayama | |
| 2002/0048621 A1 | 4/2002 | Boyd et al. | |
| 2002/0076471 A1 | 6/2002 | Olsson | |
| 2002/0078831 A1 | 6/2002 | Cai | |
| 2002/0088807 A1 | 7/2002 | Perkovic et al. | |
| 2002/0090426 A1 | 7/2002 | Denny | |
| 2002/0121198 A1* | 9/2002 | Kollep | A47J 31/3676 99/279 |
| 2002/0129712 A1 | 9/2002 | Westbrook et al. | |
| 2002/0139839 A1 | 10/2002 | Catan | |
| 2002/0144603 A1 | 10/2002 | Taylor | |
| 2002/0144604 A1 | 10/2002 | Winkler et al. | |
| 2002/0148356 A1 | 10/2002 | Lazaris et al. | |
| 2003/0005826 A1 | 1/2003 | Sargent et al. | |
| 2003/0039731 A1* | 2/2003 | Dalton | B65D 85/8043 426/433 |
| 2003/0056655 A1* | 3/2003 | Kollep | A47J 31/369 99/295 |
| 2003/0071806 A1 | 4/2003 | Annand | |
| 2003/0159589 A1 | 8/2003 | Meador | |
| 2003/0222089 A1 | 12/2003 | Hale | |
| 2004/0005384 A1 | 1/2004 | Cai | |
| 2004/0055472 A1 | 3/2004 | Stoner | |
| 2004/0115310 A1* | 6/2004 | Yoakim | B65D 85/8046 426/77 |
| 2004/0173102 A1 | 9/2004 | Halliday et al. | |
| 2004/0177764 A1 | 9/2004 | Halliday et al. | |
| 2004/0177765 A1 | 9/2004 | Halliday | |
| 2004/0180119 A1 | 9/2004 | Halliday et al. | |
| 2004/0180123 A1 | 9/2004 | Halliday et al. | |
| 2004/0182250 A1 | 9/2004 | Halliday et al. | |
| 2004/0182251 A1 | 9/2004 | Halliday et al. | |
| 2004/0187695 A1 | 9/2004 | Halliday et al. | |
| 2004/0187696 A1 | 9/2004 | Halliday et al. | |
| 2004/0188459 A1 | 9/2004 | Halliday et al. | |
| 2004/0191370 A1 | 9/2004 | Halliday et al. | |
| 2004/0191371 A1 | 9/2004 | Halliday et al. | |
| 2004/0191372 A1 | 9/2004 | Halliday et al. | |
| 2004/0197444 A1 | 10/2004 | Halliday et al. | |
| 2004/0206245 A1 | 10/2004 | Halliday et al. | |
| 2004/0208960 A1 | 10/2004 | Marshall | |
| 2004/0211322 A1 | 10/2004 | Halliday et al. | |
| 2004/0211742 A1* | 10/2004 | Deans | B65D 81/3211 215/6 |
| 2004/0250686 A1 | 12/2004 | Hale | |
| 2005/0029287 A1 | 2/2005 | Mobbs | |
| 2005/0034604 A1 | 2/2005 | Halliday et al. | |
| 2005/0103204 A1 | 5/2005 | Halliday et al. | |
| 2005/0150390 A1 | 7/2005 | Schifferle | |
| 2005/0172822 A1 | 8/2005 | Macchi et al. | |
| 2005/0183581 A1 | 8/2005 | Kirschner et al. | |
| 2005/0223904 A1 | 10/2005 | Laigneau et al. | |
| 2005/0266122 A1 | 12/2005 | Franceschi et al. | |
| 2006/0000851 A1 | 1/2006 | Girard et al. | |
| 2006/0065127 A1 | 3/2006 | Dalton et al. | |
| 2006/0071000 A1* | 4/2006 | Weist | B65D 5/748 220/278 |
| 2006/0016347 A1 | 6/2006 | Girard et al. | |
| 2006/0144242 A1 | 7/2006 | Mitchell et al. | |
| 2006/0144244 A1 | 7/2006 | Girard et al. | |
| 2006/0196363 A1 | 9/2006 | Rahn | |
| 2006/0196364 A1 | 9/2006 | Kirschner | |
| 2006/0236871 A1 | 10/2006 | Ternite et al. | |
| 2006/0251771 A1 | 11/2006 | Yokota | |
| 2006/0266222 A1 | 11/2006 | Hammad | |
| 2006/0278093 A1 | 12/2006 | Biderman et al. | |
| 2006/0280841 A1 | 12/2006 | Cai | |
| 2006/0289316 A1 | 12/2006 | Henry | |
| 2007/0012719 A1 | 1/2007 | Holler | |
| 2007/0039479 A1 | 2/2007 | Dalton et al. | |
| 2007/0059672 A1 | 3/2007 | Shaw et al. | |
| 2007/0104837 A1 | 5/2007 | Yoakim et al. | |
| 2007/0144356 A1 | 6/2007 | Rivera | |
| 2007/0144357 A1 | 6/2007 | Rivera | |
| 2007/0157821 A1 | 7/2007 | Panesar et al. | |
| 2007/0158366 A1 | 7/2007 | Van Deer Meer et al. | |
| 2007/0163446 A1 | 7/2007 | Halliday et al. | |
| 2007/0175334 A1 | 8/2007 | Halliday et al. | |
| 2007/0181005 A1 | 8/2007 | Kirschner et al. | |
| 2007/0186784 A1 | 8/2007 | Liverani et al. | |
| 2007/0193891 A1 | 8/2007 | Pottier | |
| 2007/0209524 A1 | 9/2007 | Kim | |
| 2007/0221066 A1 | 9/2007 | Sullivan et al. | |
| 2007/0221069 A1 | 9/2007 | Rahn et al. | |
| 2007/0259074 A1 | 11/2007 | Searchilli et al. | |
| 2007/0288252 A1 | 12/2007 | Weinberg | |
| 2007/0289453 A1 | 12/2007 | Halliday et al. | |
| 2008/0028948 A1 | 2/2008 | Kirschner et al. | |
| 2008/0029541 A1 | 2/2008 | Wallace et al. | |
| 2008/0092747 A1 | 4/2008 | Yoakim et al. | |
| 2008/0115675 A1 | 5/2008 | Suggi Liverani et al. | |
| 2008/0116086 A1 | 5/2008 | Hung | |
| 2008/0121111 A1 | 5/2008 | Paget et al. | |
| 2008/0134901 A1 | 6/2008 | Cortese | |
| 2008/0134902 A1 | 6/2008 | Zimmerman et al. | |
| 2008/0135424 A1 | 6/2008 | Ostrowski | |
| 2008/0148948 A1 | 6/2008 | Evers et al. | |
| 2008/0149669 A1 | 6/2008 | Nicholson et al. | |
| 2008/0156196 A1 | 7/2008 | Doglioni Majer | |
| 2008/0160153 A1 | 7/2008 | Hestekin et al. | |
| 2008/0173705 A1 | 7/2008 | Girard et al. | |
| 2008/0202950 A1* | 8/2008 | Anderson | B65D 51/2842 206/219 |
| 2008/0202951 A1* | 8/2008 | Landolt | B65D 47/241 206/222 |
| 2008/0210408 A1 | 9/2008 | Sterngold et al. | |
| 2008/0230571 A1* | 9/2008 | Sterngold | B65D 77/2036 222/541.4 |
| 2008/0319876 A1 | 12/2008 | Goldburt | |
| 2009/0120815 A1* | 5/2009 | Mitchell | B65D 51/2821 206/222 |
| 2009/0155422 A1 | 6/2009 | Ozanne | |
| 2009/0188884 A1* | 7/2009 | Nelson | A61J 9/008 215/6 |
| 2009/0236303 A1* | 9/2009 | Lizerbram | B65D 47/243 215/227 |
| 2009/0301904 A1* | 12/2009 | Bullard | A61J 9/001 206/221 |

(56) References Cited

U.S. PATENT DOCUMENTS

| | | |
|---|---|---|
| 2010/0025267 A1 | 2/2010 | Brand |
| 2010/0043645 A1 | 2/2010 | Suggi Liverani et al. |
| 2010/0045705 A1 | 2/2010 | Vertegaal et al. |
| 2010/0107890 A1 | 5/2010 | Zanetti |
| 2010/0300913 A1 | 12/2010 | Goldburt |
| 2011/0024311 A1* | 2/2011 | Swinford ............... B65D 1/04 206/221 |
| 2011/0089059 A1* | 4/2011 | Lane .................. B65D 47/08 206/222 |
| 2011/0166910 A1 | 7/2011 | Marina et al. |
| 2012/0040018 A1 | 2/2012 | Thierman et al. |
| 2012/0152771 A1* | 6/2012 | Garside ................ A45F 3/16 206/223 |
| 2012/0223100 A1 | 9/2012 | Simonian et al. |
| 2013/0140198 A1* | 6/2013 | Rohr .............. B65D 51/2828 206/219 |
| 2013/0175236 A1 | 7/2013 | Boukobza et al. |
| 2013/0240564 A1* | 9/2013 | Albaum ........... B65D 47/2031 222/129 |
| 2013/0270144 A1* | 10/2013 | Nowzari ............ B65D 23/14 206/459.5 |
| 2013/0306642 A1 | 11/2013 | Dabah et al. |
| 2014/0224797 A1 | 8/2014 | Maloney et al. |
| 2014/0311929 A1 | 10/2014 | Tickle et al. |
| 2014/0312065 A1 | 10/2014 | Rohr et al. |
| 2014/0326750 A1 | 11/2014 | Marina et al. |
| 2014/0360972 A1 | 12/2014 | Lane et al. |
| 2015/0021214 A1 | 1/2015 | Besic et al. |
| 2015/0136725 A1 | 5/2015 | Boukobza et al. |
| 2015/0174542 A1 | 6/2015 | Lee et al. |
| 2015/0175337 A1 | 6/2015 | Lee |
| 2015/0183560 A1* | 7/2015 | Ginzburg ........... B65D 51/227 426/590 |
| 2015/0203254 A1 | 7/2015 | Lee et al. |
| 2015/0217913 A1 | 8/2015 | Midura |
| 2015/0291341 A1 | 10/2015 | Lott et al. |
| 2015/0336722 A1 | 11/2015 | Brook-Chrispin et al. |
| 2015/0344203 A1* | 12/2015 | Anderson ......... B65D 41/3442 222/83 |
| 2015/0344204 A1* | 12/2015 | Anderson ......... B65D 51/2835 222/83 |
| 2015/0360814 A1 | 12/2015 | Foster |
| 2016/0090222 A1 | 3/2016 | Lee |
| 2016/0096673 A1 | 4/2016 | Leibovitch |
| 2016/0270580 A1* | 9/2016 | Smith .................... A47J 31/18 |
| 2016/0368686 A1* | 12/2016 | Bushida ............... A47J 31/407 |
| 2017/0166346 A1* | 6/2017 | Cornell ................... B65D 1/04 |
| 2017/0232406 A1* | 8/2017 | Waggoner .............. A47J 43/27 222/145.6 |

FOREIGN PATENT DOCUMENTS

| | | |
|---|---|---|
| CN | 101862119 A | 10/2010 |
| EP | 0512470 A1 | 11/1992 |
| EP | 0905049 | 3/1999 |
| EP | 1440904 A1 | 7/2004 |
| EP | 1774878 A1 | 4/2007 |
| EP | 2 947 026 A1 | 11/2015 |
| FR | 2764868 | 12/1998 |
| FR | 2938243 A1 | 11/2008 |
| GB | 2335179 A | 9/1999 |
| JP | HEI 02-231043 | 9/1990 |
| JP | 2002/293332 A | 10/2002 |
| JP | 2004/054609 A | 2/2004 |
| JP | 2006/117305 A | 5/2006 |
| JP | 2006/188286 | 7/2006 |
| JP | 2007/275226 A | 10/2007 |
| JP | 2007/276787 A | 10/2007 |
| JP | 2009/018195 A | 1/2009 |
| JP | 2009/234656 A | 10/2009 |
| JP | 2012/501281 A | 1/2012 |
| KR | 2009-0005510 U | 6/2009 |
| WO | WO 02/28241 A1 | 4/2002 |
| WO | WO 2005/077811 | 8/2005 |
| WO | WO 2006/062418 A1 | 6/2006 |
| WO | WO 2006/128695 | 12/2006 |
| WO | WO 2007/025773 | 3/2007 |
| WO | WO 2007/081210 A1 | 7/2007 |
| WO | WO 2009/032946 A1 | 3/2009 |
| WO | WO 2009/082198 A1 | 7/2009 |
| WO | WO 2010/025392 A2 | 3/2010 |
| WO | WO 2011/089049 A1 | 7/2011 |
| WO | WO 2012/045116 A1 | 4/2012 |
| WO | WO 2012/171529 A1 | 12/2012 |
| WO | WO 2013/119088 A2 | 8/2013 |
| WO | WO 2013/124553 A2 | 8/2013 |
| WO | WO 2014/027830 A2 | 2/2014 |
| WO | WO 2014/115111 A2 | 7/2014 |
| WO | WO 2015/173661 A1 | 11/2015 |
| WO | WO 2015/177167 A1 | 11/2015 |

* cited by examiner

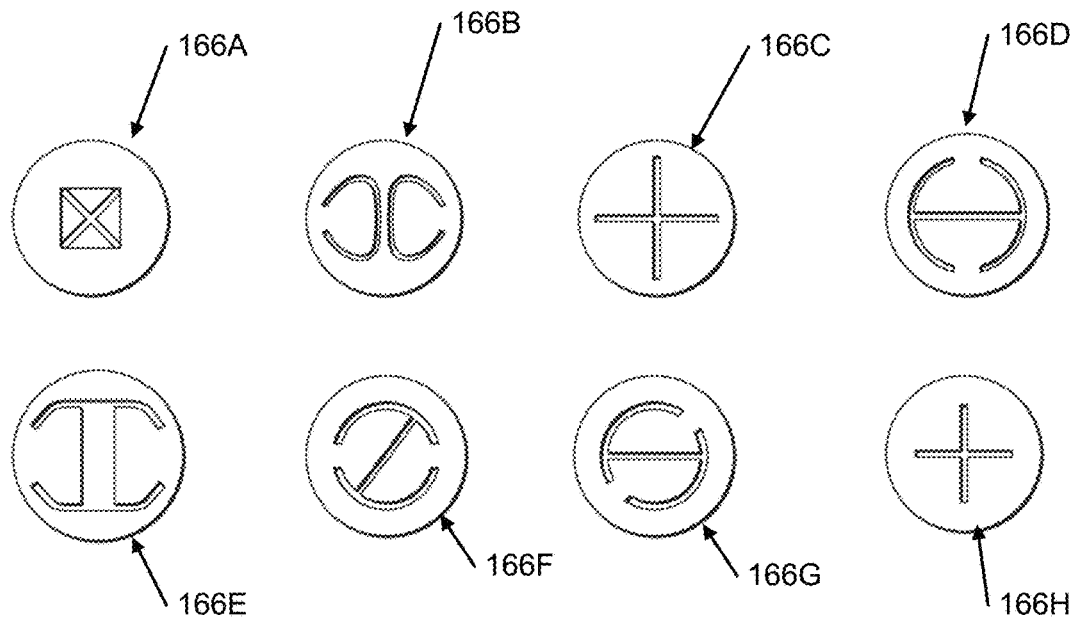
*FIG. 3B*
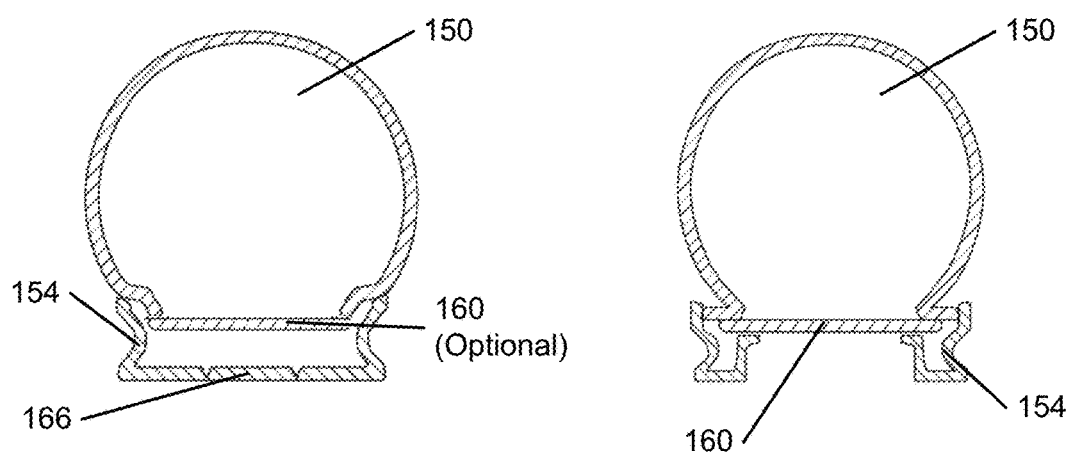
*FIG. 3C*     *FIG. 3D*

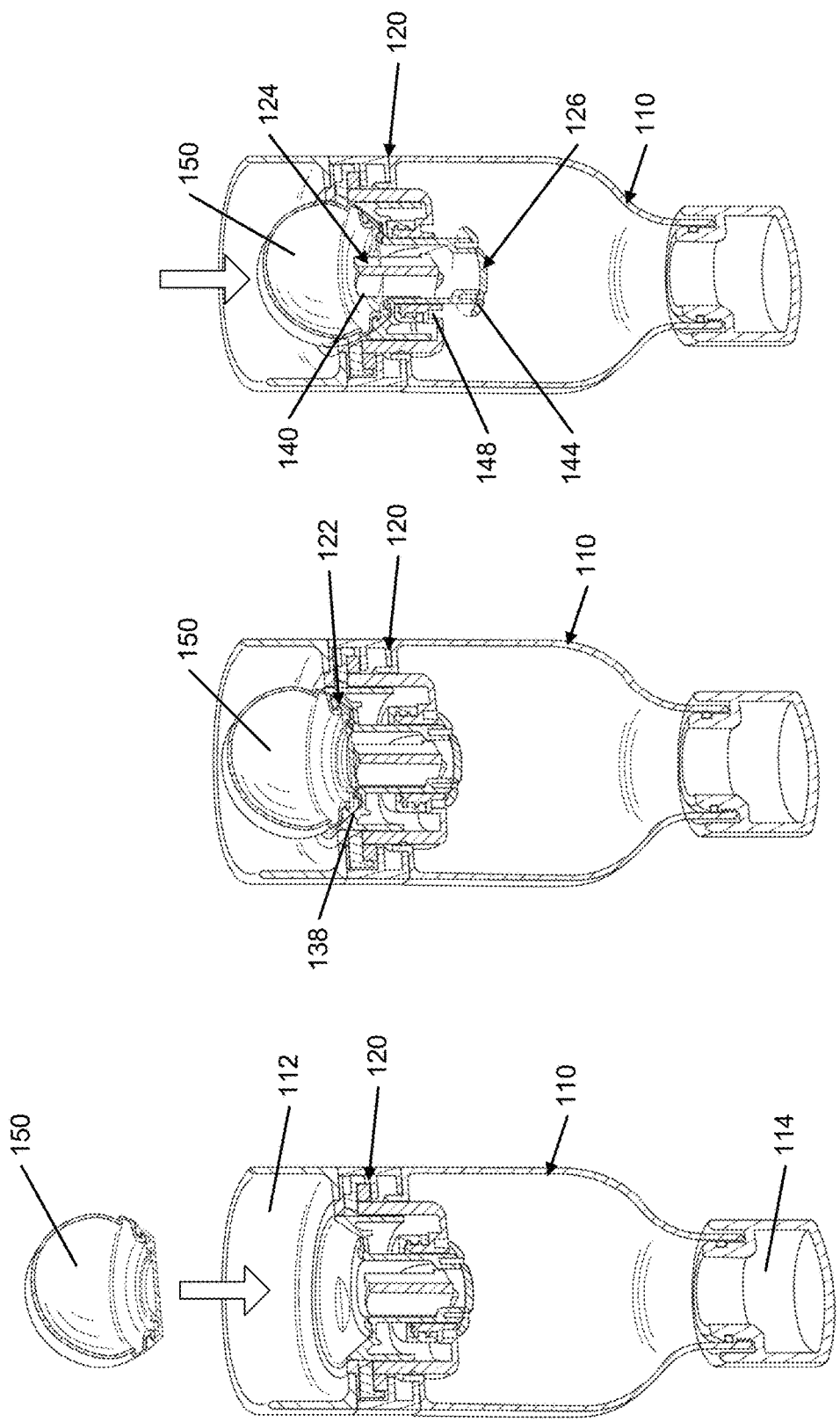

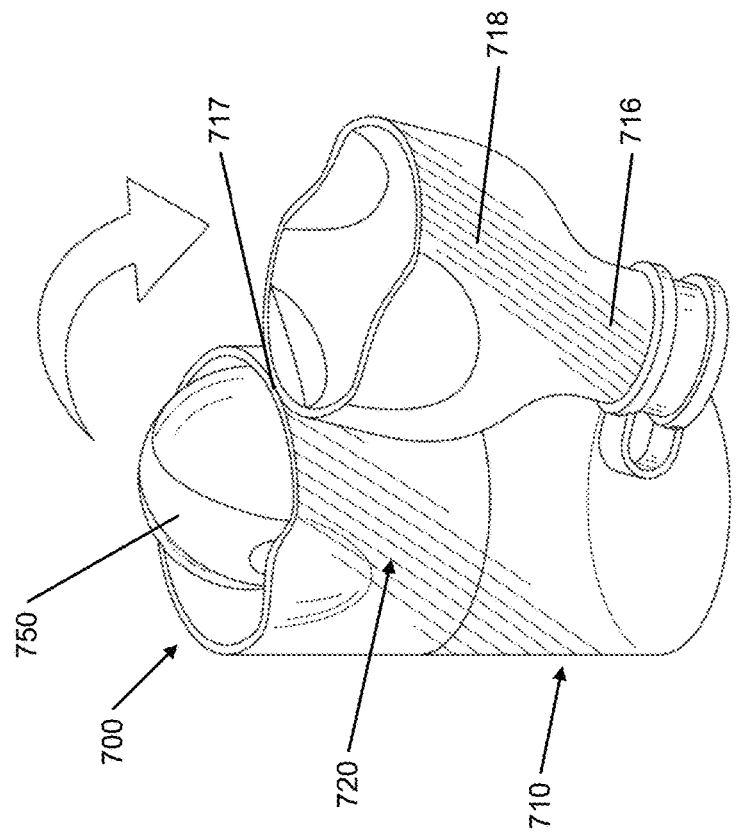
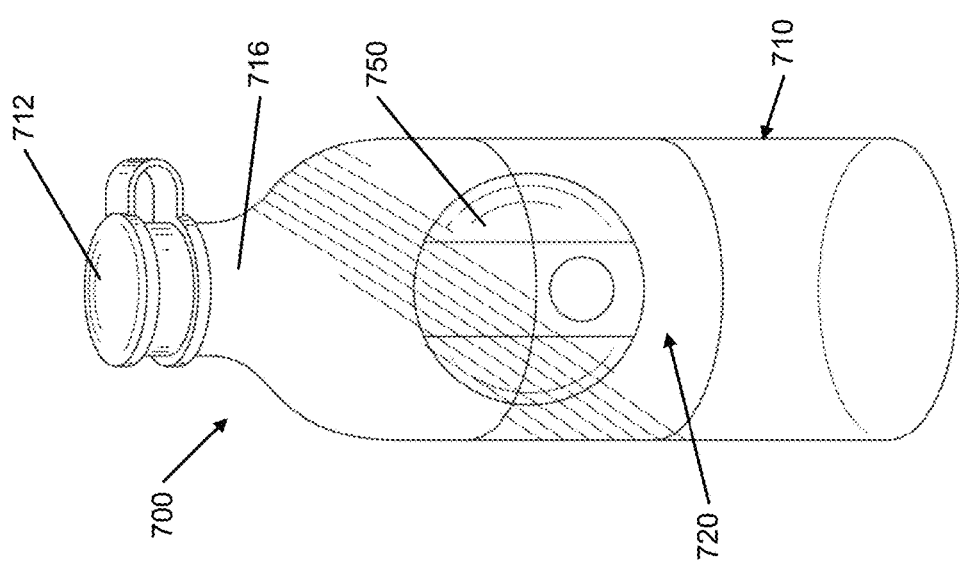
*FIG. 7B*
*FIG. 7A*

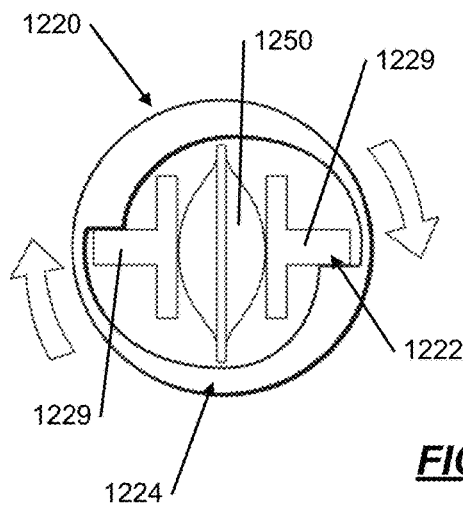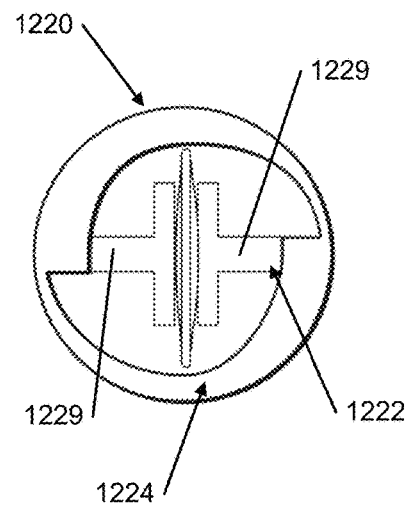
FIG. 12A
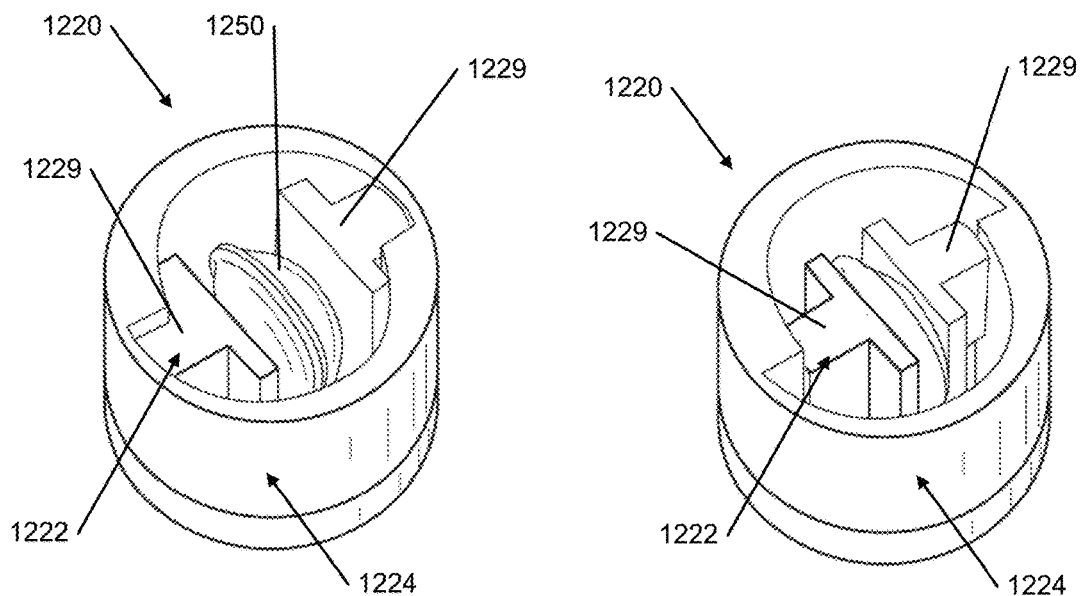
FIG. 12B

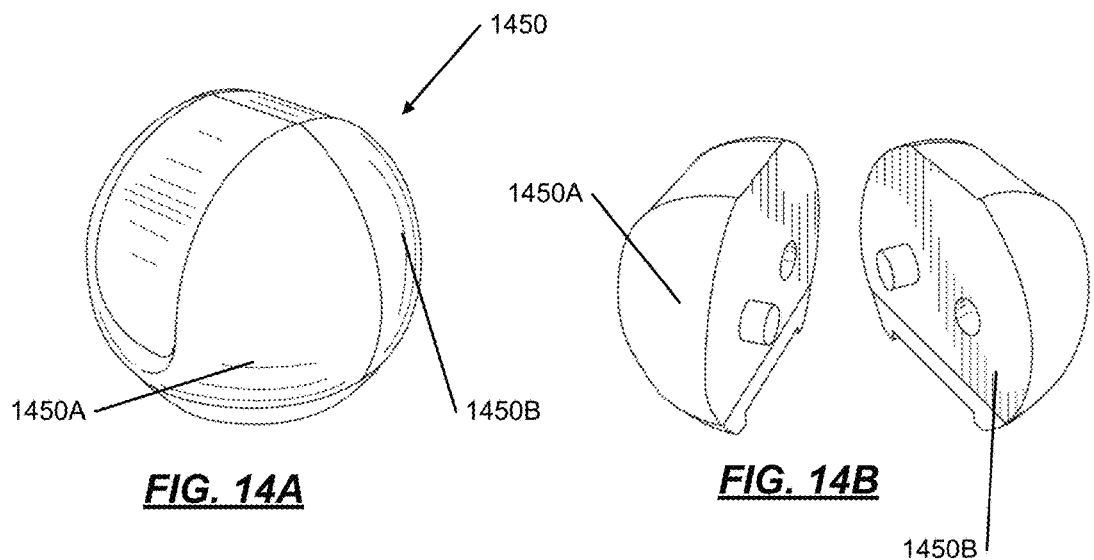
FIG. 14A
FIG. 14B
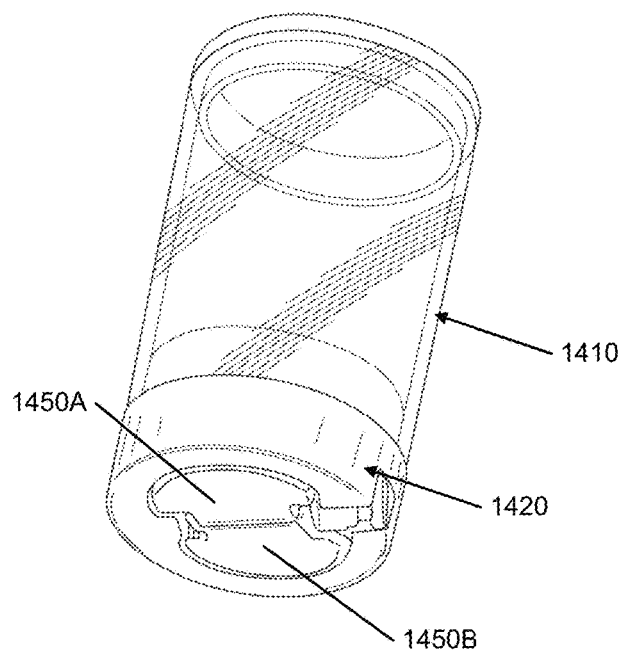
FIG. 14C

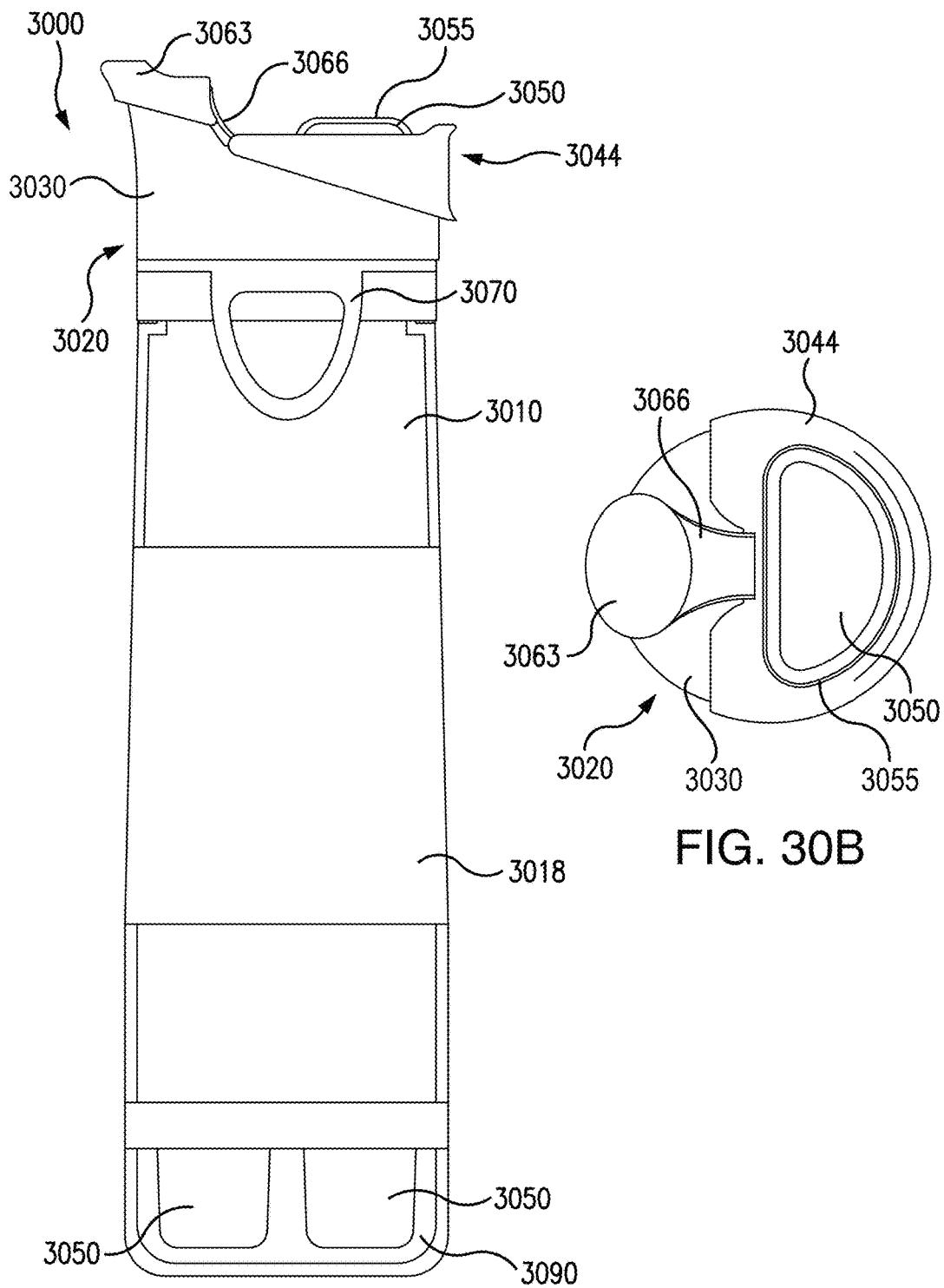

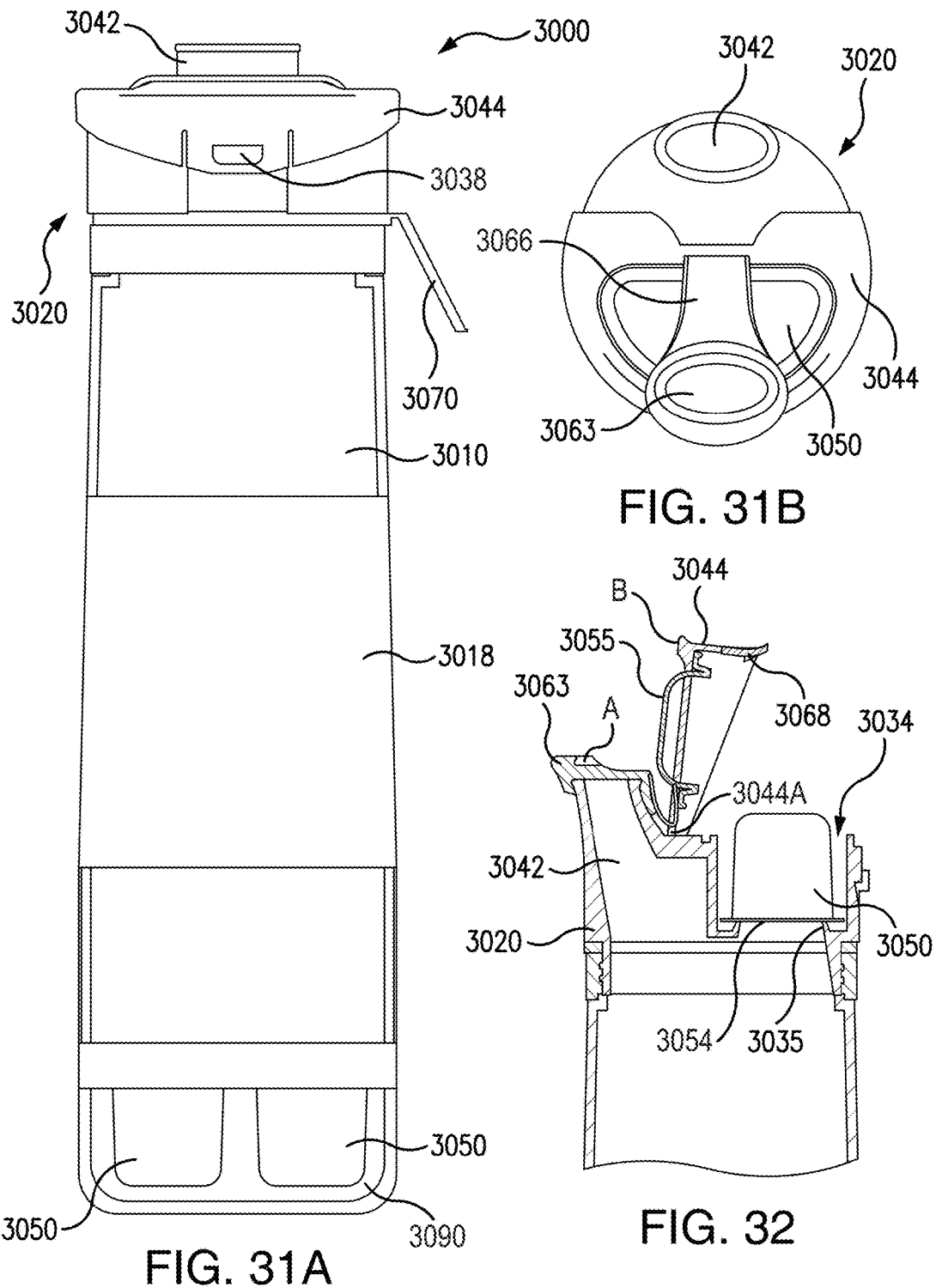

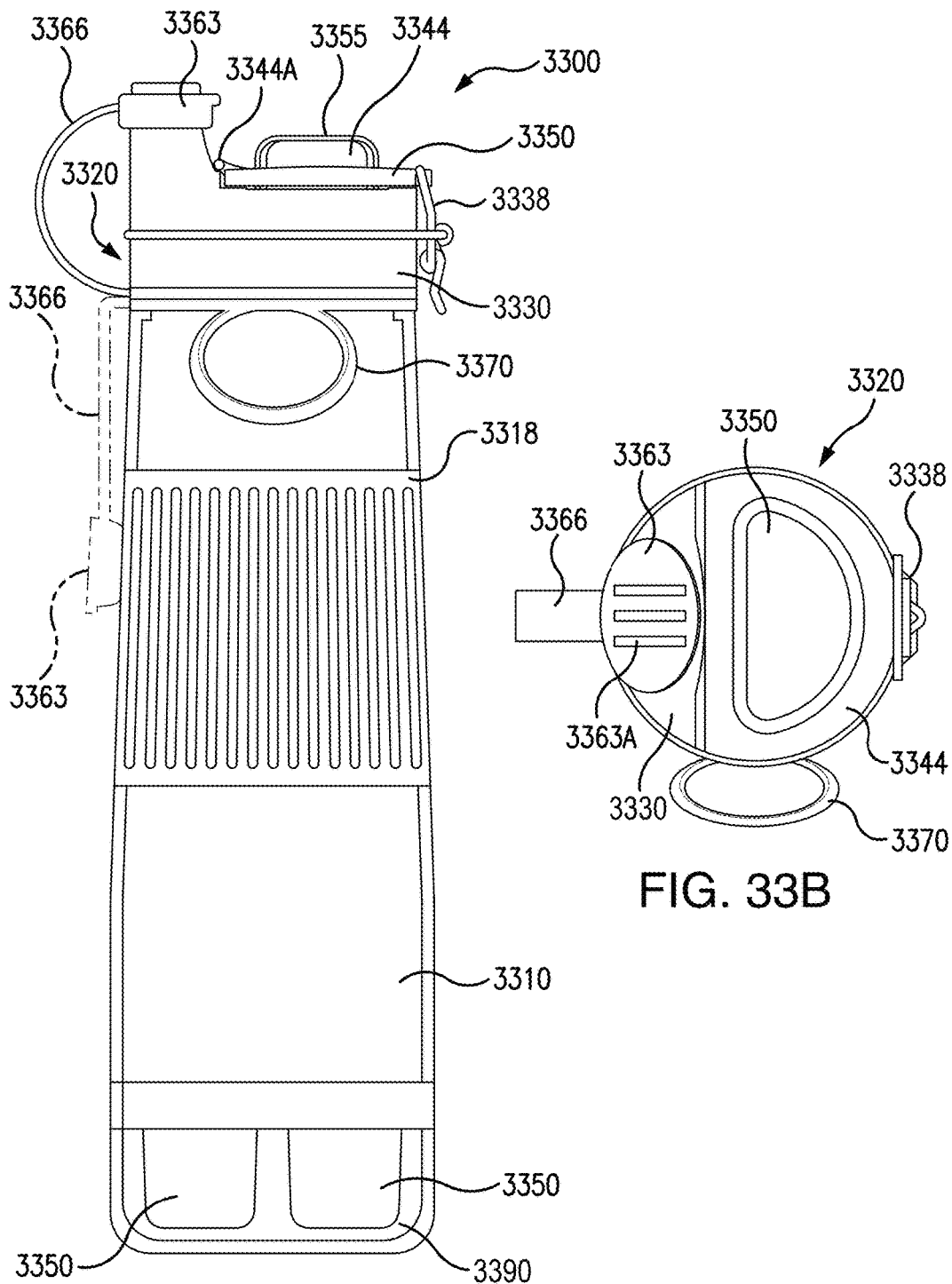

POST-MIX BEVERAGE SYSTEM

FIELD OF THE INVENTION

The present invention relates generally to beverage dispensers and more particularly to post-mix beverage systems.

BACKGROUND

It is known that beverages are marketed, delivered and sold in a variety of different types of containers. The type of container utilized may depend on several factors, including, for example, the consumer for which the beverage is being marketed towards, the distribution channel(s), and/or the quantity of beverage being sold. In this regard, beverages marketed towards consumers are often distributed in plastic bottles. Unfortunately, however, a large portion the plastic bottles are disposed of as waste. While recycling efforts have increased, the bottles are purchased and consumed in areas where recycling is not available or feasible. Furthermore, plastic lids used for sealing the bottles are generally not recyclable and end up as waste, or worse yet, as litter throughout the environment. Additionally, these wasteful plastic bottles are also marketed and sold as "multi-packs" in which further packaging, such as shrink-wrap and/or cardboard must be utilized to contain individual bottles together as a multi-pack. Thus, such prior art delivery mechanisms generate a vast quantity of unwanted and unneeded waste.

In addition to having an adverse environmental impact, most prior art containers use valuable space, both in the retail environment and at the end-users' location, such as their homes. Past systems, known as "post-mix" systems, attempted to alleviate some of these drawbacks by selling concentrated beverage syrups designed to be diluted with a liquid, such as water. While known post-mix systems reduce waste associated with other delivery mechanisms, such as plastic bottles, these systems require large, expensive systems that are too complicated and cumbersome for use by consumers other than retail establishments that sell large quantities of beverages. Even for such establishments, the knowledge and costs required to maintain these conventional post-mix systems is inconvenient. Furthermore, past systems are known to require calibration on a regular basis to ensure that the correct amount of syrup is properly combined with the liquid. In this regard, any miscalibration or failure of the machine is often only discovered after several customers complain about the taste of the beverage and further time is required to check and fix the ratio of syrup to liquid.

Additionally, a majority of beverages are sold in plastic bottles and most of spent bottles end up in landfills and litter. Post-mix systems provide consumers concentrated beverage syrups designed to be diluted down with water, thus reducing and potentially eliminating the need of plastic bottles. Most available systems are appliances and lack portability for those on-the-go who live mobile, active lifestyles. In addition, on-the-go consumers who would like multiple drinks a day need a simple to use, portable, easy to carry product. Current post-mix systems lack the option of dosing nutraceuticals, such as supplements, vitamins, herbs, etc.

SUMMARY

The following presents a general summary of aspects of the invention in order to provide a basic understanding of at least some of its aspects. This summary is not intended as an extensive overview of the invention. It is not intended to identify key or critical elements of the invention or to delineate the scope of the invention. The following summary merely presents some concepts of the invention in a general form as a prelude to the more detailed description below.

Aspects of this invention relate to beverage dispensing system that comprises a container, an attachment mechanism located within the container, and a cartridge adapted to engage the attachment mechanism. The attachment mechanism may comprise an engagement assembly, a piercing portion, and a valve. The cartridge comprises a pod and a cap. The pod includes a chamber, an opening, and a cover located over the opening, wherein the cap is attached to the top of the chamber. Additionally, when the cartridge is engaged with the attachment mechanism, the engagement assembly holds the cartridge within the attachment mechanism, the piercing portion pierces through the cap and the cover, and the valve extends into the container.

Additional aspects of this invention relate to the cap including a foil retainer, wherein when the cartridge engages the engagement assembly, the piercing portion pushes against the foil retainer, thereby piercing the cover with the foil retainer. Additionally, the foil retainer may hold the cover over without allowing the cover to close over the opening of the cartridge.

Additional aspects of this invention relate to the cartridge and pod being generally a circular-shaped vessel. Additionally, the cartridge may hold one or more beverage ingredients, wherein the beverage ingredients may be selected from the list comprising: syrup, paste, powder, or granules.

Additional aspects of this invention relate to a beverage system that comprises a housing that includes a first opening and a second opening a cartridge defined as a dome-shaped vessel. The cartridge contains a beverage ingredient and the cartridge is sized and shaped to be received inside the first opening. The cartridge may include a sealing material positioned across the cartridge to seal the beverage ingredient within the cartridge. The beverage system may also include a water supply system. The water supply system may include a water supply line operatively connected at one end to a water source and at an opposing end to a needle. The needle may define a pointed open end to puncture the sealing material and the cartridge. Additionally, once the needle is positioned within the cartridge, water is passed into the cartridge to mix with the beverage ingredient to form a desired beverage. Additionally, the second opening may be sized and shaped to receive a beverage cup, the beverage cup capable of holding the desired from the beverage system.

Additional aspects of this invention relate to a method for producing a beverage using a beverage dispensing system. The method comprises the steps of: (a) inserting a cartridge into a container, the cartridge comprising a pod and a cap, wherein the pod includes a chamber, an opening and a cover located over the opening; (b) rotating or positioning the cartridge into an attachment mechanism located within the container, wherein the attachment mechanism comprises an engagement assembly, a piercing portion, and a valve; (c) applying pressure on the cartridge thereby releasing the valve into the container and piercing the cover with the piercing portion; (d) mixing the contents of the container, and (e) releasing the cartridge from the container.

Additional aspects of this invention relate to a beverage dispensing system that comprises a container, an attachment mechanism coupled to the container, and a dome portion. The attachment mechanism has a receptacle, a cutting portion, and a cartridge pressure member. The cartridge pressure member may be hingedly attached to the receptacle and rotatable between an open position and a closed position. The dome portion may be configured to move between a first position and a second position to open a cartridge that is held in the receptacle.

BRIEF DESCRIPTION OF THE DRAWINGS

A more complete understanding of the present invention and certain advantages thereof may be acquired by referring to the following description in consideration with the accompanying drawings, in which like reference numbers indicate like features, and wherein:

FIGS. 3, 3A, 3B, 3C, and 3D illustrate an exemplary cartridge for the beverage dispensing system from FIG. 1 in accordance with the present invention;

FIGS. 4A, 4B, 4C, 4D, 4E, and 4F illustrate perspective views the operation of the beverage dispensing system from FIG. 1 in accordance with the present invention;

FIGS. 5A, 5B, 6A, 6B, 7A, 7B, 8A, and 8B illustrate various examples of a container for a beverage dispensing system in accordance with the present invention;

FIGS. 9A, 9B, 10A, 10B, 11A, 11B, 12A, 12B, 13A, and 13B illustrate various examples of an attachment mechanism for a beverage dispensing system in accordance with the present invention;

FIGS. 14A, 14B, and 14C illustrate an example half-pod cartridge in accordance with the present invention;

FIG. 30A illustrates a side view of a beverage dispensing system in accordance with the present invention;

FIG. 30B illustrates a top view of the beverage dispensing system shown in FIG. 30A;

FIG. 31A illustrates a front view of the beverage dispensing system shown in FIG. 30A;

FIG. 31B illustrates another top view of the beverage dispensing system shown in FIG. 30A;

FIG. 32 illustrates a partial cross sectional of the beverage dispensing system shown in FIG. 30A;

FIG. 33A illustrates a side view of a beverage dispensing system in in accordance with the present invention;

FIG. 33B illustrates a top view of the beverage dispensing system shown in FIG. 33A;

The reader is advised that the attached drawings are not necessarily drawn to scale.

DETAILED DESCRIPTION

In the following description of various examples of the invention, reference is made to the accompanying drawings, which form a part hereof, and in which are shown by way of illustration various example structures, systems, and steps in which aspects of the invention may be practiced. It is to be understood that other specific arrangements of parts, structures, example devices, systems, and steps may be utilized and structural and functional modifications may be made without departing from the scope of the present invention. Also, while the terms "top," "bottom," "front," "back," "side," and the like may be used in this specification to describe various example features and elements of the invention, these terms are used herein as a matter of convenience, e.g., based on the example orientations shown in the figures. Nothing in this specification should be construed as requiring a specific three dimensional orientation of structures in order to fall within the scope of this invention.

Figure 1:
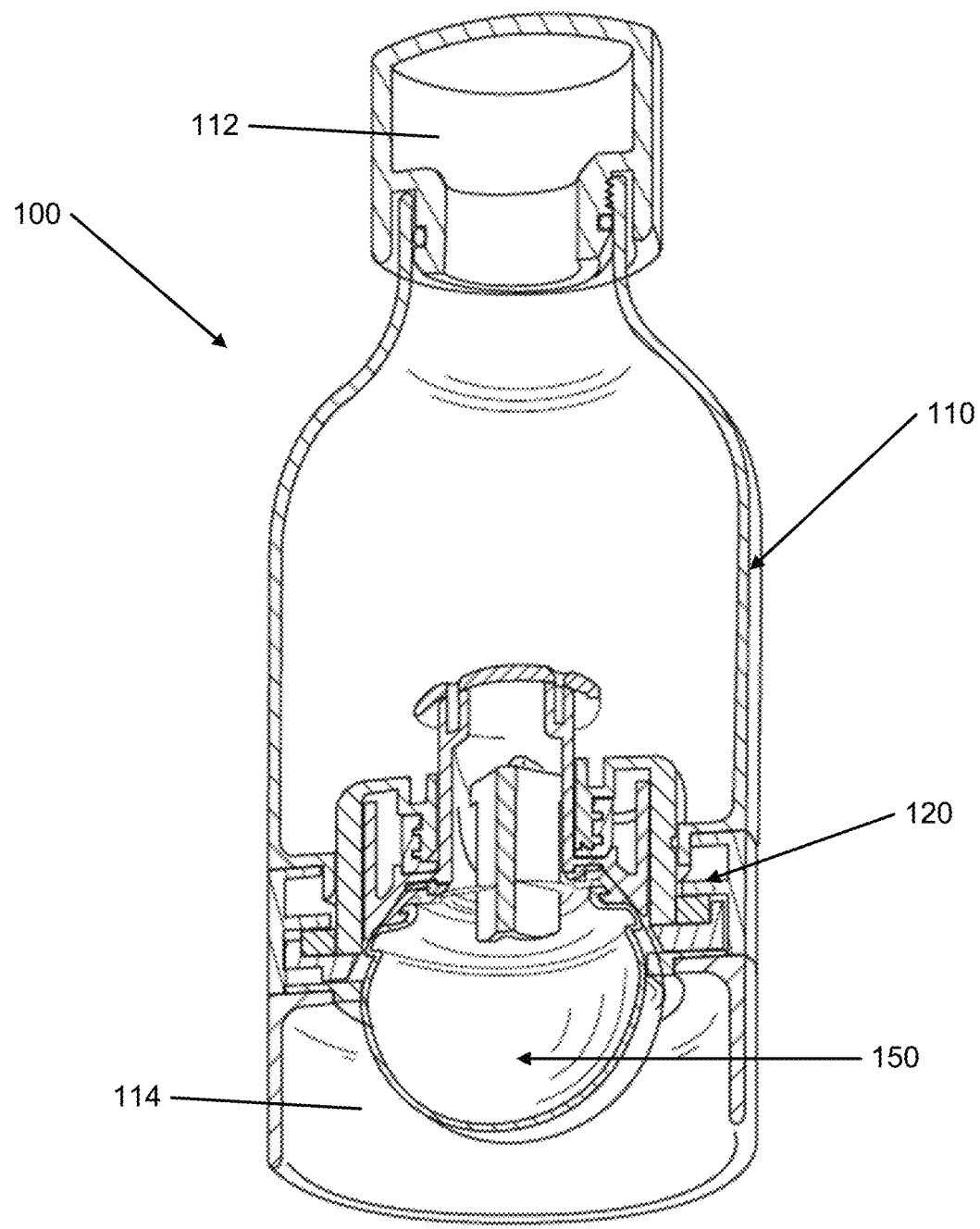
FIG. 1 illustrates a perspective view of a beverage dispensing system in accordance with the present invention.

FIG. 1 illustrates an example of a beverage dispensing system 100 in accordance with the present invention. The beverage dispensing system 100 includes a container 110, an attachment mechanism 120 and a cartridge 150. The container 110 may hold a mixing solution or liquid, such as water, to be mixed with the contents of the cartridge 150. The attachment mechanism 120 is generally located within the container 110. The cartridge 150 generally engages with the attachment mechanism 120 to open the cartridge 150 to be dispensed into the container 110, thereby combining the contents of the cartridge 150 with the liquid within the container 110 to create a drinkable beverage.

The container 110, as illustrated in FIG. 1, may be generally in the shape of a bottle. The container 110 may be a variety of other shapes, without departing from this invention. The container 110 may include a cap 112. The cap 112 may seal an opening at the top of the container 110 where a user can drink from the container 110. Additionally, the container 110 may include a base or bezel 114. The cartridge 150 may be inserted through the base or bezel 114 to engage the cartridge 150 with the attachment mechanism 120. As illustrated in FIG. 1, this base or bezel 114 is located at the bottom of the container 110. The base or bezel 114 may be located at different areas of the container 110 as discussed below without departing from this invention.

Figure 1A:
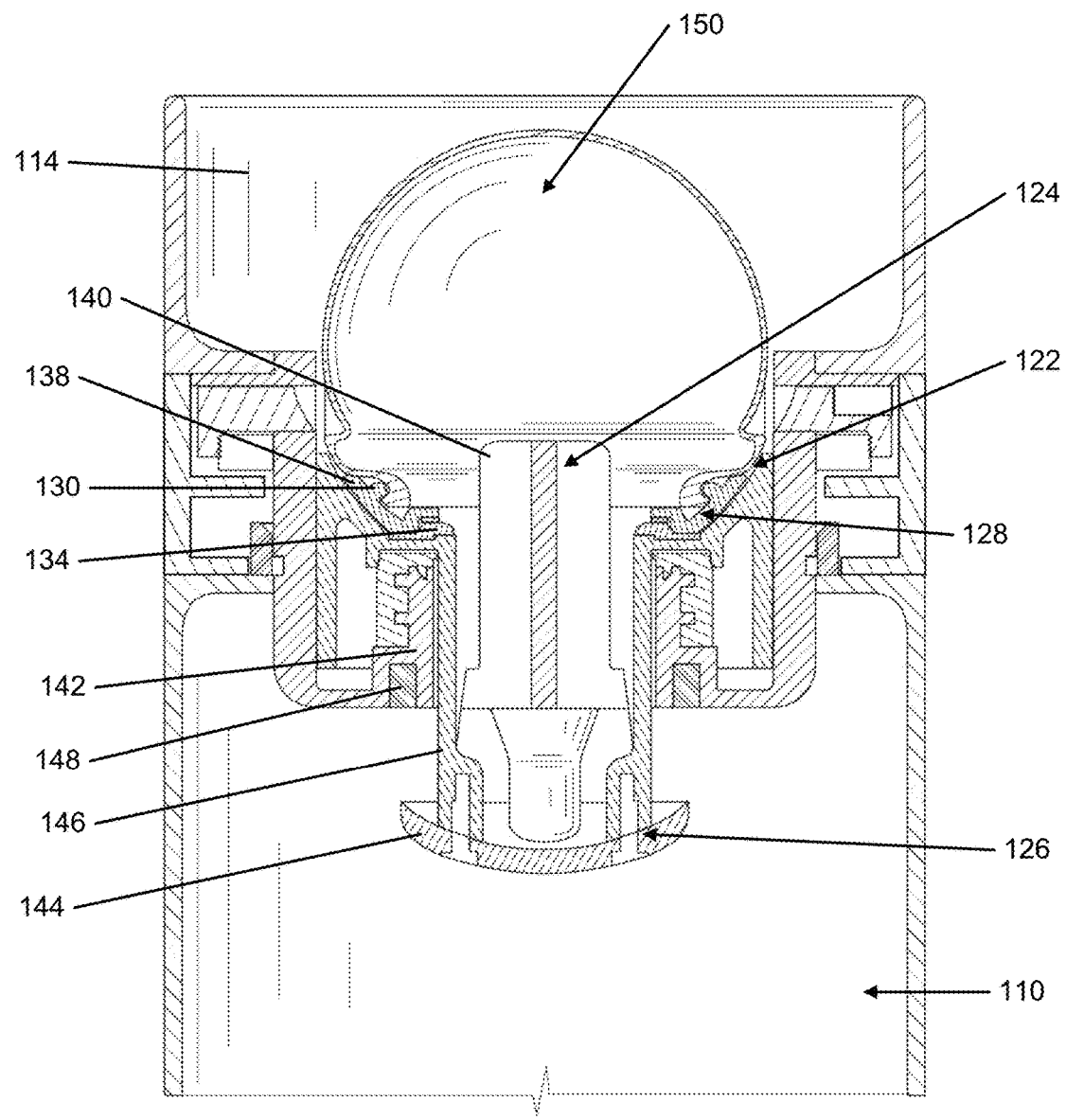
FIG. 1A illustrates a cross-sectional view of the beverage dispensing system from FIG. 1 in accordance with the present invention.

The attachment mechanism 120, as illustrated in FIGS. 1 and 1A, comprises an engagement assembly 122, a piercing portion 124, and a valve assembly 126. The engagement assembly 122 may generally receive the cartridge 150 within the attachment mechanism 120. The piercing portion 124 may generally pierce the cartridge 150, thereby releasing the contents of the cartridge 150 into the container 110. The valve assembly 126 may generally open upon engagement of the cartridge 150 with the attachment mechanism 120 thereby allowing the mixing of the contents of the container 110 with the contents of the cartridge 150.

The engagement assembly 122 may include a locking mechanism 128 to engage and hold the cartridge 150 in the container 110. The locking mechanism 128 may include a rib 130 which matches with and engages the cartridge 150. The locking mechanism 128 may also include a spring (not shown in FIG. 1A), such that when the cartridge 150 is inserted into the engagement assembly 122, the spring provides a biasing force to the cartridge 150 to more easily engage the rib 130. Additionally, the locking mechanism 128 may include a cam or a lever 134 such that when the cartridge 150 is snapped into a locked position, the piercing portion 124 and valve assembly 126 are engaged as will be explained below. The spring may also bias against the cartridge 150 as the cartridge 150 is snapped into the locked position.

Figure 4F:
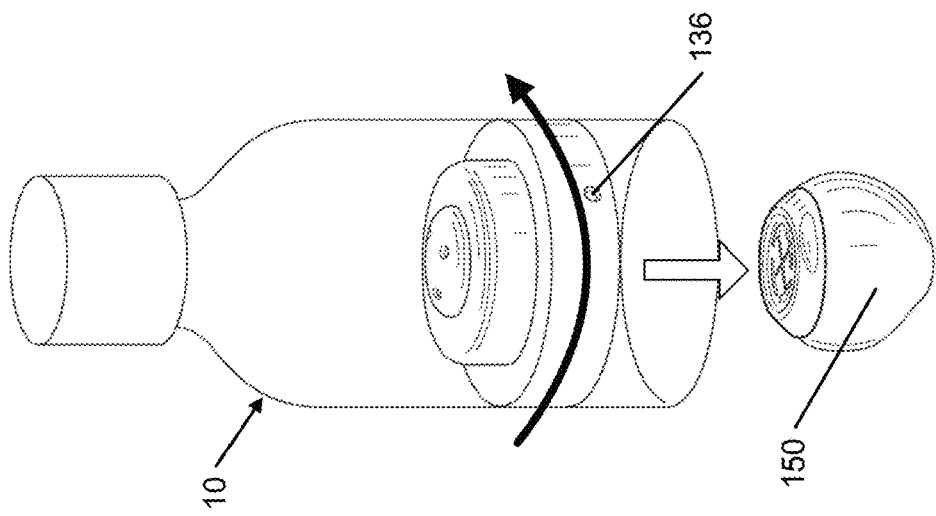

Additionally, the engagement assembly 122 may include a releasing mechanism 136 wherein the releasing mechanism 136 releases the locking mechanism 128 to release the cartridge 150. The releasing mechanism 136 may be in the form of a rotating bezel, wherein the user can release the cartridge 150 by rotating the bezel (as shown in FIG. 4F). The rotation of the bezel may eject the cartridge 150 and return the attachment mechanism 120 to the starting position. Additionally, the releasing mechanism 136 may be in the form of a release button or a release lever, wherein the user may press the release button or slide the release lever to release the cartridge 150. Other means to release the cartridge 150 may be used with the engagement assembly 122 without departing from this invention.

The engagement assembly 122 may also include a cartridge sealing portion 138. The cartridge sealing portion 138 seals the area around the top of the cartridge 150 to the engagement assembly 122 when the cartridge 150 is snapped into a locked position. The cartridge sealing portion 138 ensures that the liquid or solution is contained within the cartridge 150 during the mixing process. The cartridge sealing portion 138 may include a gasket, o-ring, or grommet or other sealing structures in accordance with this invention. The cartridge sealing portion 138 may be made of rubber, plastic, or metal or other materials in accordance with this invention.

As illustrated in FIG. 1, the piercing portion 124 of the attachment mechanism 120 may include an opening structure 140. The piercing portion 124 may be cooperatively engaged to the cam or lever 134 such that when the cartridge 150 is pressed into the engagement assembly 122, the cartridge 150 is pressed against the piercing portion 124, and the piercing portion 124 slides into the opening 158 of the pod 152. The opening structure 140 may be sharp enough to pierce the cover 160 of the cartridge 150, thereby breaking the cover 160 on the pod 152, and allowing the contents of the cartridge 150 to mix with the contents of the container 110.

In another example in accordance with this invention, in cooperation with a foil retainer 166 as explained below, the opening structure 140 may be shaped such that it corresponds specifically with the flaps or retaining portions 170 on the foil retainer 166. In this example, when the cartridge 150 is pressed against the piercing portion 124, the opening structure 140 puts pressure against the foil retainer 166, specifically the flaps or retaining portions 170 on the foil retainer 166. The pressure from the opening structure 140 causes the flaps 170 to break open, and fold into the cover 160 (if present), thereby piercing the cover 160 on the pod 152, and allowing the contents of the cartridge 150 to mix with the contents of the container 110. It is important to note that the specific arrangement and configuration of the opening structure 140 must match the flaps 170 on the foil retainer 166 for the opening structure 140 to adequately pressure and break the foil retainer 166. If the opening structure 140 and flaps 170 on the foil retainer 166 do not match, it is possible that the cover 160 will not be broken when the cartridge 150 is pressed into the locked position.

The piercing portion 124 may also include an internal sealing portion 142. The internal sealing portion 142 seals the area around opening structure 140 when the cartridge 150 is snapped into a locked position. The internal sealing portion 142 ensures that the liquid or solution is contained within the cartridge 150 during the mixing process. The valve assembly 126, as illustrated in FIG. 1A, may generally open upon engagement of the cartridge 150 with the attachment mechanism 120 thereby allowing the mixing of the contents of the container 110 with the contents of the cartridge 150. The valve assembly 126 may include a valve 144 and an elevator 146. The valve 144 may be cooperatively engaged with the elevator 146 and with the cam or lever 134 of the engagement assembly 122, such that when the cartridge 150 is snapped into the locked position and engages the cam or lever 134 of the engagement assembly 122, the valve 144 is moved from a closed position to an open position. Generally, as pressure is applied to the cartridge 150 and the cartridge 150 is snapped into the locked position, the elevator 146 moves and thereby engages the valve 144 and moves the valve 144 to the open position.

Figures 2A, 2B:
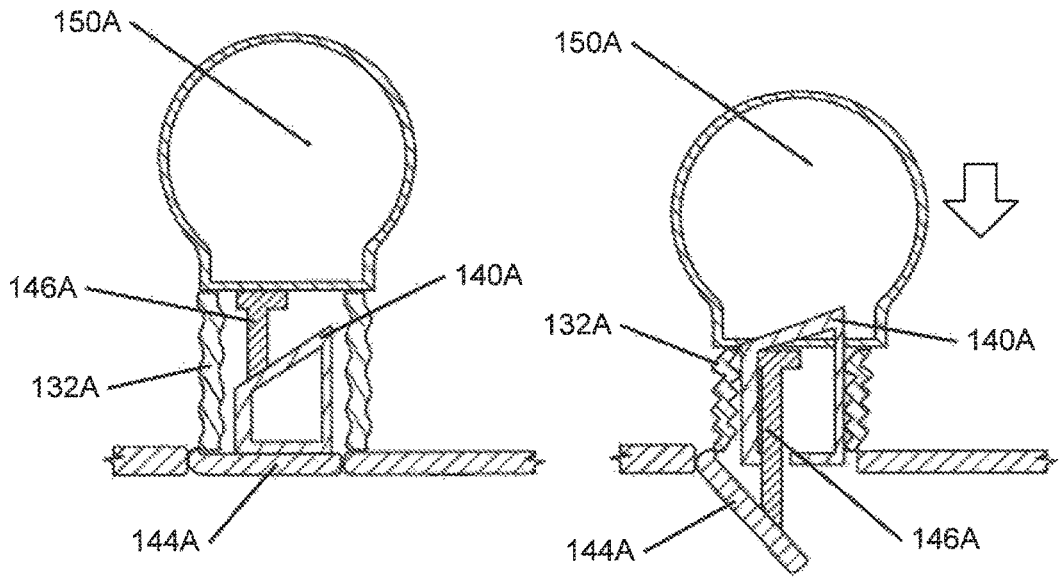
FIGS. 2A and 2B illustrate a close-up view a portion of the beverage dispensing system from FIG. 1 in accordance with the present invention.

In one example in accordance with this invention, as illustrated in FIGS. 2A and 2B, the valve assembly 126 may be in the form of a door-type valve 144A. The valve 144A, as illustrated in FIGS. 2A and 2B, may be hinged at one side, such that as pressure is applied to the cartridge 150A and thereby to the elevator 146A and the spring 132A, the valve 144A swings to the open position and into the container 110. Additionally, as the cartridge 150A is pushed, the opening structure 140A moves into the cartridge 150A. As the valve 144A swings to the open position into the container 110, the contents of the cartridge 150A and the contents of the container 110 can then mix.

Figures 2C, 2D:
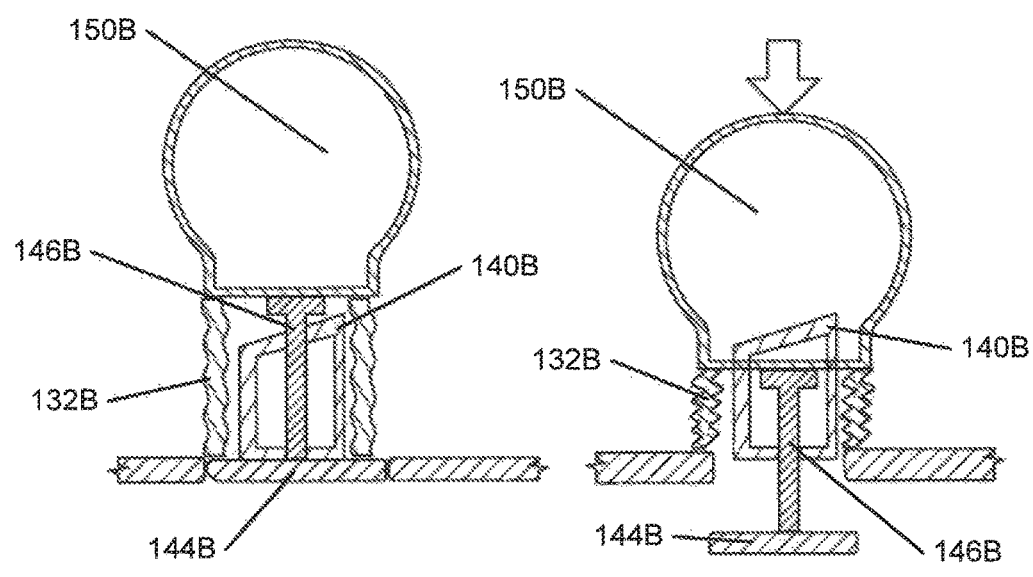
FIGS. 2C and 2D illustrate another close-up view a portion of the beverage dispensing system from FIG. 1 in accordance with the present invention.

In another example in accordance with this invention, as illustrated in FIGS. 2C and 2D, the valve assembly 126 may be in the form of a plunger-type valve 144B. The valve 144B, as illustrated in FIGS. 2C and 2D, may slide into the container 110 as one piece as pressure is applied to the cartridge 150B and thereby to the elevator 146B and to the spring 132B. When the elevator 146B is pushed against the valve 144B, the valve 144B moves from the closed position to the open position and into the container 110. Additionally, as the cartridge 150B is pushed, the opening structure 140B moves into the cartridge 150B. As the valve 144B slides to the open position, the contents of the cartridge 150B and the contents of the container 110 can then mix.

The valve assembly 126 may also include a valve sealing portion 148. The valve sealing portion 148 seals the area between the valve 144 and the container 110 when the cartridge 150 is not snapped into the locked position. Prior to the engagement of the cartridge 150 in the engagement assembly 122, the container 110 may contain a liquid and the valve sealing portion 148 ensures that the liquid or solution is contained within the container 110 when there is no cartridge 150 and the valve 144 is in the closed position. The valve sealing portion 148 may include a gasket, o-ring, or grommet or other sealing structures in accordance with this invention. The valve sealing portion 148 may be made of rubber, plastic, or metal or other materials in accordance with this invention.

Figure 3:
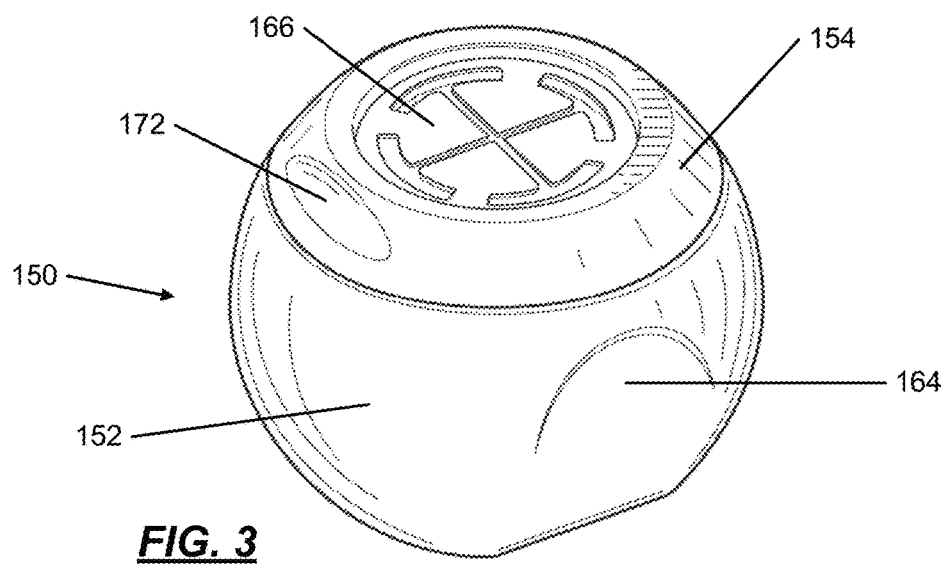
Figure 3A:
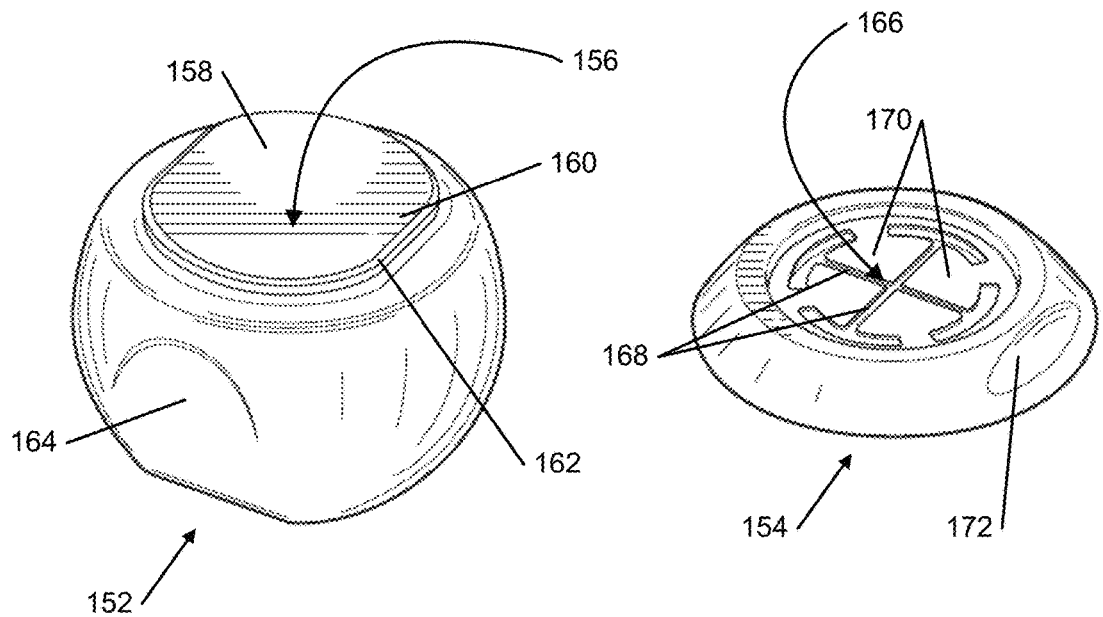

The cartridge 150, as illustrated in FIGS. 3 and 3A, may comprise a pod 152 and a cap 154. The cartridge 150 is adapted to engage the attachment mechanism 120 at the engagement assembly 122. The cartridge 150 may hold one or more beverage ingredients, wherein the beverage ingredients may be selected from the list comprising: syrup, paste, powder, granules, or other compositions. Additionally, the cartridge 150 may hold other ingredients or flavors, such as nutrients or vitamins, in accordance with this invention.

The pod 152 is generally a vessel capable of holding a syrup, paste, powder, granules or other compositions. The pod 152 as shown in FIGS. 3 and 3A is a circular-shaped structure that includes a chamber 156, an opening 158, and a cover 160. The cover 160 may be located over the opening 158 of the pod 152. An engaging portion 162 may be located near the opening 158, wherein the engaging portion 162 may be a snap structure that engages the cap 154. Additionally, the engaging portion 162 on the pod 152 may include threads that may engage threaded structures on the cap 154.

As illustrated in FIGS. 3C and 3D, the cover 160 may be a foil seal located over the opening 158 of the pod 152. The cover 160 may be attached to the edges of the opening 158 of the pod 152. The cover 160 may be made of a variety of different materials in accordance with this invention, such as: aluminum and sealing coatings or laminated with sealing polymers like polyethylene, metalized bioriented polypropylene and sealing coatings or laminated with sealing polymers like polyethylene, or metalized polyester and sealing coatings or laminated with sealing polymers like polyethylene.

In an additional example in accordance with this invention, the pod 152 may include a locking portion 164. The locking portion 164 may be engaged with the engagement assembly 122 of the attachment mechanism 120 to snap the cartridge 150 into the attachment mechanism 120.

As illustrated in FIG. 3C, the cap 154 may be attached to the top of the chamber 156. The cap 154 may be a snap-on type cap, wherein the cap 154 may snap onto the top of the chamber 156. The cap 154 may also attach to the top of the chamber 156 by screwing onto the top of the chamber 156. The cap 154 may be made of a variety of different materials without departing from this invention, such as: polyethylene, polypropylene, or polyethylene or polypropylene closures with internal liners containing oxygen scavengers like: components of Hyguard™, Celox™, etc.

In an additional example in accordance with this invention, the cap 154 may include a foil retainer 166. The foil retainer 166 may be in the shape of a disc located in the center of the cap 154. The foil retainer 166 may include cut-out portions 168, thereby creating flaps or retaining portions 170 on the foil retainer 166 that may break-away with pressure. These flaps 170 are designed to cooperate specifically with the opening structure 140 as described above. When the opening structure 140 is pressed against the flaps 170 and the flaps 170 are pressed open, the flaps 170 may pierce the cover 160 and fold into the pod 152, thereby holding the pierced and cut portions of the cover 160 open so that the contents of the cartridge 150 can mix freely with the contents of the container 110. As illustrated in FIG. 3A, the cut-out portion 168 may be in the shape of a cross, thereby creating four triangular flaps 170. In other examples in accordance with this invention, the foil retainers 166A-166H may include cut-out portions 168 and flaps 170 in the shapes as illustrated in FIG. 3B. Additional shapes may be used for the cut-out portions 168 and flaps 170 without departing from this invention. When the foil retainer 166 is used with the cap 154, the cover 160 may be used or it may not be used. The foil retainer 166 may be made of a variety of different materials without departing from this invention, such as: polyethylene, polypropylene, or polyethylene or polypropylene closures with internal liners containing oxygen scavengers like: components of Hyguard™, Celox™, or any other material which is flexible enough to break when pressure is applied from the opening structure 140, and hard enough to cut or pierce the cover 160 and remain in place, thereby keeping the cover 160 open. As shown in FIGS. 3C and 3D, the cartridge 150 may include no cover 160 with a cap 154 or the cartridge 150 may include a cover 160 with no cap 154.

In an additional example in accordance with this invention, the cap 154 may include a locating portion 172. The locating portion 172, as illustrated on FIG. 3A, engages with the engagement assembly 122 to properly position the cartridge 150 within the attachment mechanism 120.

The pod 152 may be made of various materials without departing from this invention. For example, the pod 152 may be made of polyethylene terephthalate (PET). Additionally, the pod 152 may be made of PET in combination (by mixing and/or by using multi-layer structures) with passive barrier materials and/or oxygen scavengers like: plasma-applied coatings of SiOx or amorphous carbon, polyamides, polyglycolic acid, Amosorb™, DiamondClear™, or components of Hyguard™. Additionally, the pod 152 may be made of polyethylene or polypropylene in combination (by mixing and/or by using multilayer structures) with passive barrier materials and/or oxygen scavengers like: polyamides, ethylene vinyl alcohol. Additionally, the pod 152 may be made of aluminum. Other materials may be used for the pod 152 in accordance with this invention, such that the material alone or in combination with a barrier system protects some beverages or other products that are oxygen sensitive and to avoid excessive loss of water.

FIGS. 4A through 4F illustrate the operation of the beverage dispensing system according to examples of this invention. The preparation of the beverage dispensing system 100 as described above is shown in FIGS. 4A-4F. As shown in FIG. 4A, the cartridge 150 is inserted into the attachment mechanism 120 as located in the base of the container 110. The cartridge 150 may be inserted with the cap towards the attachment mechanism 120.

As shown in FIG. 4B, the cartridge 150 may be rotated to make sure the cartridge 150 is located in the proper location.

The locating portion 172 located on the cap, engages with the engagement assembly 122 to properly position the cartridge 150 within the attachment mechanism 120. Additionally, the cartridge sealing portion 138 seals the area around the top of the cartridge 150 to the engagement assembly 122 when the cartridge 150 is inserted into the attachment mechanism 120. The cartridge sealing portion 138 ensures that the liquid or solution is contained within the cartridge 150 during the mixing process.

As shown in FIG. 4C, the cartridge 150 may be pressed into the attachment mechanism 120, thereby engaging the engagement assembly 122 and pressing the cartridge 150 into the locked position. As the cartridge 150 is engaged with the engagement assembly 122, the opening structure 140 of the piercing portion 124 pierces the opening and the cover 160 on the pod 152, thereby releasing the contents of the cartridge 150 into the container 110. Additionally, as the cartridge 150 is engaged with the engagement assembly 122, the valve assembly 126 is engaged and the valve sealing portion 148 is released from the container 110. The valve 144 opens into the container 110. As the opening 158 and cover 160 are pierced and the valve 144 opens, the contents of the container 110 and the contents of the cartridge 150 are now able to be mixed together.

Figure 4E:
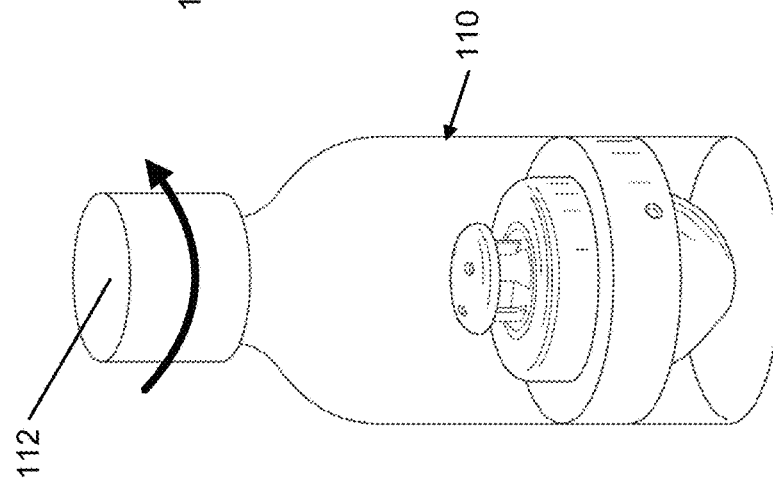
Figure 4D:
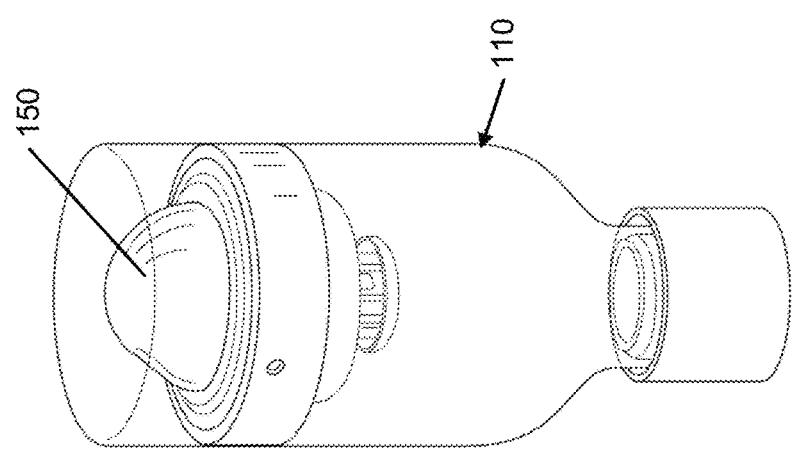

As shown in FIG. 4D, the container 110 may be rotated or shaken to mix the contents of the container 110 and the contents of the cartridge 150. This shaking movement causes the contents to mix together, thereby creating a desired beverage. As shown in FIG. 4E, the beverage is now ready to be consumed.

Once the beverage is consumed by the user, the cartridge 150 can be released from the attachment mechanism 120 by using the releasing mechanism 136. As shown in FIG. 4F, the releasing mechanism 136 is a rotating bezel, which ejects the cartridge 150 and returns the attachment mechanism 120 to the starting position. The releasing mechanism 136 may also be in the form of a release button or a release lever as explained above.

In accordance with this invention, a beverage apparatus or machine may perform the same operation as the container 110 as described above (apparatus not shown). The beverage apparatus may include an attachment mechanism 120 similar to as described above, wherein the cartridge 150 may be inserted into the attachment mechanism 120. Additionally, a glass or cup may be placed under or within the beverage apparatus to hold the desired beverage.

After the cartridge 150 is inserted into the attachment mechanism 120 of the beverage apparatus, the cartridge 150 may then be pressed into the attachment mechanism 120, thereby pressing the cartridge 150 into the locked position. As the cartridge 150 engages the attachment mechanism, the opening structure 140 pierces the cover 160 on the cartridge 150, thereby releasing the contents of the cartridge 150 into the container 110. As the cover 160 is pierced, a metered amount of water or other liquid from a first source may flush through the cartridge 150. Additionally, a metered amount of water or other liquid from a second source may be flushed directly into the glass. These first and second flushes help to ensure the contents of the cartridge 150 are completely emptied into the glass and that the contents of the cartridge 150 and the water or other liquid are completely mixed as required.

Additionally, the beverage apparatus may have a mechanical means to rotate or shake the glass to assist with mixing the contents of the container 110 and the contents of the cartridge 150. This shaking movement may cause the contents to mix together, thereby creating the desired beverage. Once the beverage is consumed by the user, the cartridge 150 can be removed from the beverage apparatus.

FIGS. 5A-8B illustrate additional container configuration according to examples of this invention.

Figure 5B:
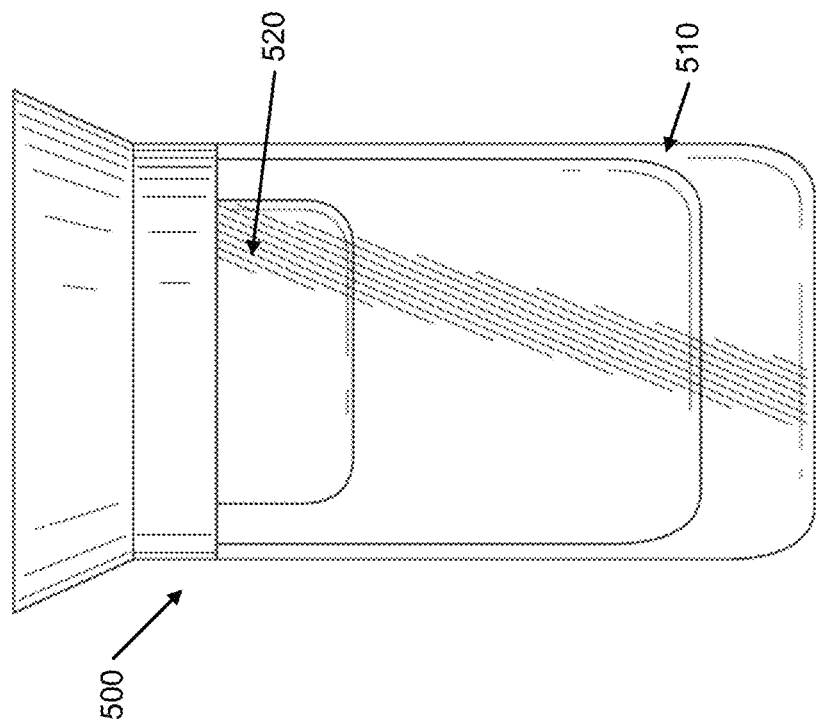
Figure 5A:
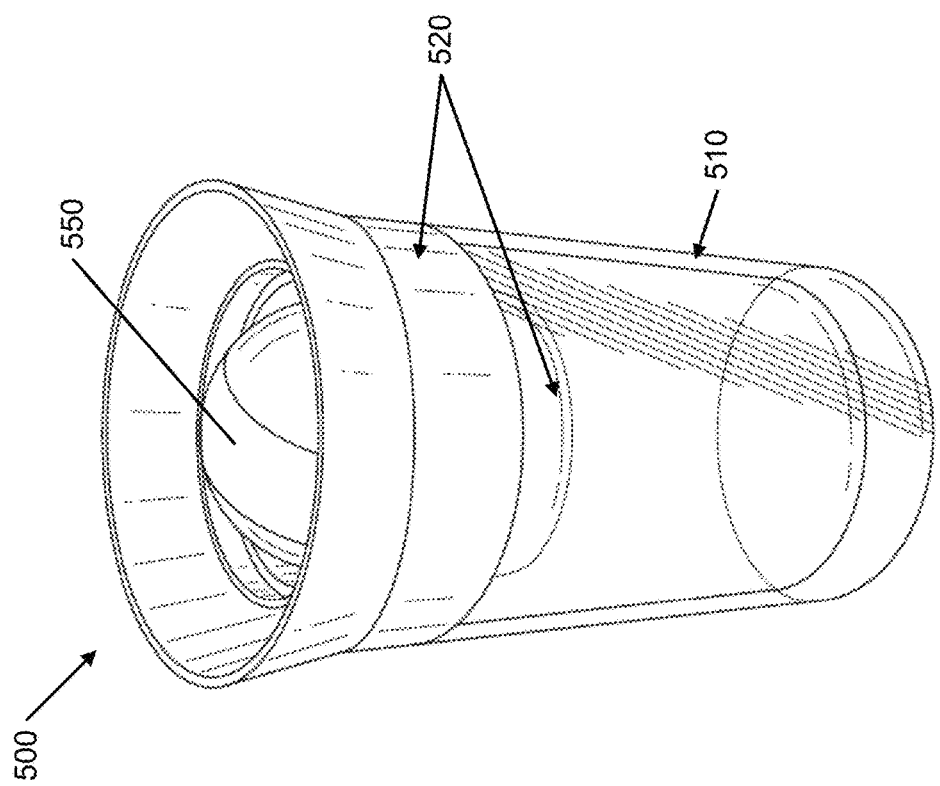

FIGS. 5A and 5B illustrate a beverage dispensing system 500 with a cartridge 550 located at the top of the container 510. FIGS. 5A and 5B illustrate an example according to this invention similar to that described above in conjunction with FIGS. 1 through 4F (the same or similar reference numbers are used in FIGS. 5A and 5B as those used in FIGS. 1 through 4F to denote the same or similar parts). In another example in accordance with this invention, as shown in FIG. 5A, the beverage dispensing system 500 is generally comprised of a container 510, an attachment mechanism 520, and a cartridge 550. The container 510 may hold a mixing solution or liquid, such as water, to be mixed with the contents of the cartridge 550. The cartridge 550 generally engages with the attachment mechanism 520 to open the cartridge 550 to be dispensed into the container 510, thereby combining the contents of the cartridge 550 with the liquid within the container 510 to create a drinkable beverage.

In this example configuration, the attachment mechanism 520 is located at the top of the container 510, such that the cartridge 550 is inserted into the attachment mechanism 520 at the top of the container 510. Additionally, the container 510 may include an area located around the cartridge 550, such that when the cartridge 550 is attached to the container 510, the user can drink from the container 510. The container 510 may include an open area around the cartridge 550 for drinking. Additionally, a release mechanism may be located on a side of the container 510. The release mechanism may be in the form of a release button or a release lever, wherein the user may press the release button or slide the release lever to release the cartridge. The attachment mechanism 520 and the cartridge 550 may be any of the configurations as described in this application without departing from the invention.

Figure 6B:
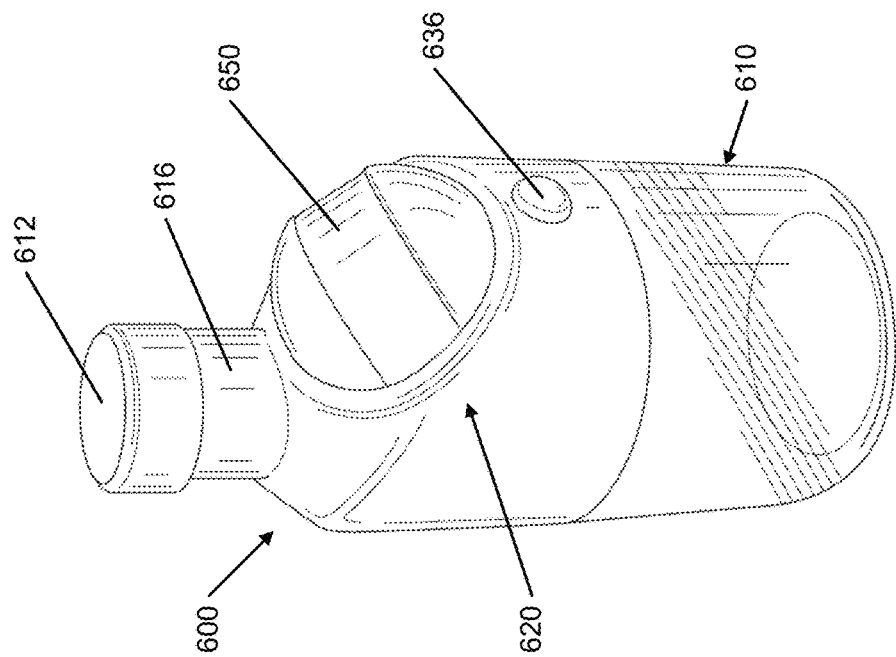
Figure 6A:
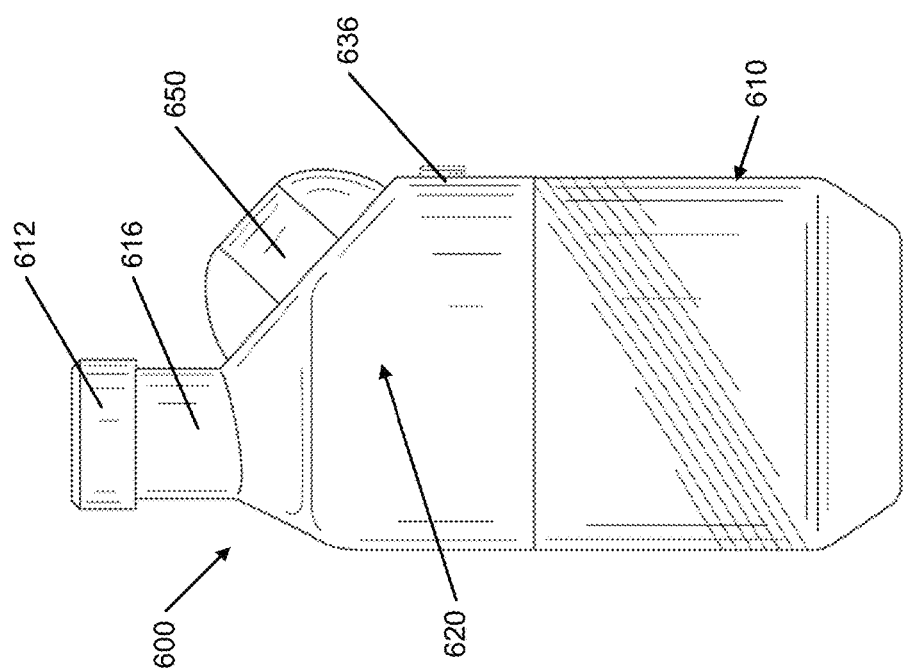

FIGS. 6A and 6B illustrate a beverage dispensing system 600 with a cartridge 650 located at the top of the container 610 at an angle. FIGS. 6A and 6B illustrate an example according to this invention similar to that described above in conjunction with FIGS. 1 through 4F (the same or similar reference numbers are used in FIGS. 6A and 6B as those used in FIGS. 1 through 4F to denote the same or similar parts). In another example in accordance with this invention, as shown in FIGS. 6A and 6B, the beverage dispensing system 600 is generally comprised of a container 610, an attachment mechanism 620, and a cartridge 650. The container 610 may hold a mixing solution or liquid, such as water, to be mixed with the contents of the cartridge 650. The cartridge 650 generally engages with the attachment mechanism 620 to open the cartridge 650 to be dispensed into the container 610, thereby combining the contents of the cartridge 650 with the liquid within the container 610 to create a drinkable beverage.

In this example configuration, the attachment mechanism 620 is located at the top of the container 610 at an angle, such that the cartridge 650 is inserted into the attachment mechanism 620 at the top angle of the container 610. Additionally, the container 610 may include a drinking spout 616 located adjacent to the cartridge 650, such that when the cartridge 650 is attached to the container 610, the user can drink from the container 610 out of the drinking spout 616. Additionally, a release mechanism 636 may be located on a side of the container 610. The release mechanism 636 may be in the form of a release button or a release lever, wherein the user may press the release button or slide the release lever to release the cartridge 650. The attachment mechanism 620 and the cartridge 650 may be any of the configurations as described in this application without departing from the invention.

FIGS. 7A and 7B illustrate a beverage dispensing system 700 with a container 710 with a hinge 717 and a cartridge 750 located in middle of the container 710. FIGS. 7A and 7B illustrate an example according to this invention similar to that described above in conjunction with FIGS. 1 through 4F (the same or similar reference numbers are used in FIGS. 7A and 7B as those used in FIGS. 1 through 4F to denote the same or similar parts). In another example in accordance with this invention, as shown in FIGS. 7A and 7B, the beverage dispensing system 700 is generally comprised of a container 710, an attachment mechanism 720, and a cartridge 750. The container 710 may hold a mixing solution or liquid, such as water, to be mixed with the contents of the cartridge. The cartridge generally engages with the attachment mechanism to open the cartridge 750 to be dispensed into the container 710, thereby combining the contents of the cartridge 750 with the liquid within the container 710 to create a drinkable beverage.

In this example configuration, the container 710 may have a hinged portion 717, such as a top portion 718 of the container 710, wherein the top portion 718 swings to an open position, as illustrated in FIG. 7B. When the top portion 718 is in the open position, the cartridge 750 can be inserted into the attachment mechanism 720. The attachment mechanism 720 may be located in the middle area of the container 710, such that the cartridge 750 is inserted into the attachment mechanism 720 when the top portion 718 is in the open position. After the cartridge 750 is inserted, the top portion 718 may swing back to a closed position, as illustrated in FIG. 7A. When the top portion 718 is in the closed position, the beverage may be mixed and the user may drink from the container 710. Additionally, the container 710 may include a drinking spout 716 located at the top of the container 710. Additionally, a release mechanism may be located on a side of the container 710. The release mechanism may be in the form of a release button or a release lever, wherein the user may press the release button or slide the release lever to release the cartridge 750. The attachment mechanism 720 and the cartridge 750 may be any of the configurations as described in this application without departing from the invention.

Figure 8B:
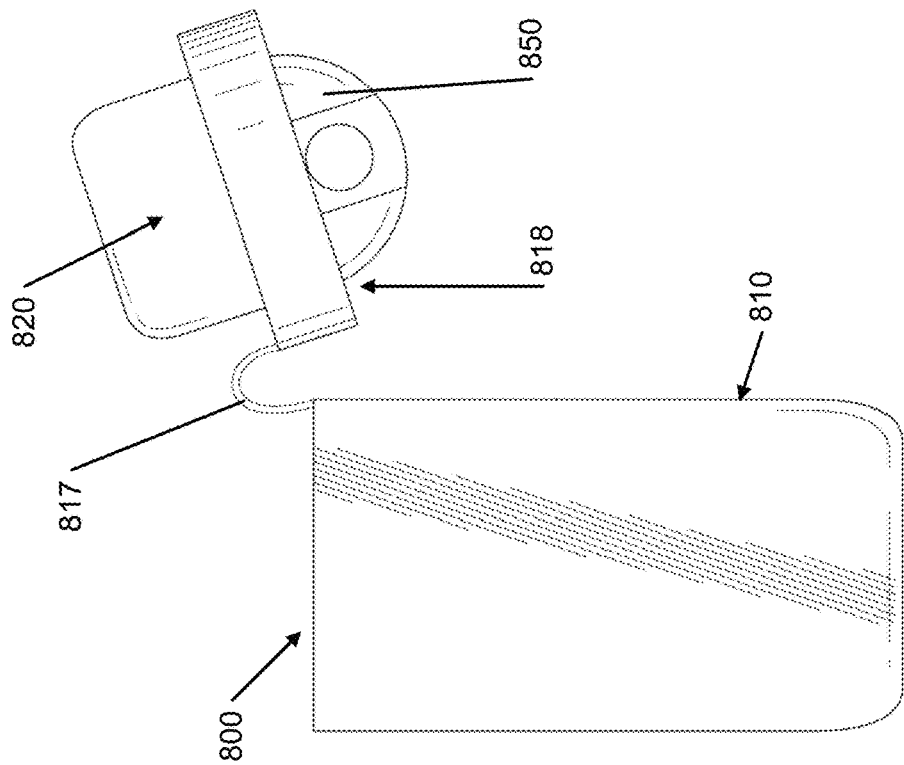
Figure 8A:
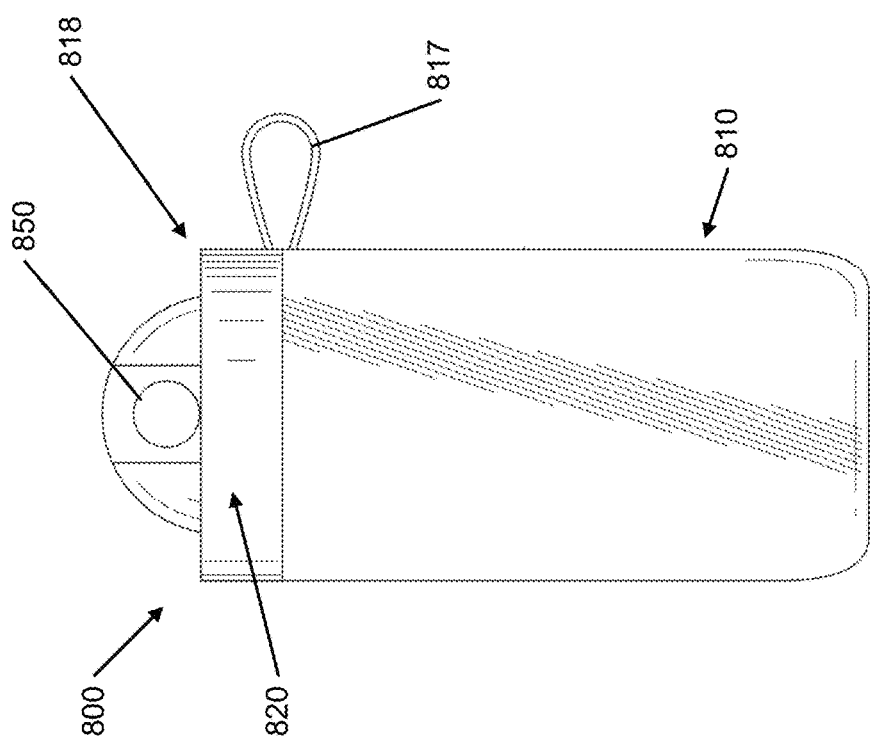

FIGS. 8A and 8B illustrate a beverage dispensing system 800 with a container 810 with a hinge 817 and a cartridge 850 located in the hinged portion 818 of the container 810. FIGS. 8A and 8B illustrate an example according to this invention similar to that described above in conjunction with FIGS. 1 through 4F (the same or similar reference numbers are used in FIGS. 8A and 8B as those used in FIGS. 1 through 4F to denote the same or similar parts). In another example in accordance with this invention, as shown in FIGS. 8A and 8B, the beverage dispensing system 800 is generally comprised of a container 810, an attachment mechanism 820, and a cartridge 850. The container 810 may hold a mixing solution or liquid, such as water, to be mixed with the contents of the cartridge 850. The cartridge 850 generally engages with the attachment mechanism 820 to open the cartridge 850 to be dispensed into the container 810, thereby combining the contents of the cartridge 850 with the liquid within the container 810 to create a drinkable beverage.

In this example configuration, the container 810 may have a hinged portion 817, such as a lid 818 on the container 810, wherein the lid 818 swings to an open position, as illustrated in FIG. 8B. The lid 818 may include the attachment mechanism 820 located at the top of the container 810. The cartridge 850 may be inserted into the attachment mechanism 820 when the lid 818 is in the open position. After the cartridge 850 is inserted, the lid 818 may swing back to a closed position, as illustrated in FIG. 8A. When the lid 818 is in the closed position, the beverage may be mixed and the user may drink from the container 810. Additionally, the container 810 may include a drinking area located at the top of the container 810 around the cartridge 850. Additionally, a user may drink from the container 810 when the lid 818 is in the open position. A release mechanism may be located on a top side of the container 810. The release mechanism may be in the form of a release button or a release lever, wherein the user may press the release button or slide the release lever to release the cartridge 850. The attachment mechanism 820 and the cartridge 850 may be any of the configurations as described in this application without departing from the invention.

Additional container configurations may be utilized without departing from this invention. Containers such as: multi-serve containers which may hold multiple cartridges or bigger cartridges; containers to hold liquid food, such as soup; containers which can used as a glass by removing the upper portion which contains the attachment mechanism; containers for use in a car or in a sports environment which may have a sports closure, such as a push/pull drinking spout; containers for use in airline flights such that the cartridges and water are used to supply drinks to the passengers; containers which may contain medicated drinks such as an aspirin or prescription drugs; containers which may fit within a refrigerator that has a tap dispenser and a top that contains the attachment mechanism; containers that may be hand-held; and containers which are much larger that may be located on a counter or shelf, either in a store environment or in a home, to name a few. Again, the teachings and principles of the invention may be applied to any container configuration without departing from the invention.

FIGS. 9A through 13B illustrate additional attachment mechanism configurations according to examples of this invention.

Figure 9A:
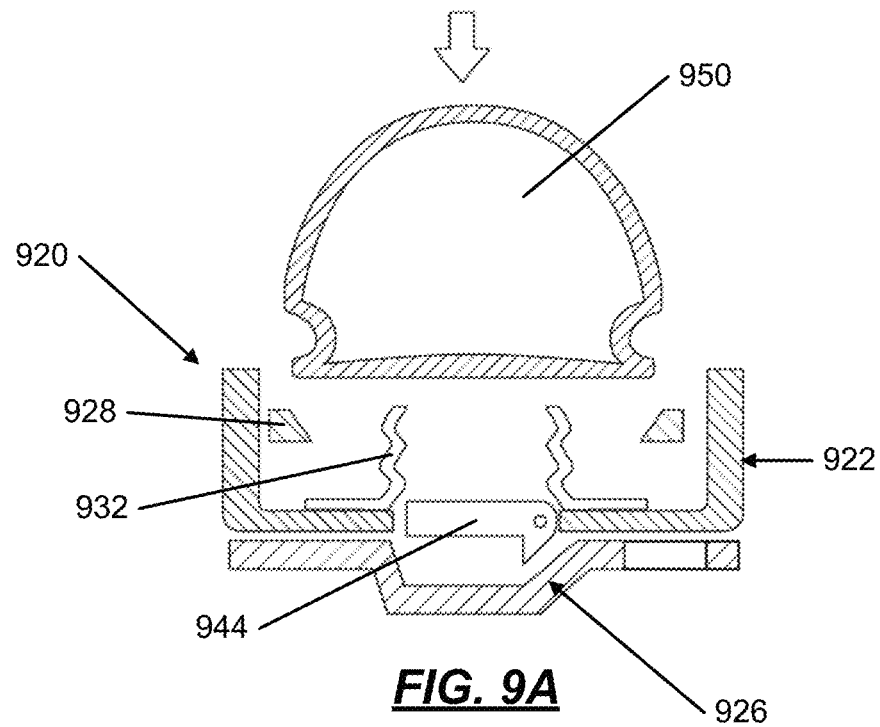
Figure 9B:
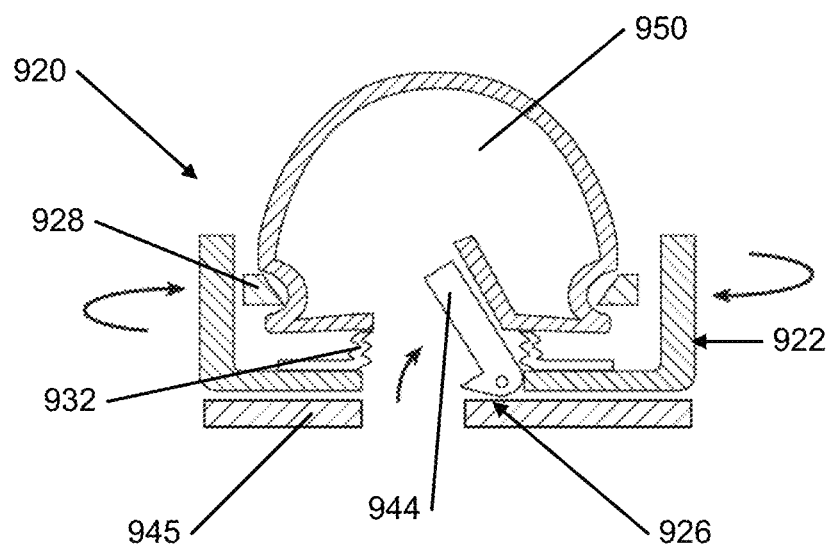

FIGS. 9A and 9B illustrate an attachment mechanism 920 with a paddle-type valve assembly 926. FIGS. 9A and 9B illustrate an example according to this invention similar to that described above in conjunction with FIGS. 1 through 4F (the same or similar reference numbers are used in FIGS. 9A and 9B as those used in FIGS. 1 through 4F to denote the same or similar parts). In another example in accordance with this invention, as shown in FIGS. 9A and 9B, the attachment mechanism 920 is generally comprised of an engagement assembly 922, a piercing portion 924, and a valve assembly 926. The engagement assembly 922 may generally receive the cartridge 950 within the attachment mechanism 920. The piercing portion 924 may generally pierce the cartridge 950, thereby releasing the contents of the cartridge 950 into the container 910. The valve assembly 926 may generally open upon engagement of the cartridge 950 with the attachment mechanism 920 thereby allowing the mixing of the contents of the container 910 with the contents of the cartridge 950.

In this example configuration, the attachment mechanism 920 requires a two-part action to attach the cartridge 950 and open the cartridge 950. First, as shown in FIG. 9A, the cartridge 950 is attached to the engagement assembly 922, wherein the engagement assembly 922 includes a latching structure 928 and a spring 932 to hold the cartridge 950 in a locked position. Once the cartridge 950 is in a locked position, as shown in FIG. 9B, the engagement assembly 922 may be twisted. As the engagement assembly 922 is twisted, the twisting action causes a cam 945 within the valve assembly 926 to rotate a valve 944 in the valve assembly 926 upward into the opening of the cartridge 950, thereby piercing the cover 960. With the valve 944 rotating upward, the valve 944 may also, simultaneously, open the container 910 to the cartridge 950 so that the contents of the container 910 and the contents of the cartridge 950 can mix. The container 910 and cartridges 950 may be any of the configurations as described in this application without departing from the invention.

Figure 10B:
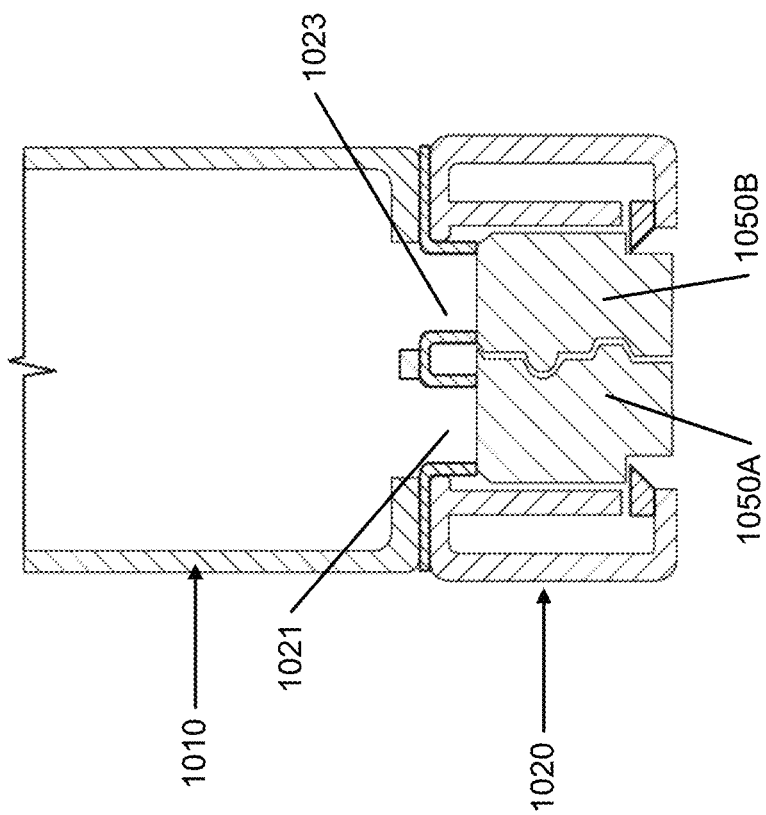
Figure 10A:
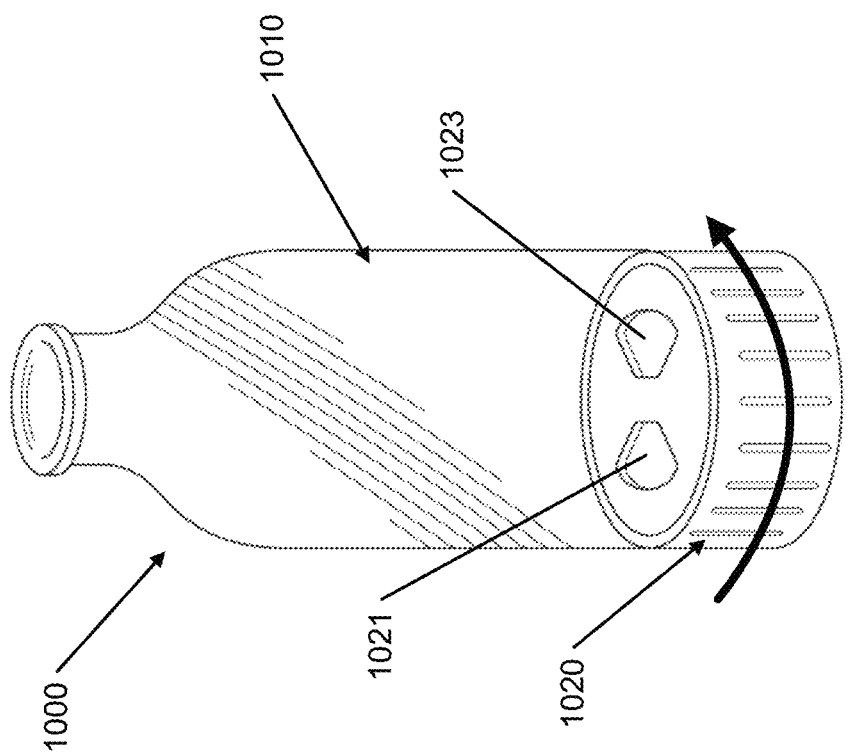

As illustrated in FIGS. 10A and 10B, in a similar configuration to the paddle-type valve assembly 1026 as described above, the attachment mechanism 1020 may be rotated to uncover a hole or a plurality of holes 1021, 1023 if more than one cartridge is used. As shown in FIGS. 10A and 10B, two cartridges 1050A, 1050B are attached to the attachment mechanism 1020 with two holes 1021, 1023 located in the attachment mechanism 1020. The rotation of the attachment mechanism 1020 may enable the mixing of the contents of the container 1010 with the contents of the pod or pods 1050A, 1050B. The attachment mechanism 1020, the container 1010, and the cartridges 1050A, 1050B may be any of the configurations as described in this application without departing from the invention.

Figure 11A:
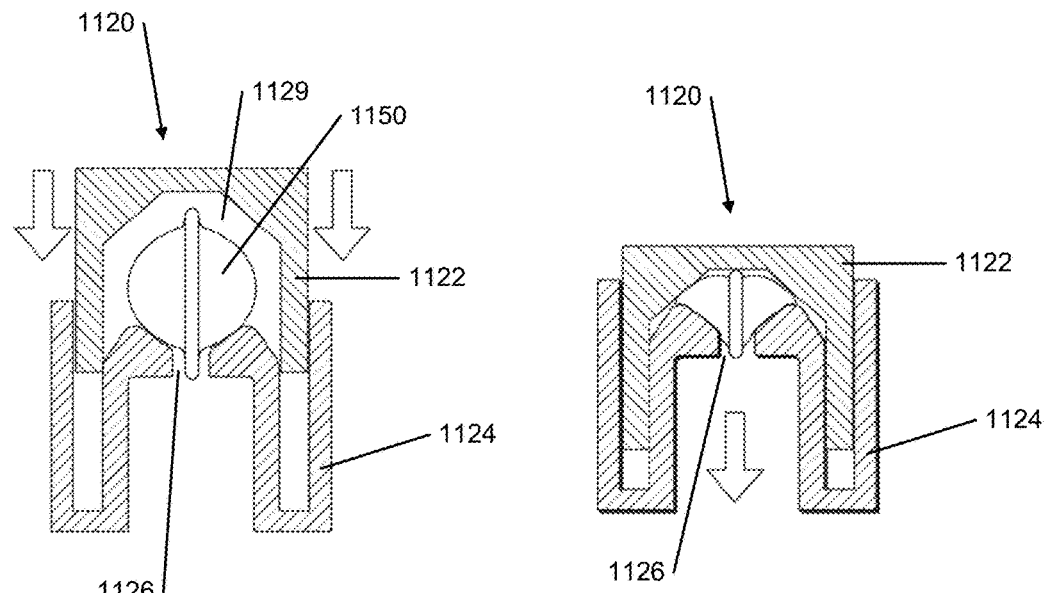
Figure 11B:
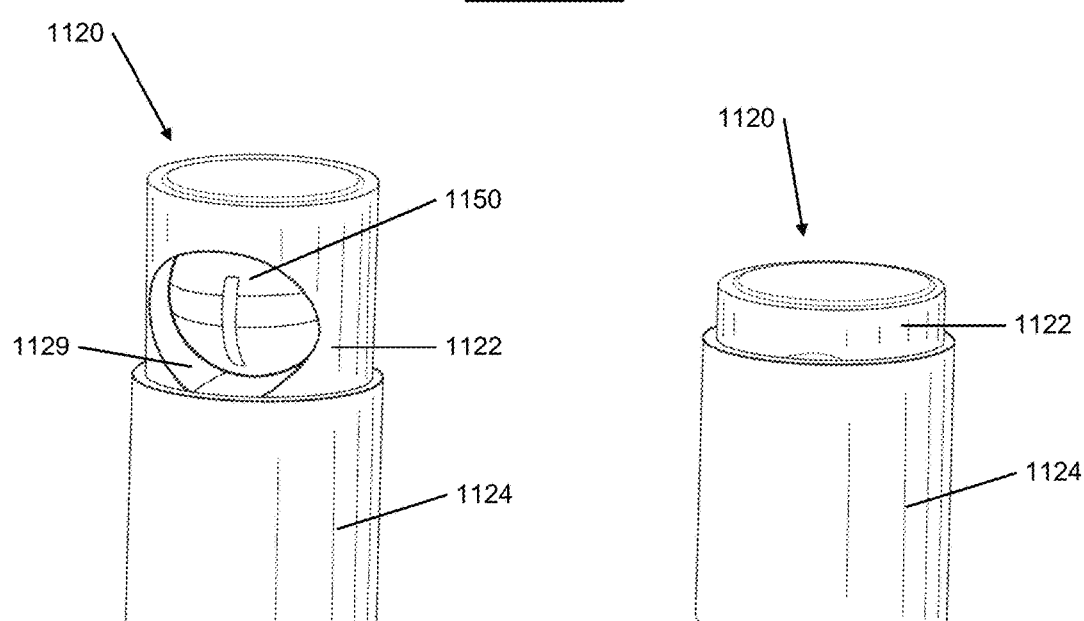

FIGS. 11A and 11B illustrate an attachment mechanism with a piston-type attachment mechanism 1120. FIGS. 11A and 11B illustrate an example according to this invention similar to that described above in conjunction with FIGS. 1 through 4F (the same or similar reference numbers are used in FIGS. 11A and 11B as those used in FIGS. 1 through 4F to denote the same or similar parts). In another example in accordance with this invention, as shown in FIGS. 11A and 11B, the attachment mechanism 1120 is generally comprised of an engagement assembly, a crushing portion, and a valve assembly. The engagement assembly may generally receive the cartridge 1150 within the attachment mechanism. The crushing portion may generally open the cartridge 1150, thereby releasing the contents of the cartridge 1150 into the container. The valve assembly may generally open upon engagement of the cartridge 1150 with the attachment mechanism 1120 thereby allowing the mixing of the contents of the container with the contents of the cartridge 1150.

In this example configuration, the engagement assembly may include a piston 1122. The attachment mechanism may also include a base 1124 wherein the crushing portion and the valve assembly may be contained. A cartridge 1150 is placed within an opening 1129 in the piston 1122, wherein the opening 1129 is located on the side of the piston 1122. The piston 1122 may then be pushed such that the cartridge 1150 is crushed or squeezed against the base 1124. As the piston 1122 is moved against the base 1124, a valve 1126 opens to the container, thereby allowing the contents of the container and the contents of the cartridge to mix. Additionally, as the piston 1122 is moved against the base 1124, the cartridge 1150 is crushed or squeezed, thereby causing the cover 1160 to open and discharge the contents of the cartridge 1150 into the container. The container and the cartridge 1150 may be any of the configurations as described in this application without departing from the invention.

FIGS. 12A and 12B illustrate an attachment mechanism with a rotating cam type attachment mechanism 1220. FIGS. 12A and 12B illustrate an example according to this invention similar to that described above in conjunction with FIGS. 1 through 4F (the same or similar reference numbers are used in FIGS. 12A and 12B as those used in FIGS. 1 through 4F to denote the same or similar parts). In another example in accordance with this invention, as shown in FIGS. 12A and 12B, the attachment mechanism 1220 is generally comprised of an engagement assembly, a crushing portion, and a valve assembly. The engagement assembly may generally receive the cartridge 1250 within the attachment mechanism. The crushing portion may generally open the cartridge, thereby releasing the contents of the cartridge 1250 into the container. The valve assembly may generally open upon engagement of the cartridge 1250 with the attachment mechanism 1220 thereby allowing the mixing of the contents of the container with the contents of the cartridge 1250.

In this example configuration, the engagement assembly may include a cam assembly 1222 and a base 1224. The cam assembly 1222 may also include two cams 1229. The cartridge 1250 may be inserted in between the two cams 1229 through the top of the attachment mechanism 1220. The two cams 1229 may be attached to the cam assembly 1222, such that as the base 1224 and cam assembly 1222 is rotated, the cams 1229 press inward. As the cams 1229 press inward the cams 1229 crush or squeeze the cartridge 1250 within the cams 1229, thereby causing the cover of the cartridge 1250 to open and discharge the contents of the cartridge 1250 into the container. The container and the cartridge 1250 may be any of the configurations as described in this application without departing from the invention.

Figure 13A:
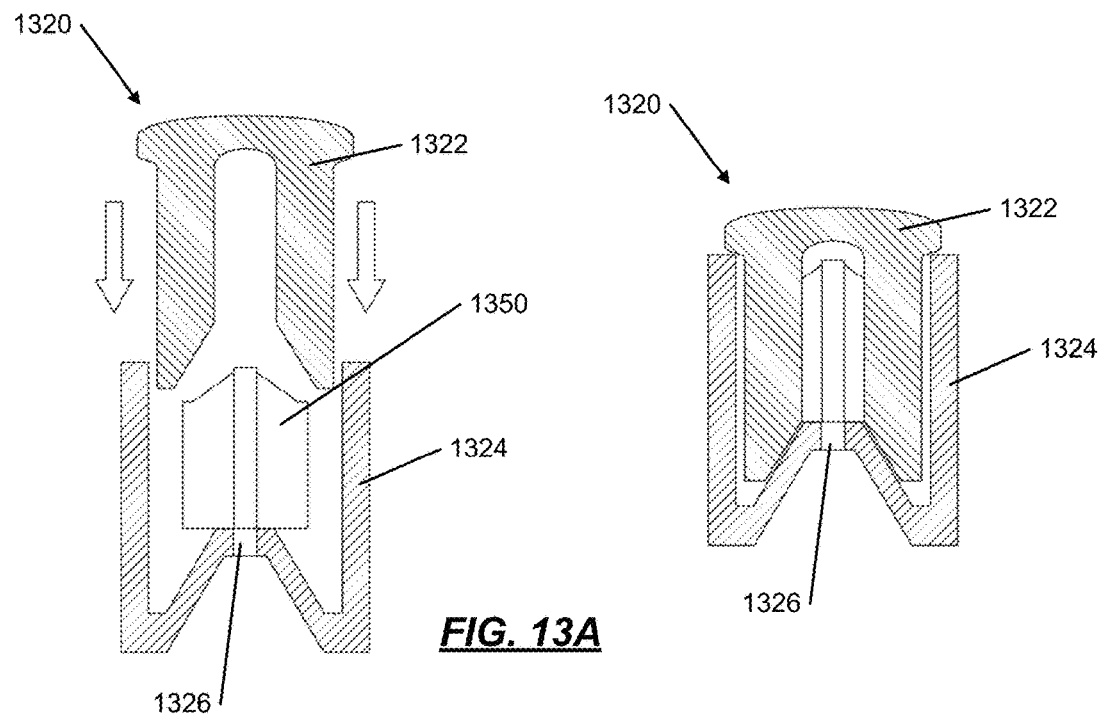
Figure 13B:
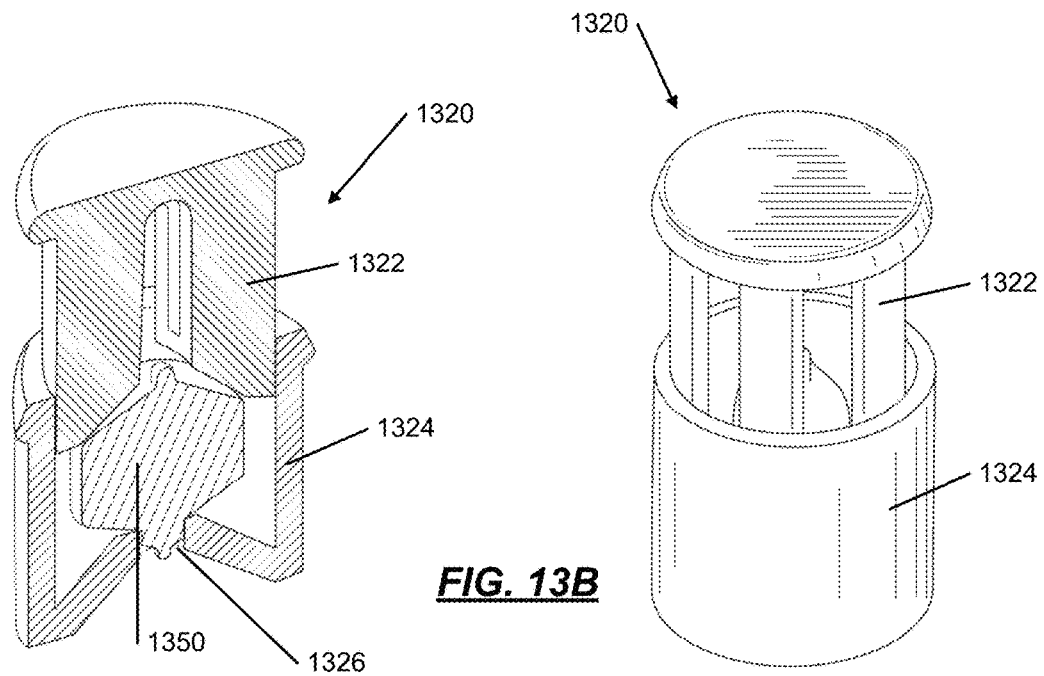

FIGS. 13A and 13B illustrate an attachment mechanism with a plunger-type attachment mechanism 1320. FIGS. 13A and 13B illustrate an example according to this invention similar to that described above in conjunction with FIGS. 1 through 4F (the same or similar reference numbers are used in FIGS. 13A and 13B as those used in FIGS. 1 through 4F to denote the same or similar parts). In another example in accordance with this invention, as shown in FIGS. 13A and 13B, the attachment mechanism 1320 is generally comprised of an engagement assembly, a crushing portion, and a valve assembly. The engagement assembly may generally receive the cartridge 1350 within the attachment mechanism. The crushing portion may generally open the cartridge 1350, thereby releasing the contents of the cartridge 1350 into the container. The valve assembly may generally open upon engagement of the cartridge 1350 with the attachment mechanism thereby allowing the mixing of the contents of the container with the contents of the cartridge 1350.

In this example configuration, the engagement assembly may include a plunger 1322. The attachment mechanism 1320 may also include a base 1324 wherein the crushing portion and the valve assembly may be contained. A cartridge 1350 is placed in the top of the base 1324. The plunger 1322 may then be pushed such that the cartridge 1350 is crushed or squeezed between the plunger 1322 and the base 1324 of the attachment mechanism 1320. As the plunger 1322 is moved against the base 1324 of the attachment mechanism 1320, a valve 1326 may open to the container, thereby allowing the contents of the container and the contents of the cartridge 1350 to mix. As the plunger 1322 is moved against the base 1324 of the attachment mechanism 1320, the cartridge 1350 is crushed or squeezed, thereby causing the cover to open and discharge the contents of the cartridge 1350 into the container. Additionally, the plunger 1322 may contain a piercing needle (not shown) wherein the piercing needle pierces the cartridge 1350 as the plunger 1322 is pushed into the base 1324 of the attachment mechanism 1320. The container and the cartridge 1350 may be any of the configurations as described in this application without departing from the invention.

Figure 24:
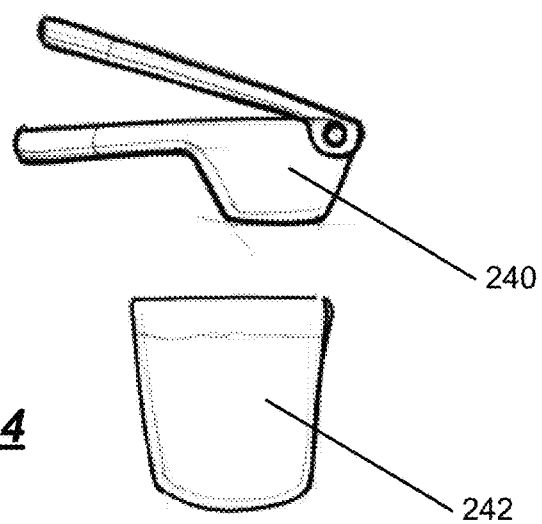
FIG. 24 illustrates an alternative example of a beverage system in accordance with the present invention.

Additional attachment mechanisms may be utilized without departing from this invention. Attachment mechanism such as: threaded connections between the container and the attachment mechanism instead of the snap feature as described above; quarter-turn connections between the container and the attachment mechanism instead of the snap feature as described above; a hand-tool 240 similar to a nut-cracker which holds a cartridge and can pierce and open the cartridge by use of the hand-tool 240 and thus pouring the contents of the cartridge into a glass 242 (as shown in FIG. 24).

FIGS. 14A through 14C illustrate additional cartridge configurations according to examples of this invention. As illustrated in FIGS. 14A through 14C, in another example cartridge configuration, the cartridge 1450 may be comprised of multiple pods. As illustrated in FIGS. 14A and 14B, the cartridge may comprise two half pods 1450A, 1450B, wherein each of the half pods 1450A, 1450B can be combined to make one singular pod 1450. The contents of each pod 1450A, 1450B may then be mixed with water or other liquid to form the desired beverage. Each half pod 1450A, 1450B may contain syrup, paste, powder, granules or other compositions that when mixed with water or other liquids will result in a beverage. In an alternative aspect of the invention, the half pod 1450A, 1450B may contain an energy boost, nutrients, or vitamin supplement that can be added to the beverage. The two half pods 1450A, 1450B may be inserted into an attachment mechanism 1420 located at the bottom of a container 1410 as shown in FIG. 14C. Alternatively, the cartridge 1450 may include three or more pods.

In another example cartridge configuration, the beverage dispensing system may include multiple attachment mechanisms, piercing portions, and valve assemblies, such that multiple cartridges may be inserted for a single container or beverage dispensing system. The contents of each cartridge may then be mixed with water or other liquids to form the desired beverage. Each cartridge may contain syrup, paste, powder, granules or other compositions that when mixed with water or other liquids will result in a beverage. In an alternative aspect of the invention, one or more of the cartridges may contain an energy boost or vitamin supplement that can be added to the beverage. Additionally, one or more of the cartridges may be a different size, such as smaller or larger, than the other cartridges.

In another example cartridge configuration, the cartridge may be comprised of multiple chambers each containing the same or different beverage-making component. Multiple chambers may be beneficial when there are unstable ingredients that must remain separate as part of the beverage. The contents of each chamber may then be mixed with water or other liquids to form the desired beverage. Each chamber may contain syrup, paste, powder, granules or other compositions that when mixed with water or other liquids will result in a beverage. In an alternative aspect of the invention, one of the chambers may contain an energy boost or vitamin supplement that can be added to the beverage.

Figure 15:
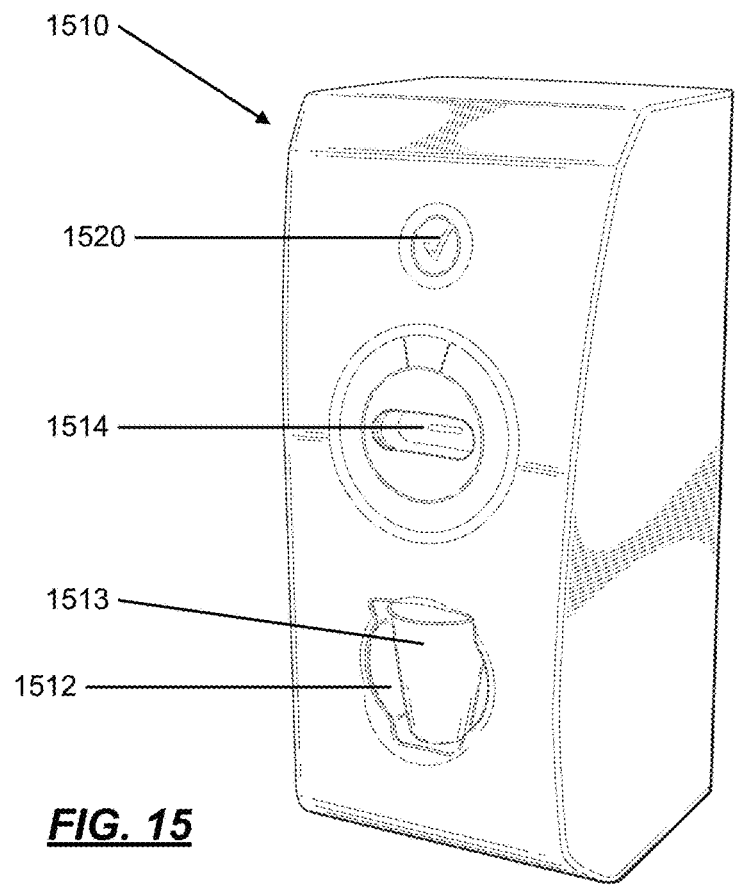
FIGS. 15, 16, and 17 illustrate various examples of an alternative beverage system in accordance with the present invention.
Figure 16:
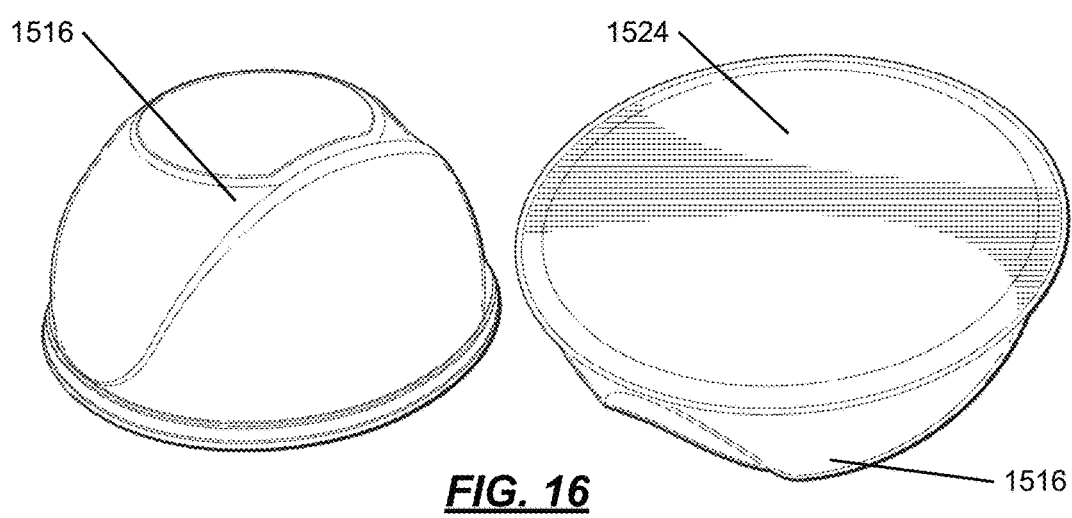
Figure 17:
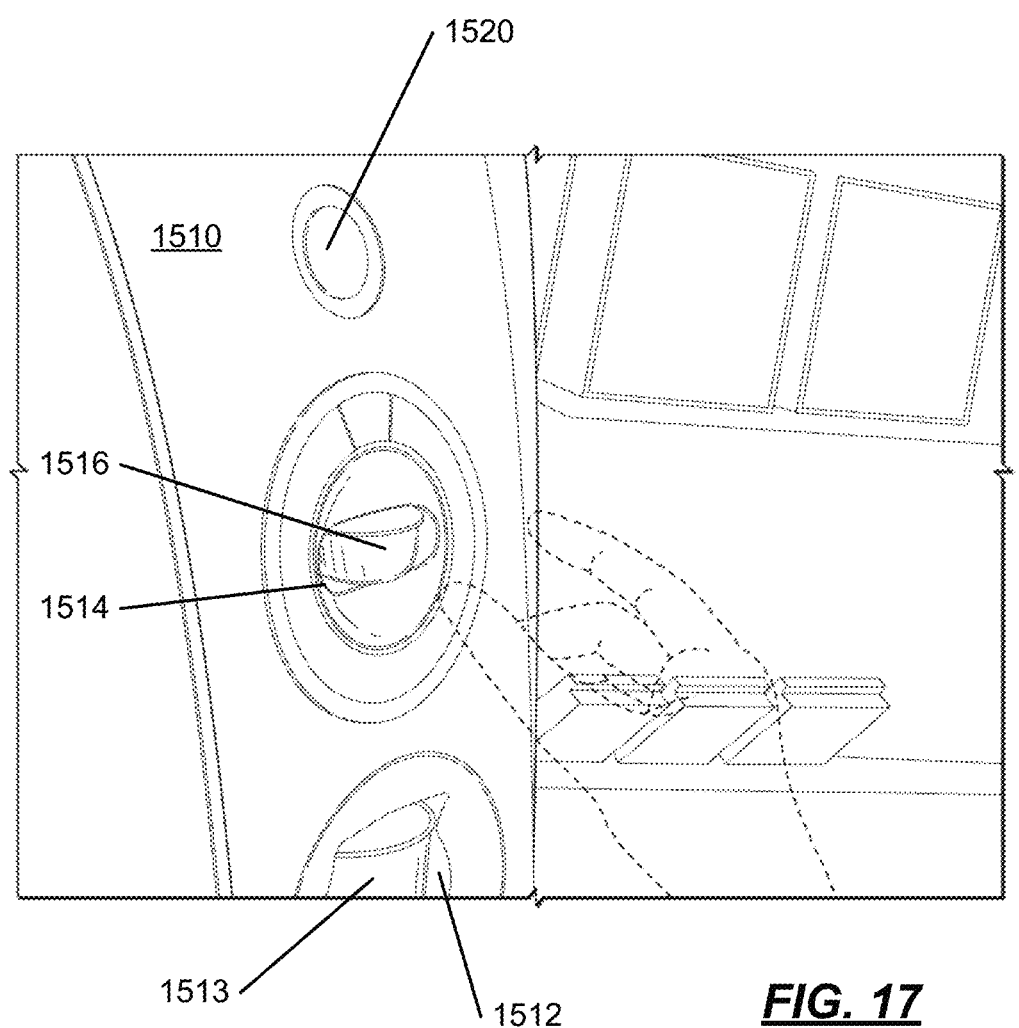

In another example in accordance with this invention, a beverage dispensing system is directed at a single-serve beverage dispensing system. The beverage dispensing system is directed to overcome the drawbacks and problems with existing beverage dispensing or delivery systems. A single-serve beverage dispensing system is disclosed in FIGS. 15-18C. As illustrated by FIGS. 15-18C, the single-serve beverage dispensing system dispenses a metered amount of water or other liquid through a syrup-containing cartridge having the proper amount of syrup to create a single-serve beverage, for example, a soft drink. As illustrated by FIGS. 15-17, the beverage dispensing system of the invention permits a consumer in a retail environment or at home to create a single-serve beverage by selecting a cartridge containing the desired beverage ingredients and placing the cartridge into the beverage dispensing system. The consumer then presses a button which activates the beverage mixing operation of the system. Once activated, a needle operatively connected to a water or other liquid supply will drop down and puncture the cartridge through the top and bottom of the cartridge. For a predetermined period of time, the needle will remain in and partially extending through the cartridge. While the needle is positioned in the cartridge, water or other liquids are directed to the needle and allowed to pass through an opening in the end of the needle and through a plurality of apertures positioned around the periphery of the needle. The water or other liquids passing through the plurality of apertures will enter the cartridge and mix with the syrup contained in the cartridge. Once mixed, the beverage will pass through the punctured opening created in the bottom of the cartridge and drop into a cup positioned beneath the cartridge. Water or other liquids will additionally flow out through the opening in the end of the needle to further create the proper consistency and flavor of the beverage. After the beverage has been dispensed into the cup, the consumer may remove the cup and enjoy the beverage. The used cartridge may then be discarded.

More specifically, and referring to FIGS. 15-17, in an exemplary embodiment, the beverage system 1508 includes a dispenser housing 1510 that includes openings 1512 and 1514 formed in the housing. Opening 1512 is sized and shaped to receive a beverage cup 1513 for receiving and containing the created beverage dispensed from the beverage system. Opening 1514 is sized and shaped to receive a cartridge 1516 that contains syrup, which is mixed with water or other liquids to make the beverage. The opening 1514 and cartridge 1516 define a mating configuration in that the cartridge 1516 is shaped to match the shape of the opening 1514, and vice versa. With this configuration, only cartridges having a shape that matches the shape of the opening 1514 can be inserted into the opening 1514, thereby preventing undesirable or non-matching cartridges or containers from being used with the beverage system. The beverage system further includes a button or switch 1520 that a consumer presses to activate the beverage system.

Figure 25:
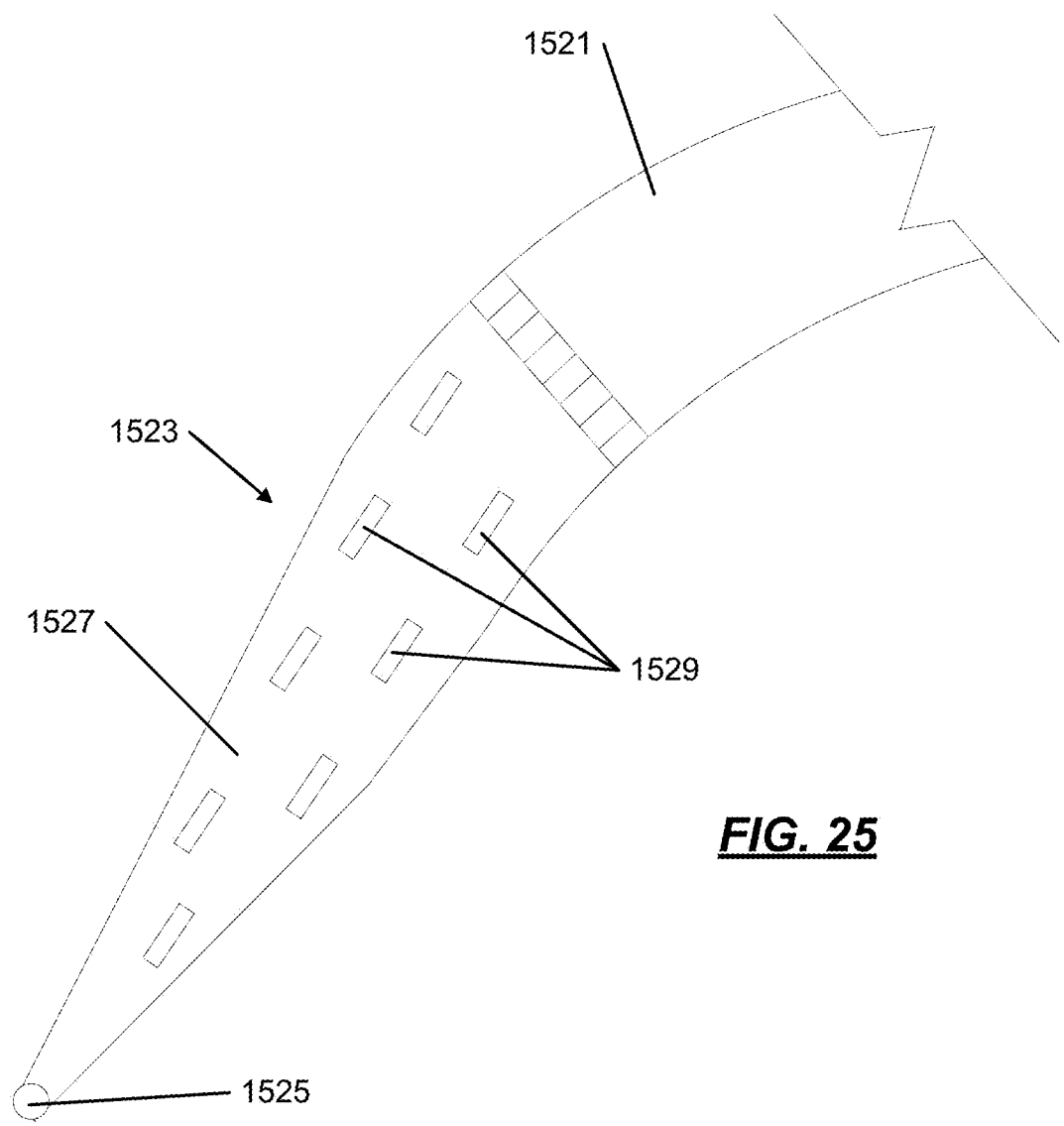
FIG. 25 illustrates an example needle to be used with the beverage system in FIGS. 15 through 17 in accordance with the present invention.

Positioned within the housing 1510 is a water (or other liquid) supply system that includes a water supply line 1521 operatively connected at one end to a water source, and at an opposing end to a needle 1523. The water (or other liquid) source may be either carbonated or non-carbonated water, or may be any other suitable liquid that can be mixed with the syrup contained within the cartridge. As illustrated in FIG. 25, the needle 1523 defines a pointed or sharp open end 1525 that as explained above is used to puncture the cartridge 1516. The needle 1523 further defines an elongated tube-like body 1527 that further defines a plurality of apertures 1529 positioned around the periphery of the tube body 1527 of the needle 1523. Once positioned within the cartridge 1516, the apertures 1529 permit water or other liquids traveling through the tube body 1527 to pass into the cartridge 1516 to mix with syrup contained with the cartridge 1516. As should be understood, the needle 1523 may define numerous other configurations that permit the puncturing of the cartridge 1516 and passing of water or other liquids into the cartridge 1516.

The cartridge 1516 may define a single chamber, or may define multiple chambers each containing the same or different beverage-making component. The contents of each chamber may then be mixed with water or other liquid to form the desired beverage. Each chamber may contain syrup, paste, powder, granules or other compositions that when mixed with water or other liquids will result in a beverage. In an alternative aspect of the invention, the cartridge may contain an energy boost or vitamin supplement that can be added to the beverage.

As illustrated in FIG. 16, the cartridge may define a dome-shaped configuration made of a plastic material. The dome shape creates the one or more chambers within the cartridge. Aluminum foil 1524 or a similar sealing material may be positioned across the cartridge to seal the contents within the cartridge. The aluminum foil may include product information or other indicia printed thereon, or may contain instructions as to how to use the cartridge and/or beverage system. The use of aluminum foil and plastic with the cartridge permits the needle to easily penetrate and puncture the foil and plastic. It should be understood that numerous other shapes and configurations of the cartridge are possible and that the depicted dome shape is merely exemplary of the numerous alternative configurations.

Figure 18A:
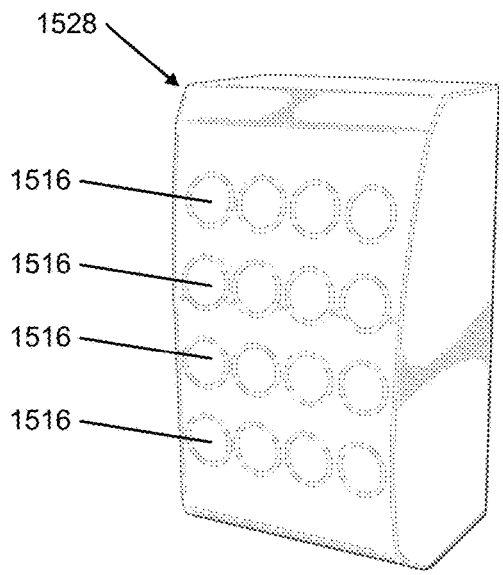
FIGS. 18A, 18B, 18C, 19, 20, 21, 22, and 23 illustrate various examples of beverage systems that may be used in numerous configurations in accordance with the present invention.
Figure 18B:
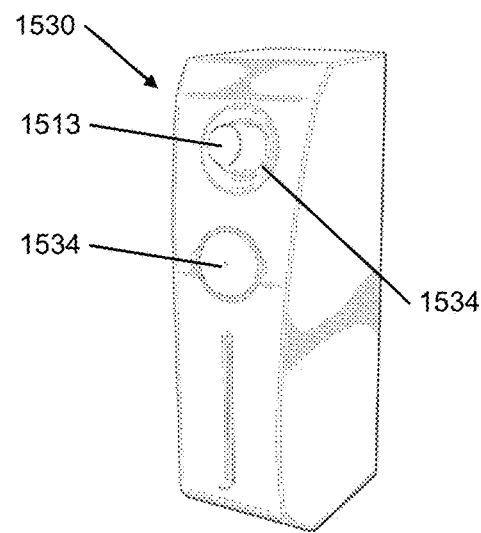
Figure 18C:
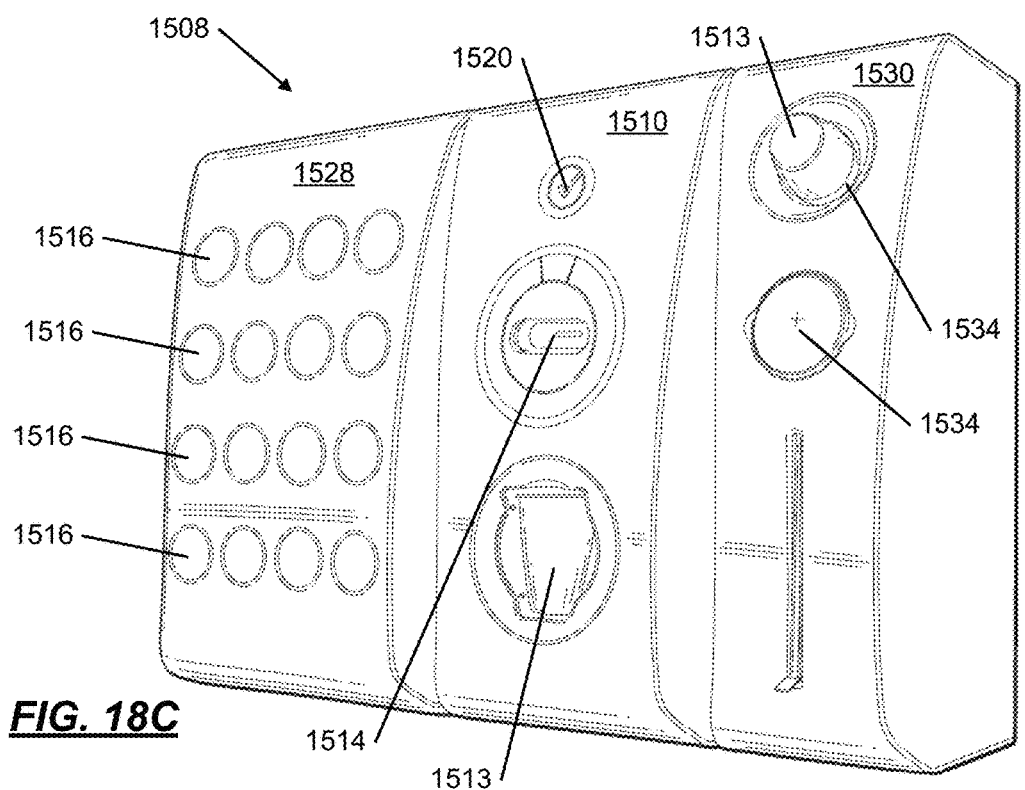

Referring to FIGS. 18A through 18C, the beverage system 1508 may also include a housing 1528 containing numerous cartridges each containing a different beverage flavor or ingredient giving the consumer numerous choices for a beverage, unlike the limited options with existing beverage systems. In one embodiment, the cartridges may be positioned in an array with the product information relating to the cartridge readily visible to the consumer, the array creating an aesthetically pleasing consumer impression. The housing may contain various eye-catching colors and advertisements to attract the attention of the consumers. The beverage system 1508 may also include a cup-holding housing 1530 that contains numerous stacked cups 1513 that are also readily accessible to a consumer. The housing 1530 may include one or more cup-holding openings 1534 to accommodate multiple sized cups. The beverage housings 1510, 1528 and 1530 are all modular to provide flexibility in placing the beverage system within a retail store environment to enhance the visibility of the system, and are sufficiently lightweight and compact to permit each to sit on top of a counter within the store, or at any other desired location within the store.

Figure 19:
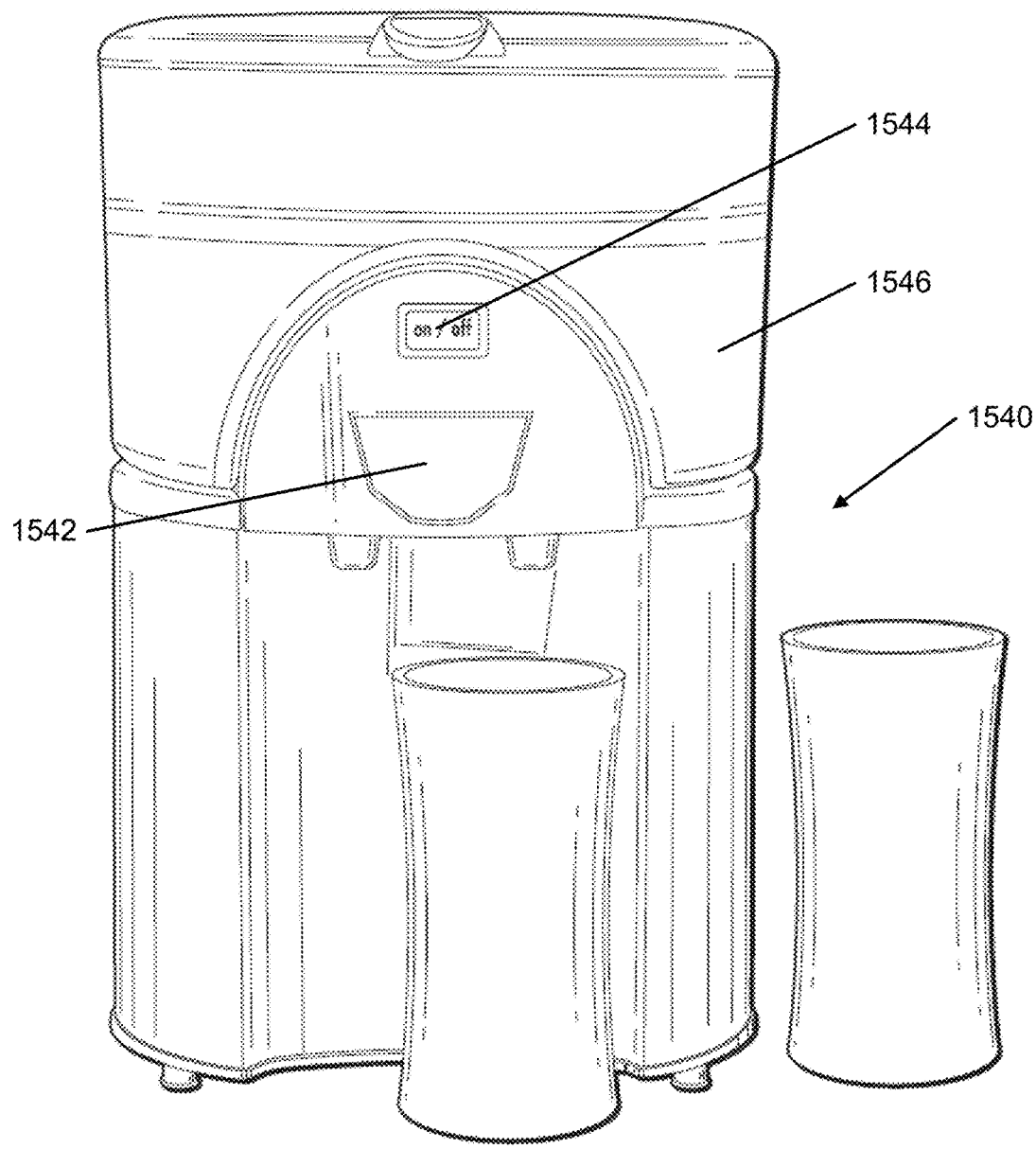
Figure 20:
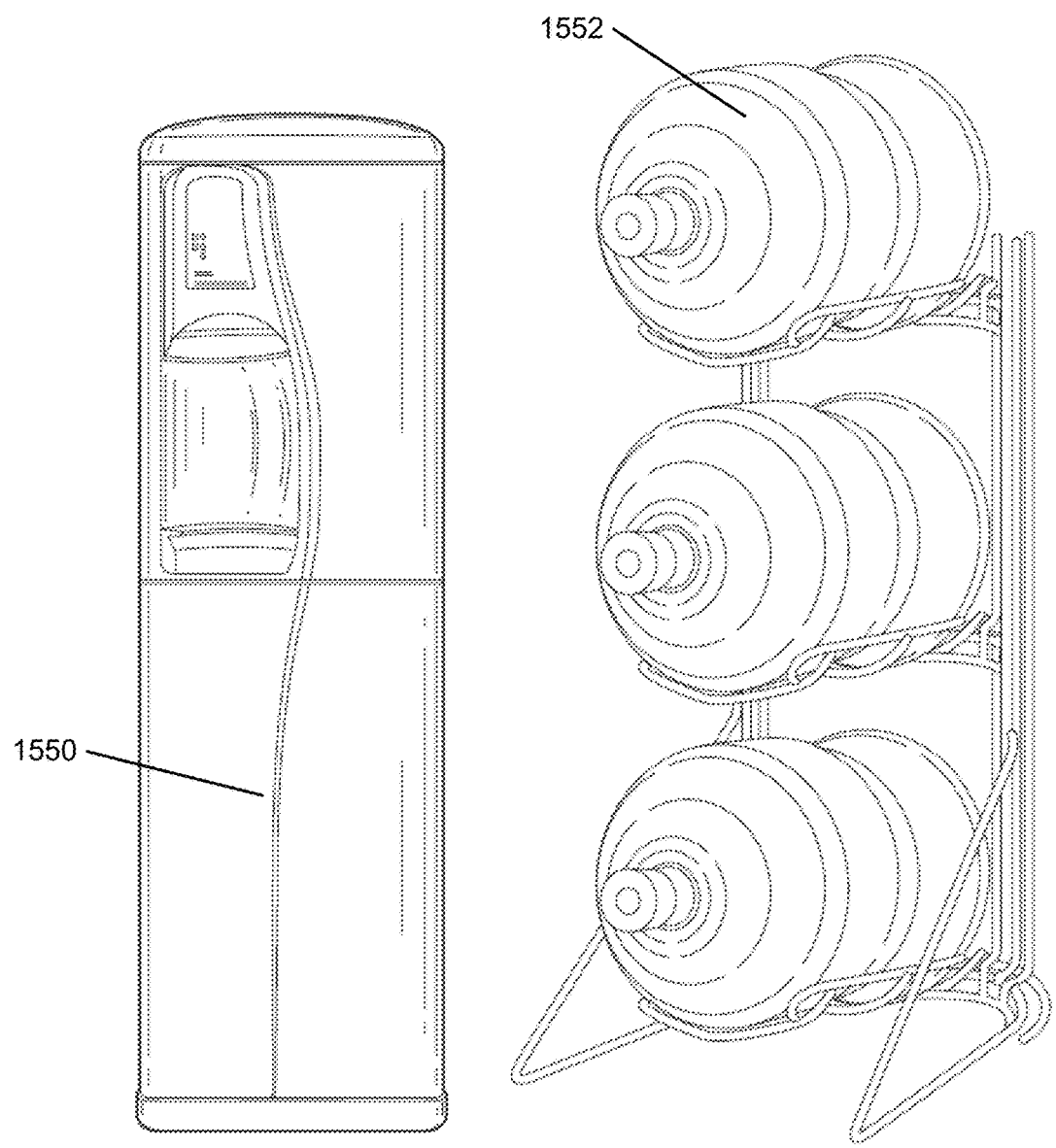

Referring to FIGS. 19-23, the beverage system may be packaged in numerous configurations. FIG. 19 depicts a beverage system 1540 that may be used at home where a cartridge may be placed within the opening 1542 and upon pressing the dispensing button 1544, water or other liquids stored within water housing 1546 mixes with the contents of the cartridge, similar to the manner described above, to make the desired beverage. FIG. 20 depicts yet another beverage system 1550 that operates in the same manner as described herein but utilizes large water containers 1552, similar to those used in drinking coolers. Still other packaging options are possible with the invention.

Figure 21:
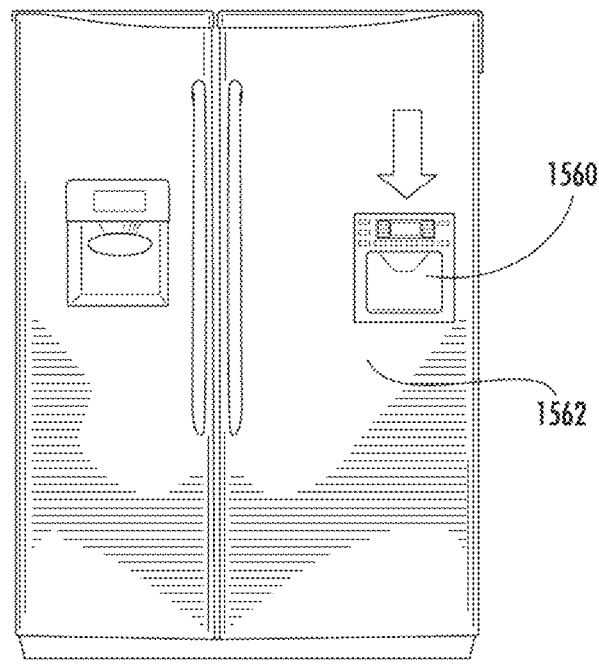
Figure 22:
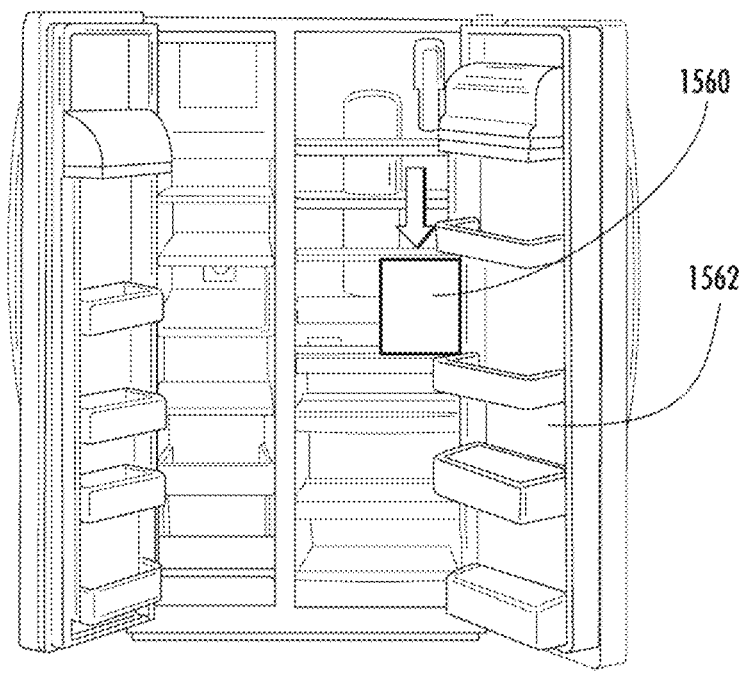
Figure 23:
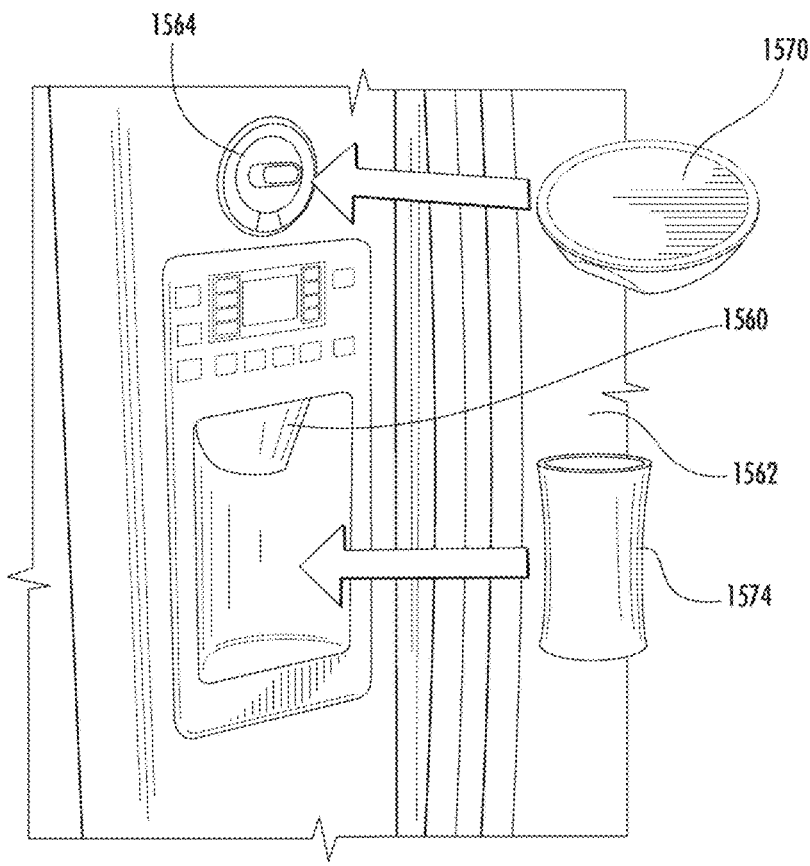

Referring to FIGS. 21-23, the beverage system 1560 may be configured with a refrigerator 1562. The beverage system 1560 may be mounted in or to the refrigerator, or attached as a stand-alone unit to the refrigerator. If the beverage system 1560 is mounted in or to the refrigerator, the system 1560 may be accessible from the exterior of the refrigerator (FIGS. 21 and 23) or may be accessible from the interior of the refrigerator (FIG. 22). As illustrated in FIG. 22, the beverage system may be mounted within a compartment located within the refrigerator. As illustrated in FIG. 23, the beverage systems may be incorporated with the ice/water dispensing system of the refrigerator. With each of these alternative embodiments, the beverage system 1560 may be attached to the drinking water supply of the refrigerator. If the beverage system 1560 is attached to the refrigerator as a stand-alone unit, it may be connected to the drinking water supply of the refrigerator. As with the other embodiments described herein, the cartridge 1570 may be placed within an opening 1564 and upon pressing the dispensing button, water from refrigerator 1562 mixes with the contents of the cartridge, similar to the manner described above, to make the desired beverage, which will then be dispensed into a cup 1574.

FIGS. 26A through 29C illustrate an example beverage dispensing system according to this invention similar to that described above in conjunction with FIGS. 1 through 4F (the same or similar reference numbers are used in FIGS. 26A through 29C as those used in FIGS. 1 through 4F to denote the same or similar parts). FIGS. 26A through 29C disclose another embodiment of a beverage dispensing system 2600 and specifically a post-mix beverage system with cartridge storage compartment 2690. The beverage dispensing system 2600 as illustrated in FIGS. 26A through 29C includes a container 2610 with an attachment mechanism 2620 and a cartridge storage compartment 2690.

As shown in FIGS. 26A through 27B, the beverage dispensing system 2600 is generally comprised of a container 2610, an attachment mechanism 2620, a cartridge 2650, and a cartridge storage compartment 2690. The container 2610 may hold a mixing solution or liquid, such as water, to be mixed with the contents of the cartridge 2650. The cartridge 2650 generally engages with the attachment mechanism 2620 to load, engage, and dispense a cartridge (pod) 2650 containing concentrated beverage syrup to be dispensed into the container 2610, thereby combining the contents of the cartridge 2650 with the liquid within the container 2610 to create a drinkable beverage. The cartridge storage compartment 2690 may be located in a base 2614 of the container 2610 opposite the attachment mechanism 2620 and be sized and shaped to hold one or more additional or extra cartridges 2650.

Figure 26A:
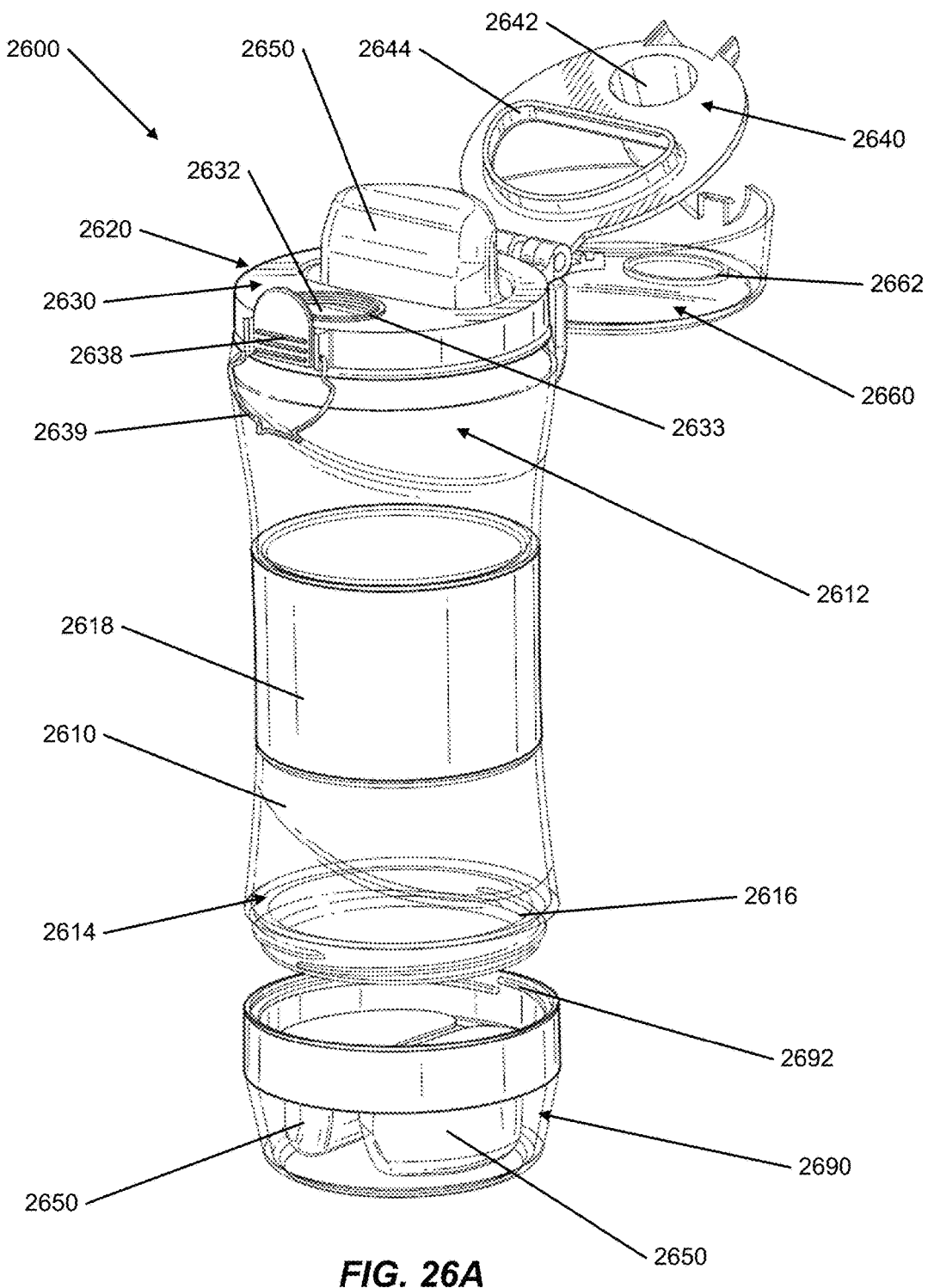
FIGS. 26A and 26B illustrate a perspective view of alternative example beverage dispensing system in accordance with the present invention.
Figure 26B:
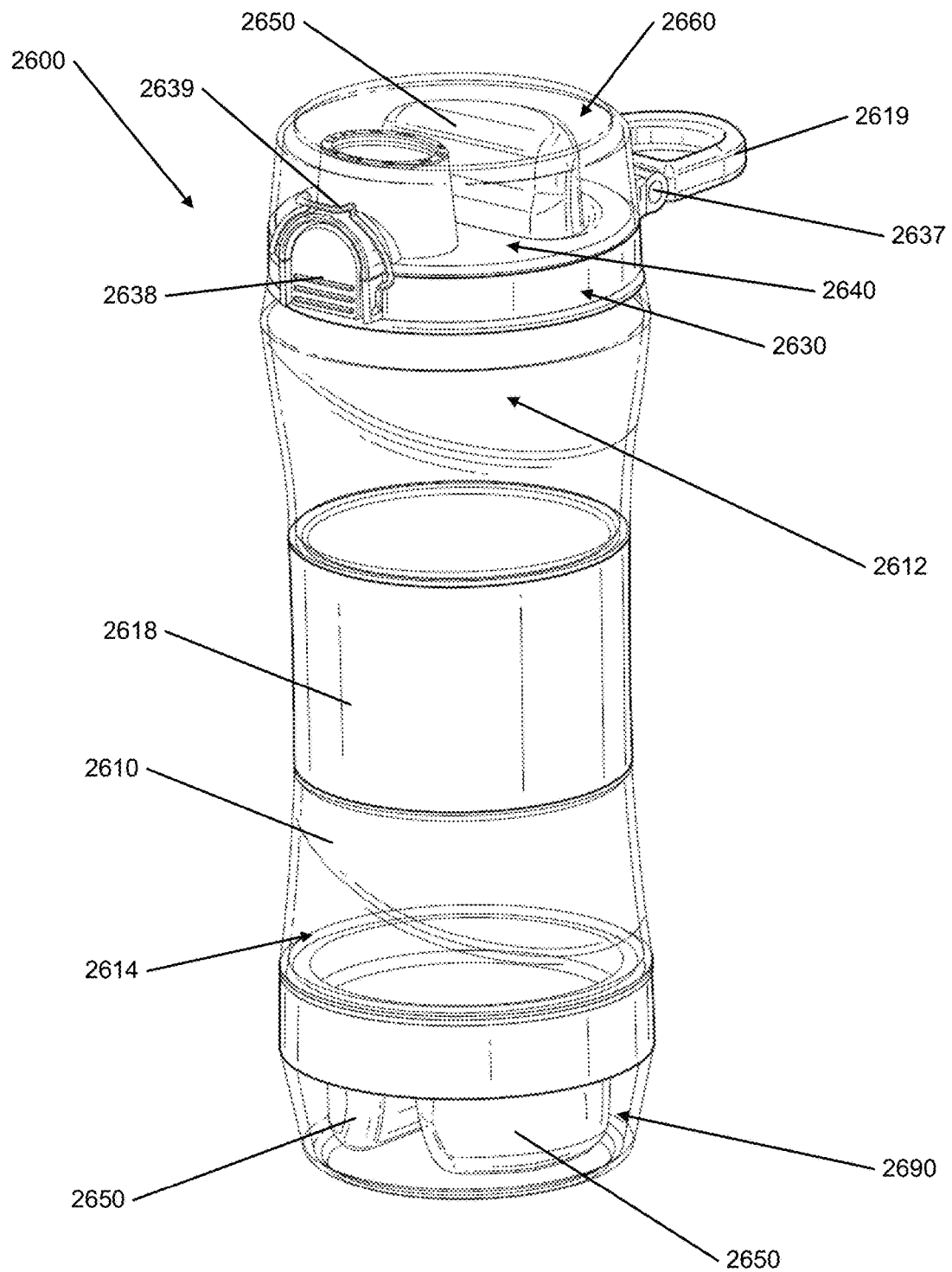
Figure 27A:
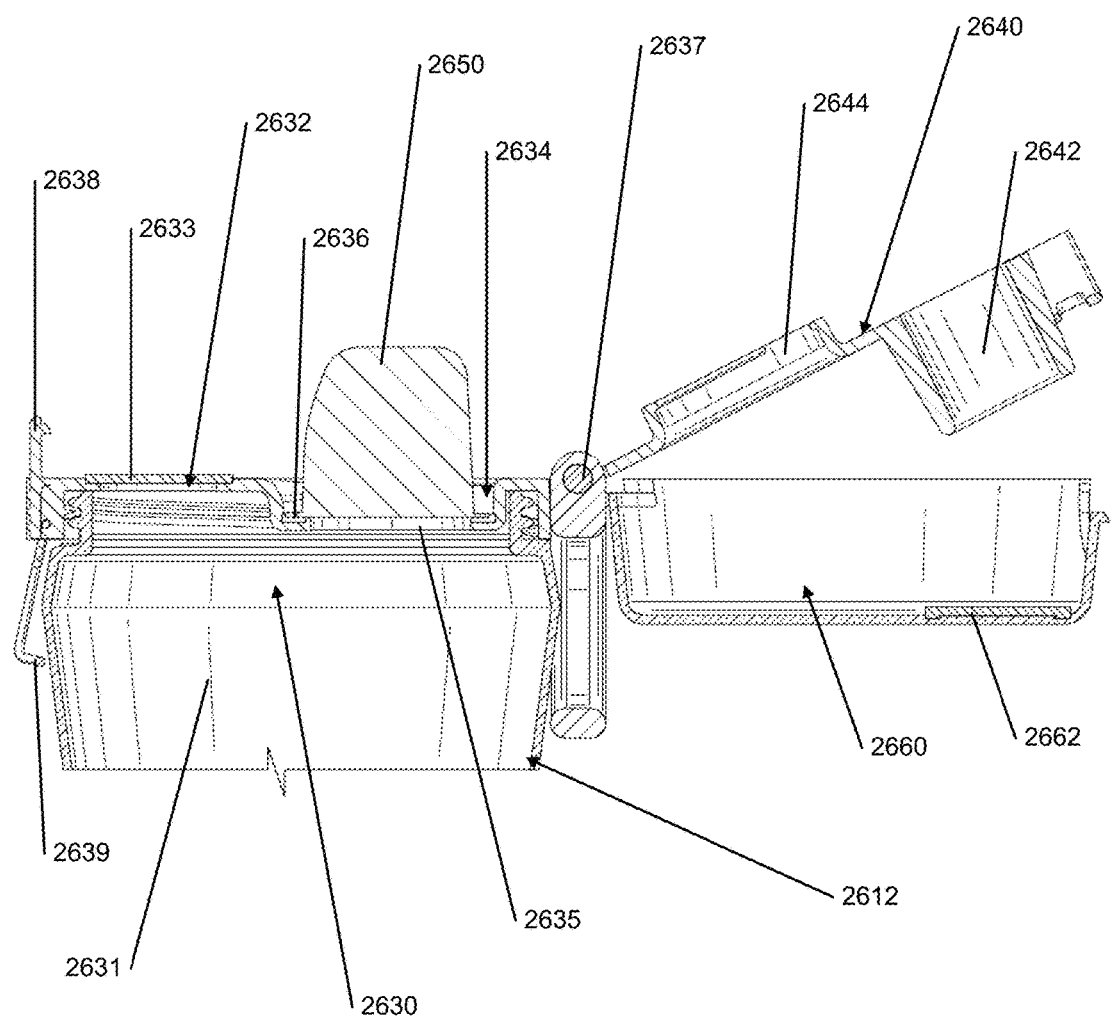
FIGS. 27A and 27B illustrate close-up perspective views of the alternative example beverage dispensing system in FIGS. 26A and 26B in accordance with the present invention.
Figure 27B:
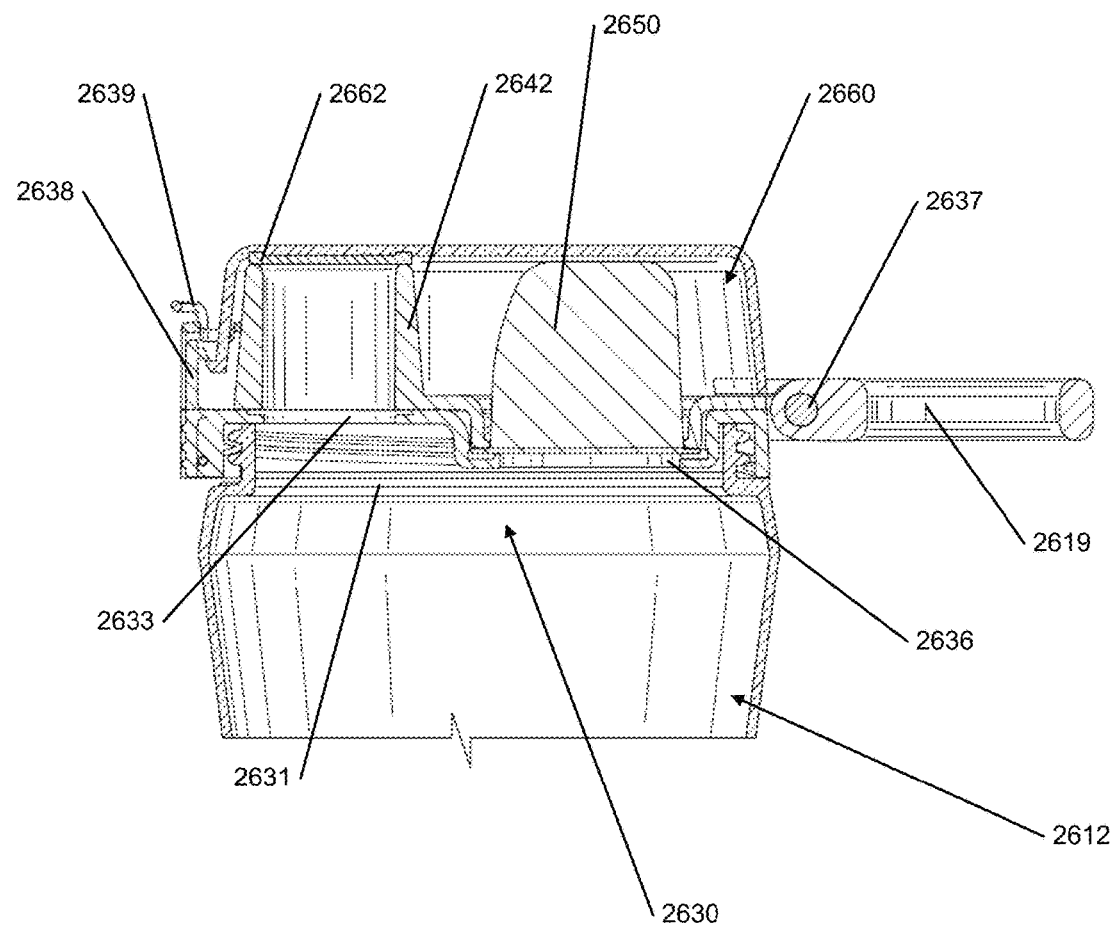

The container 2610, as illustrated in FIGS. 26A and 26B, may be generally in the shape of a bottle. The container 2610 may be a variety of other shapes, without departing from this invention. The container 2610 may include an attachment mechanism 2620 that engages a top portion 2612 of the container 2610. The attachment mechanism 2620 may include a closure base 2630, a spout portion 2640, and an overlid 2660. The spout portion 2640 and the overlid 2660 may be hingedly attached to the closure base 2630. The spout portion 2640 and the overlid 2660 may be in an open position or a closed position. FIGS. 26A and 27A illustrate the spout portion 2640 and the overlid 2660 rotated in the open position. FIGS. 26B and 27B illustrate the spout portion 2640 and the overlid 2660 rotated in the closed position. The spout portion 2640 may hingedly rotate from the open position to the closed position onto the closure base 2630. The overlid 2660 may hingedly rotate from the open position to the closed position onto the spout portion 2640.

The closure base 2630 may include threads 2631 that may engage threads 2614 located on the top portion 2612 of the container 2610. The attachment mechanism 2620 and closure base 2630 may also attach to the container 2610 in other various methods without departing from this invention. The closure base 2630 may include a hole or opening 2632 to the inside of the container 2610. The hole or opening 2632 may line up with a drinking spout 2642 of the spout portion 2640. The hole or opening 2632 of the closure base 2630 may also include a container seal 2633. The container seal 2633 seals the area around the hole or opening 2633 to the drinking spout 2642 when the spout portion 2640 is in the closed position. The container seal 2633 ensures that the liquid or solution is contained within the cartridge 2650. The container seal 2633 may include a gasket, o-ring, or grommet or other sealing structures in accordance with this invention. The container seal 2633 may be made of rubber, plastic, or metal or other materials in accordance with this invention.

The closure base 2630 may also include a cartridge receptacle 2634. The cartridge receptacle 2634 may be sized and shaped to receive and hold a cartridge 2650. The cartridge 2650 may be set or placed into the cartridge receptacle 2634 with a top portion of the cartridge 2650 facing downward towards the container 2610. The cartridge receptacle 2634 may also include a cutting portion 2635 that includes a set of teeth or edges that may cut or pierce the top or the cartridge 2650. The cutting portion 2635 may generally cut or pierce the cartridge 2650, thereby releasing the contents of the cartridge 2650 into the container 2610.

The closure base 2630 may include a cartridge seal 2636. The cartridge seal 2636 seals the area around the cartridge receptacle 2634 to the cartridge 2650 when the cartridge 2650 is pressed onto the cartridge receptacle 2634 and the spout portion 2640 is in the closed position. The cartridge seal 2636 ensures that the contents of the cartridge 2650 are contained within the cartridge 2650 and do not leak out of the cartridge 2650 when the cartridge 2650 is opened. The cartridge seal 2636 may include a gasket, o-ring, or grommet or other sealing structures in accordance with this invention. The cartridge seal 2636 may be made of rubber, plastic, or metal or other materials in accordance with this invention.

The closure base 2630 may include a hinged portion 2637 that hingedly attaches the spout portion 2640 and the overlid 2660. The spout portion 2640 and/or the overlid 2660 may swing to an open position, as illustrated in FIGS. 26A and 27A. When the spout portion 2640 and the overlid 2660 are in the open position, the cartridge 2650 can be inserted into the cartridge receptacle 2634 of the closure base 2630. After the cartridge 2650 is inserted into the cartridge receptacle 2634, the spout portion 2640 and the overlid 2660 may be rotated to a closed position, as illustrated in FIGS. 26B and 27B. When the spout portion 2640 and the overlid 2660 are in the closed position, the beverage may be mixed and the beverage will be contained in the container 2610. When the overlid 2660 is in the open position and the spout portion 2640 is in the closed position, the user may drink from the container 2610. Additionally, the container 2610 and spout portion 2640 may include a drinking spout 2642 located at the top 2612 of the container 2610.

Furthermore, the closure base 2630 may include a locking portion or locking member 2638. The locking portion or locking member 2638 may cooperate with the spout portion 2640 and the overlid 2660 to lock each of those structures in the closed position. Various locking portions or locking members may be utilized without departing from this invention. The locking portion or locking member 2638 illustrated in FIGS. 26A through 27B is a snap-lock structure with a rotating and locking D-ring 2639.

The spout portion 2640 may include a drinking spout 2642 and a cartridge pressure member 2644. The cartridge pressure member 2644 may be shaped similar to the outside of the cartridge 2650. When the spout portion 2640 is rotated to the closed position, the cartridge pressure member 2644 provides pressure on the cartridge 2650 (e.g., on a rim of cartridge 2650) and presses the cartridge 2650 into the cutting portion 2635 of the closure base 2630. The cartridge pressure member 2644 may press the cartridge 2650 into the cartridge receptacle 2634 and the cutting portion 2635 that includes a set of teeth or edges that may cut or pierce the top or the cartridge 2650 when the spout portion 2640 is rotated to the closed position and locked into the closed position. When the spout portion 2640 is rotated to the closed position, the cartridge pressure member 2644 presses the cartridge 2650 into the cutting portion 2635 and may generally cut or pierce the cartridge 2650, thereby releasing the contents of the cartridge 2650 into the container 2610.

The spout portion 2640 may also include a drinking spout 2642. The drinking spout 2642 may be located at the top 2612 of the container 2610. The drinking spout 2642 will line up with the opening or hole 2632 in the closure base 2630 and provide access for a user to drink the final beverage from the container 2610.

The container 2610 may include an overlid 2660. The overlid 2660 may be hingedly attached to the closure base 2630. The overlid 2660 may rotate between an open position (as illustrated in FIGS. 26A and 27A) and a closed position (as illustrated in FIGS. 26B and 27B). The overlid 2660 may include a spout seal 2662 which seals the drinking spout 2642 at the top 2612 of the container 2610 where a user can drink from the container 2610. The spout seal 2662 may include a gasket, o-ring, or grommet or other sealing structures in accordance with this invention. The spout seal 2662 may be made of rubber, plastic, or metal or other materials in accordance with this invention. The overlid 2660 may be transparent or translucent so that a consumer may be able to see inside the overlid 2660 without opening the overlid 2660.

Additionally, the container 2610 may include a cartridge storage compartment 2690. The cartridge storage compartment 2690 may be located at the base 2614 of the container 2610. The cartridge storage compartment 2690 may be utilized for extra cartridge 2650 (pod) storage. As shown in FIGS. 26A and 26B, the cartridge storage compartment 2690 may be sized and shaped to hold two additional cartridges 2650. The cartridge storage compartment 2690 may be sized and shaped to hold various other numbers of cartridges 2650 without departing from this invention. Additionally, the cartridge storage compartment 2690 may include a threaded connection 2692 to the base 2614 of the container 2610. The base 2614 of the container 2610 may include threads 2616 that engage the threads 2692 located on the inside of the cartridge storage compartment 2690. Other connections structures between the container 2610 and the cartridge storage compartment 2690 may be utilized without departing from this invention, such as a hinged connection, a rotating locking connection, or other similar connections known and used in the art. The cartridge storage compartment 2690 may be transparent or translucent so that a consumer may be able to see inside the cartridge storage compartment 2690 without removing the cartridge storage compartment 2690 from the container.

The container 2610 may also include other features or structures as illustrated in FIGS. 26A and 26B. The container 2610 may include a gripping portion 2618 located generally in the middle of the container 2610. The gripping portion 2618 may be a different material or a different surface to help the consumer hold onto the container 2610. The gripping portion 2618 may also include a sleeve that is formed over a portion of the container 2610. The container 2610 may also include a container grip ring 2619. The container grip ring 2619 may provide another means for the consumer to hold or carry the container 2610. The container grip ring 2619 may be located and hinged at the hinged portion 2637 at the same place as the overlid 2660 and the spout portion 2640. The container grip ring 2619 may also include a snap opening feature to open and close the container grip ring 2619.

Figure 28A:
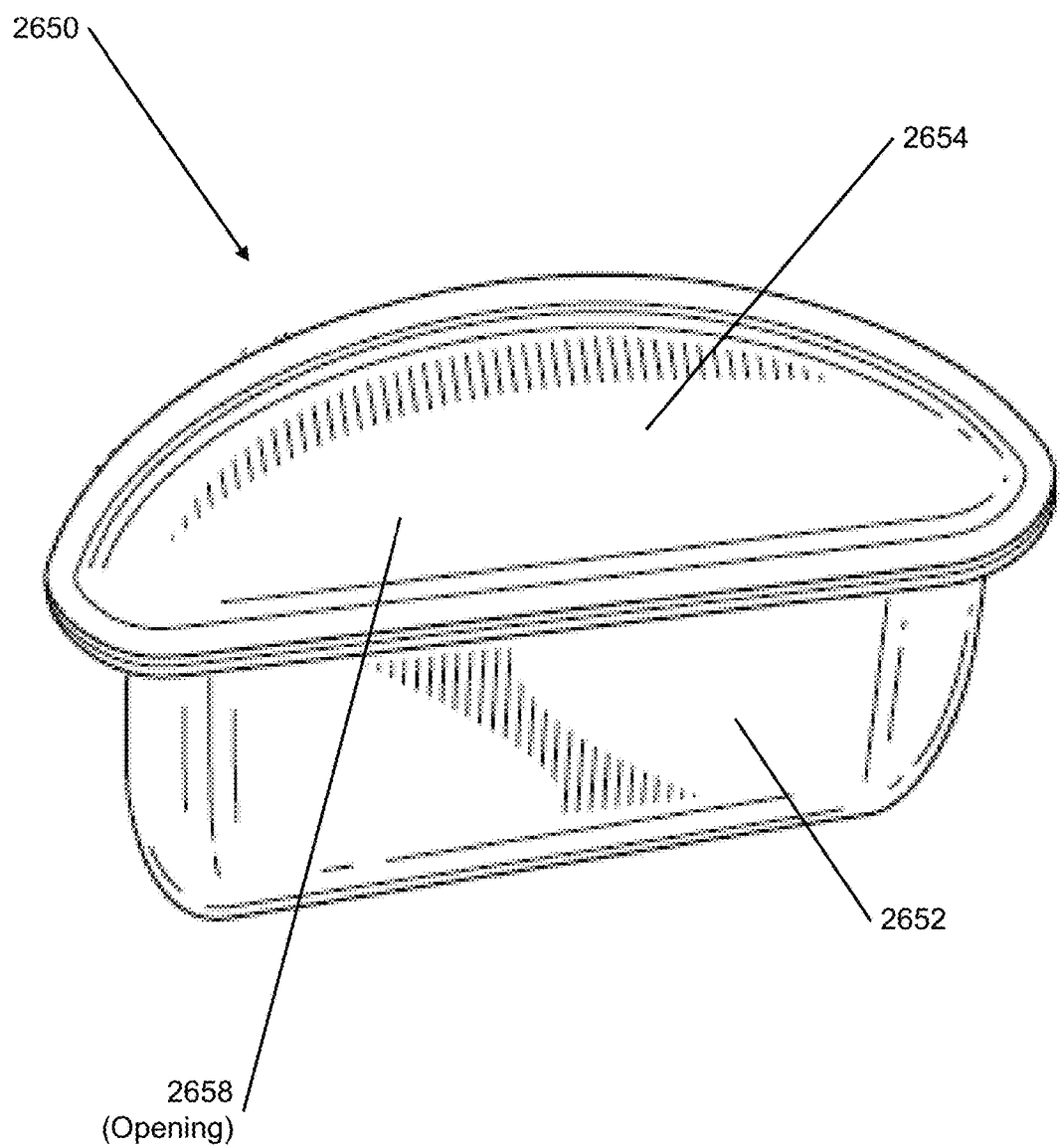
FIG. 28A illustrates an alternative example cartridge to be utilized with the beverage dispensing system in FIGS. 26A and 26B in accordance with the present invention.

The cartridge 2650, as illustrated in FIG. 28, may comprise a chamber 2652 and a cover 2654. The cartridge 2650 is adapted to engage the cartridge receptacle 2634. The cartridge 2650 may hold one or more beverage ingredients, wherein the beverage ingredients may be selected from the list comprising: syrup, paste, powder, granules, or other compositions. Additionally, the cartridge 2650 may hold other ingredients or flavors, such as nutrients or vitamins, herbs, supplements, particulates, gels, fruit flavor base, etc. in accordance with this invention.

The chamber 2652 of the cartridge 2650 is generally a vessel capable of holding a syrup, paste, powder, granules or other compositions. The cartridge 2650 as shown in FIG. 28 may be an oval or circular-shaped structure. The cartridge 2650 may be other shaped structures without departing from this invention. The cover 2654 may be located over an opening 2658 of the chamber 2652. The cover 2654 may be a foil seal located over the opening 2658 of the chamber 2652. The cover 2654 may be attached to the edges of the opening 2658 of the chamber 2652. The cover 2654 may be made of a variety of different materials in accordance with this invention, such as: aluminum and sealing coatings or laminated with sealing polymers like polyethylene, metalized bioriented polypropylene and sealing coatings or laminated with sealing polymers like polyethylene, or metalized polyester and sealing coatings or laminated with sealing polymers like polyethylene.

The construction of the cartridge 2650 allows for various materials (e.g., polypropylene, multilayer structures, aluminum), which can accommodate concentrates that may contain flavored water (cold-filled), iced tea (hot and cold-filled) isotonic drinks (hot-filled), juices (cold- and hot-filled), dairy (retort), and coffee (retort). One way to characterize cartridge 2650's suitability for use with cold-filled and hot-filled drinks is by the temperatures that cartridge 2650 may withstand. In some embodiments, cartridge 2650 may withstand temperatures of up to 95° C. The cartridge 2650 may be made of various materials without departing from this invention. For example, the cartridge 2650 may be made of polyethylene terephthalate (PET). Additionally, the cartridge 2650 may be made of PET in combination (by mixing and/or by using multi-layer structures) with passive barrier materials and/or oxygen scavengers like: plasma-applied coatings of SiOx or amorphous carbon, polyamides, polyglycolic acid, Amosorb™, DiamondClear™, or components of Hyguard™. Additionally, the cartridge 2650 may be made of polypropylene, polyethylene, or polyethylene and polypropylene in combination (by mixing and/or by using multilayer structures) with passive barrier materials and/or oxygen scavengers like: polyamides, ethylene vinyl alcohol. Additionally, the cartridge 2650 may be made of aluminum. Other materials may be used for the cartridge 2650 in accordance with this invention, such that the material alone or in combination with a barrier system protects some beverages or other products that are oxygen sensitive and to avoid excessive loss of water.

Figure 29A:
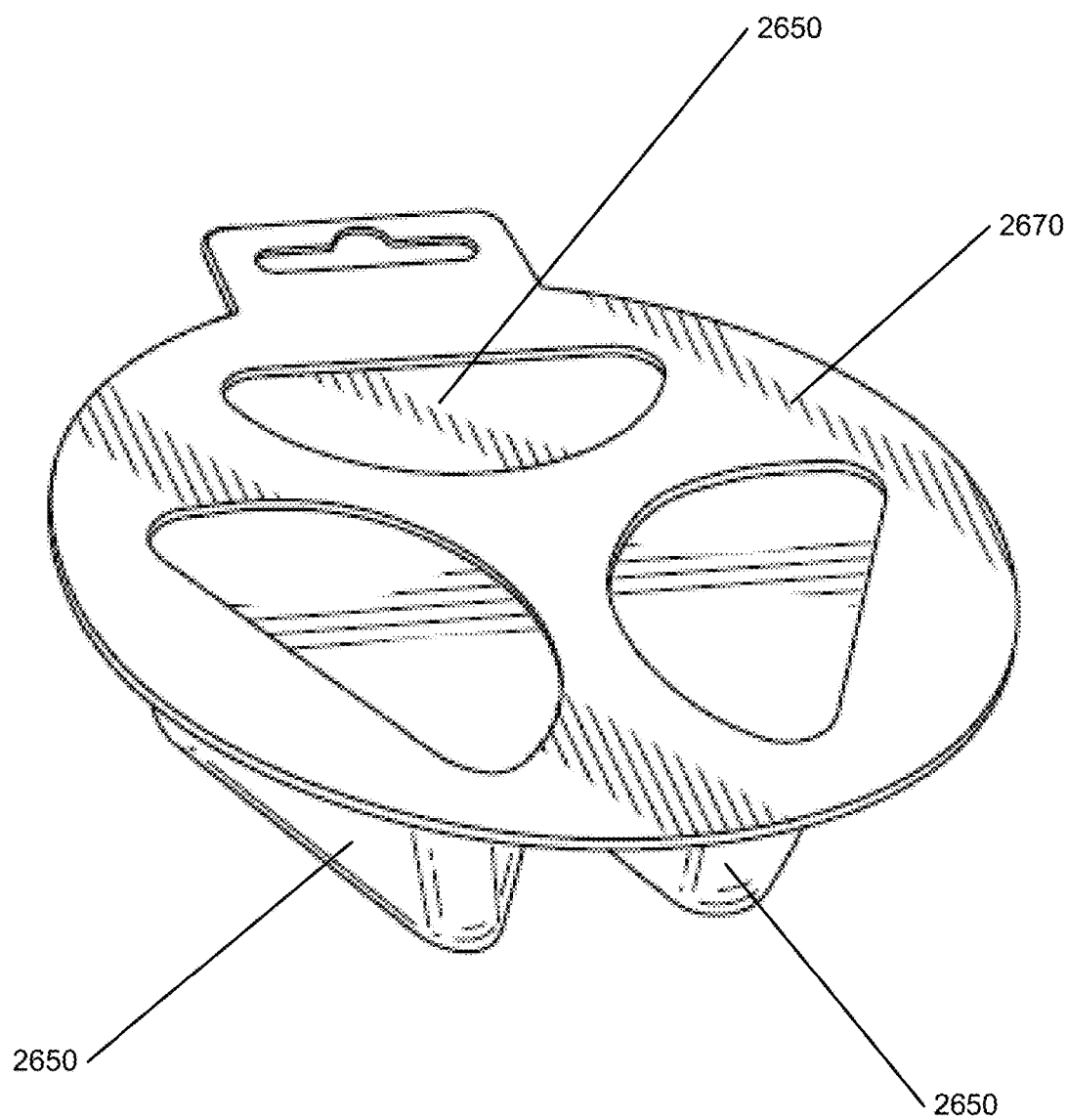
FIGS. 29A, 29B, and 29C illustrate a multi-pack configuration 2670 for a plurality of cartridges 2650 in accordance with the present invention.
Figure 29B:
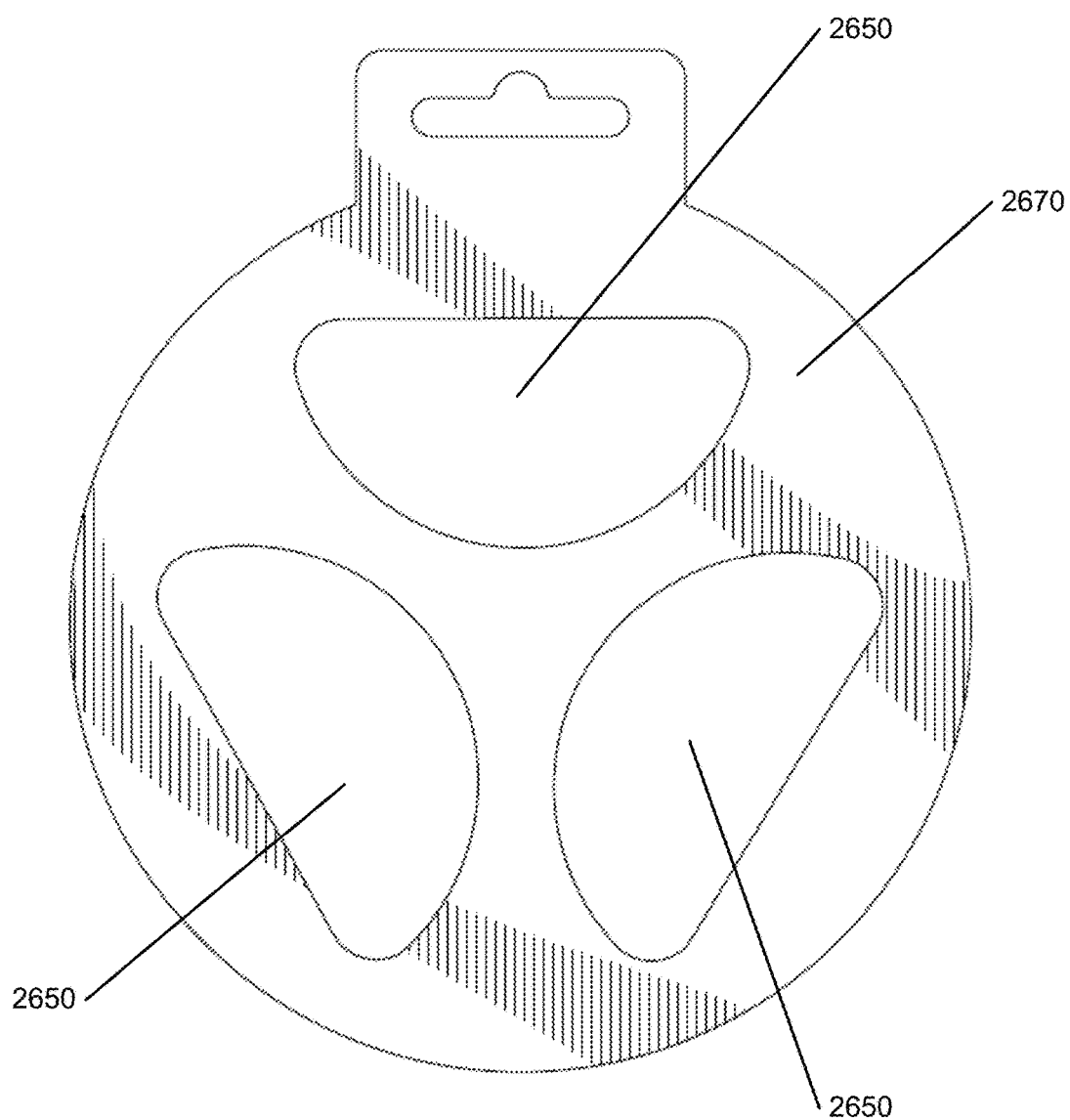
Figure 29C:
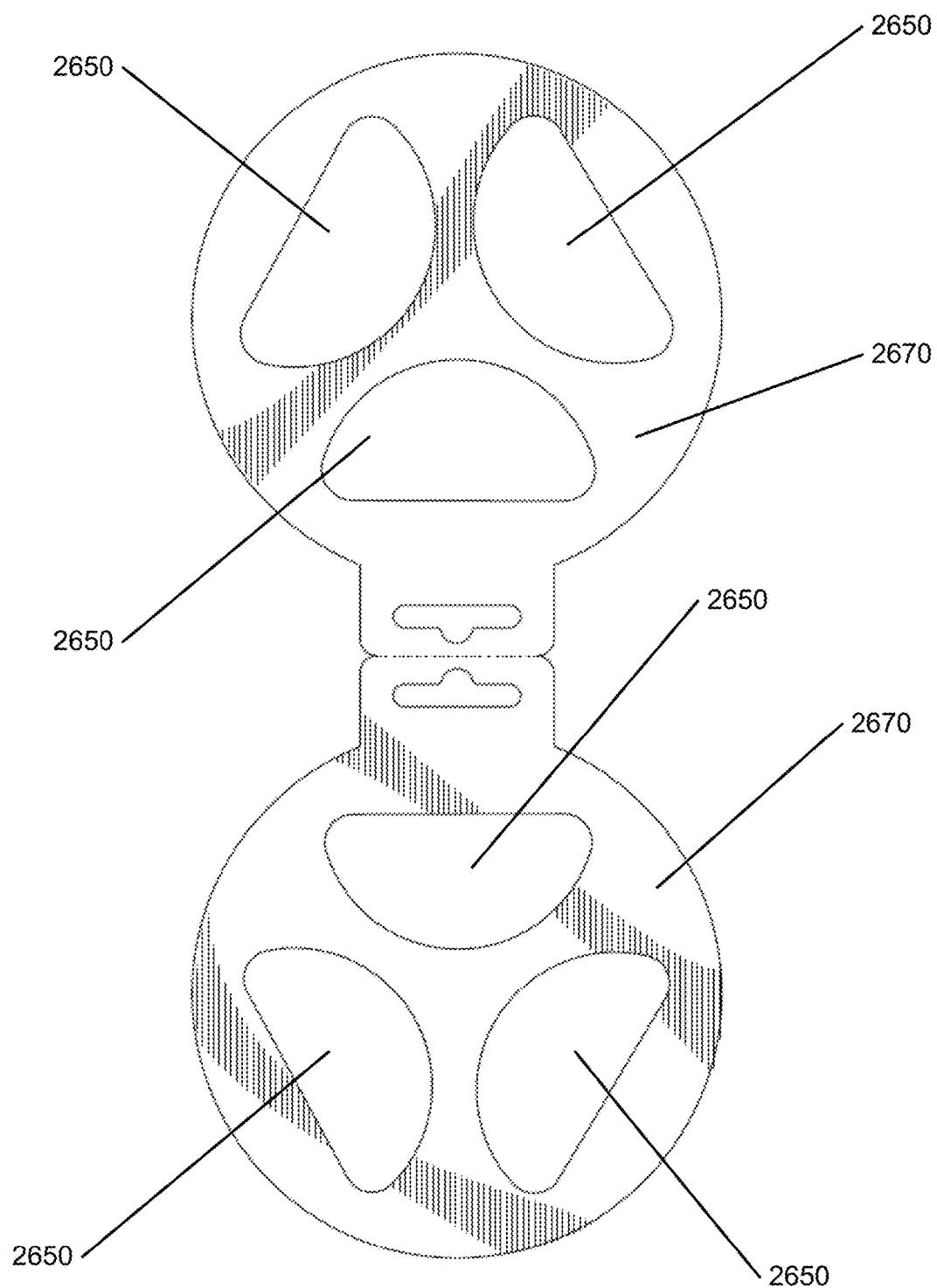

Additionally, FIGS. 29A-29C illustrate a multi-pack configuration 2670 for a plurality of cartridges 2650. As illustrated in FIGS. 29A-29C, the multi-pack configuration 2670 includes three cartridges 2650. The multi-pack configuration 2670 may include other numbers of cartridges 2650 without departing from this invention. The multi-pack configuration 2670 may also include cartridges 2650 of the same or different flavors or beverage ingredients. Each cartridge 2650 may be removed from the multi-pack configuration 2670 with little effort from the consumer. Additionally, as illustrated in FIG. 29C, more than one multi-pack configuration 2670 of cartridges 2650 may be attached together.

The use of the beverage dispenser as illustrated in FIGS. 26A through 29C is simple, construction of the dispenser is simple and easy to clean, and consumers have the option to store extra cartridges 2650 (pods) in the container 2610. The cartridges 2650 (pods) are designed so that packaging would be light weight, simpler construction, and versatility for containing various volumes of liquids and solids (powders, particulates, gels). Consumers can enjoy multiple beverages daily, carrying a lighter load of pods and the vessel. This solution is for the consumers who have active lifestyles, "on-the-go", need daily hydration/supplements/vitamins, and would enjoy making their own beverage. This solution allows the consumer to make multiple options to make their beverages and customize by dosing supplements, vitamins, particulates, etc. Depending on the consumer's preference, various combinations of cartridges 2650 could be used with a single serving (e.g. beverage concentrate with vitamin supplements, iced tea beverage concentrates with juice concentrate, etc.).

The features/improvements of the beverage dispensing system as illustrated in FIGS. 26A through 29C are the simple dispensing mechanism (easy to use, easy to clean), a storage compartment 2690 for cartridges 2650 within the container 2610, and lightweight cartridge 2650 construction that can contain various beverages and ingredients. Consumers may also have the option to dose their vessels with cartridges 2650 that contain supplements and vitamins.

FIGS. 30A through 32 depict embodiments of a beverage dispensing system that are similar to the embodiments described above in conjunction with FIGS. 26A through 29C. Similar reference numbers are used in FIGS. 30A through 32 as those used in 26A through 29C to denote the same or similar parts.

FIGS. 30A through 32 depict beverage dispensing system 3000. As illustrated in FIG. 30A, beverage dispensing system 3000 includes a container 3010 with an attachment mechanism 3020 and a cartridge storage compartment 3090. Beverage dispensing system 3000 may also include a holding portion 3070 that is used by a user for transporting beverage dispensing system 3000. In some embodiments, and as shown in FIG. 30A, holding portion 3070 may be a flexible plastic hook that is rotatable around the circumference of container 3010. In other embodiments, holding portion 3070 may have structures such as those represented by 3370 in FIG. 33A, 3670 in FIG. 36A, and by 3770 in FIG. 37A. Beverage dispensing system may also include gripping portion 3018 that is similar to gripping portion 2618 as described above in relation to FIG. 26A. In other embodiments, gripping portion 3018 may have structures such as those represented by 3318 in FIG. 33A, 3618 in FIG. 36A, and by 3718 in FIG. 37A.

As shown in FIGS. 30A, 30B, and 32, attachment mechanism 3020 includes a closure base 3030, a drinking spout 3042, a cartridge pressure member 3044, and a spout cap 3063. Spout cap 3063 may be attached to attachment mechanism 3020 in a rotatable manner between an open position (to allow access of drinking spout 3042) and a closed position (to cover drinking spout 3042). In some embodiments, spout cap 3063 is attached to cartridge pressure member 3044 through attachment member 3066. In some embodiments attachment member 3066 may be a flexible hinge, as shown in FIGS. 30A and 31B. In some embodiments, the hinge may be made of silicone. However, other attachment methods and materials are also envisioned. FIGS. 30A, 30B, and 32 show spout cap 3063 in a closed position. FIGS. 31A and 31B show spout cap 3063 in an open position.

In some embodiments, and as shown in FIG. 32, spout cap 3063 has at least one structural feature A that corresponds to a complementary structural feature B on pressure member 3044. The interaction of structural feature A with structural feature B retains spout cap 3063 in the open position by allowing spout cap 3063 to be pressed fit into cartridge pressure member 3044. This is shown in FIG. 31B.

Closure base 3030 may also include a cartridge receptacle 3034, as shown in FIG. 32. The cartridge receptacle 3034 may be sized and shaped to receive and hold a cartridge 3050. Cartridge 3050 may be set or placed into cartridge receptacle 3034 with a top portion of cartridge 3050 facing downward towards the container 3010. Generally, cartridge 3050 comprises a rigid body, an opening, and a pierceable cover 3054. As will be discussed later, the rigidity of cartridge body may help in the opening of cartridge 3050. Other portions of this disclosure pertaining to cartridges may also be applied to cartridge 3050.

Cartridge pressure member 3044 is hingedly attached to closure base 3030 through hinge 3044A so that cartridge pressure member 3044 is rotatable between an open position and a closed position. FIGS. 30A, 30B, 31A, and 31B show cartridge pressure member 3044 in the closed position. FIG. 32 shows cartridge pressure member 3044 in the open position. In some embodiments, and as shown in FIG. 32, cartridge pressure member 3044 covers only a portion of closure base 3030 in its closed position, mainly the portion where receptacle 3034 is located.

Locking member or locking portion 3038 may be used to retain cartridge pressure member 3044 in the closed position. In some embodiments, and as shown in FIG. 31A, locking member or locking portion 3038 is a snap closure. In other embodiments, locking member or locking portion maybe a bale closure, as shown in FIG. 33A. Additionally, other locking structures are envisioned. Locking member or locking portion 3038 helps retain cartridge 3050 in receptacle 3034 during the usage of beverage dispensing system 3000.

Figure 38A:
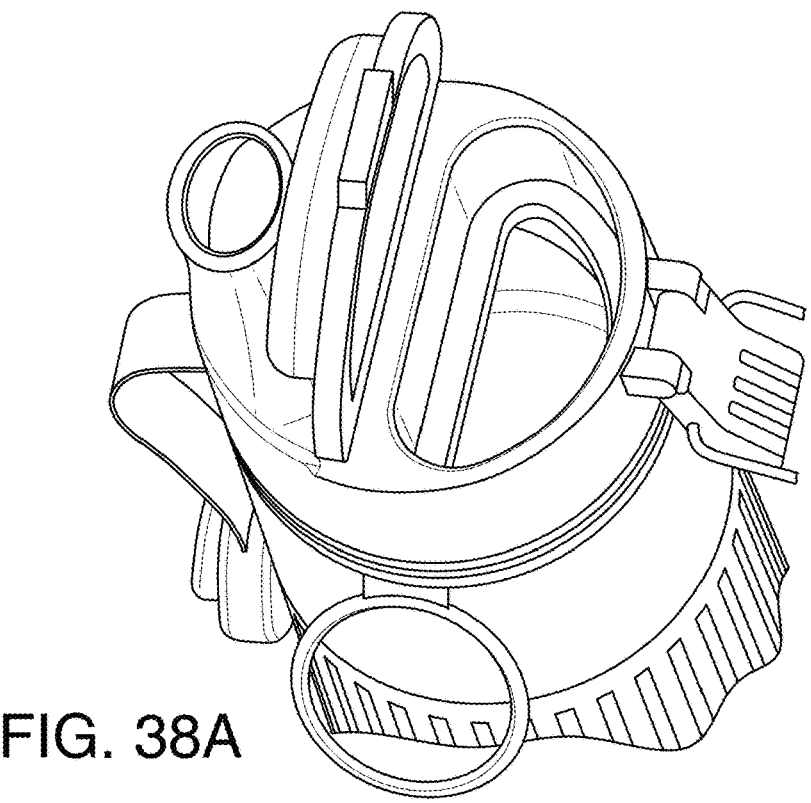
FIG. 38A illustrates a perspective view of a beverage dispensing system in accordance with the present invention.
Figure 38B:
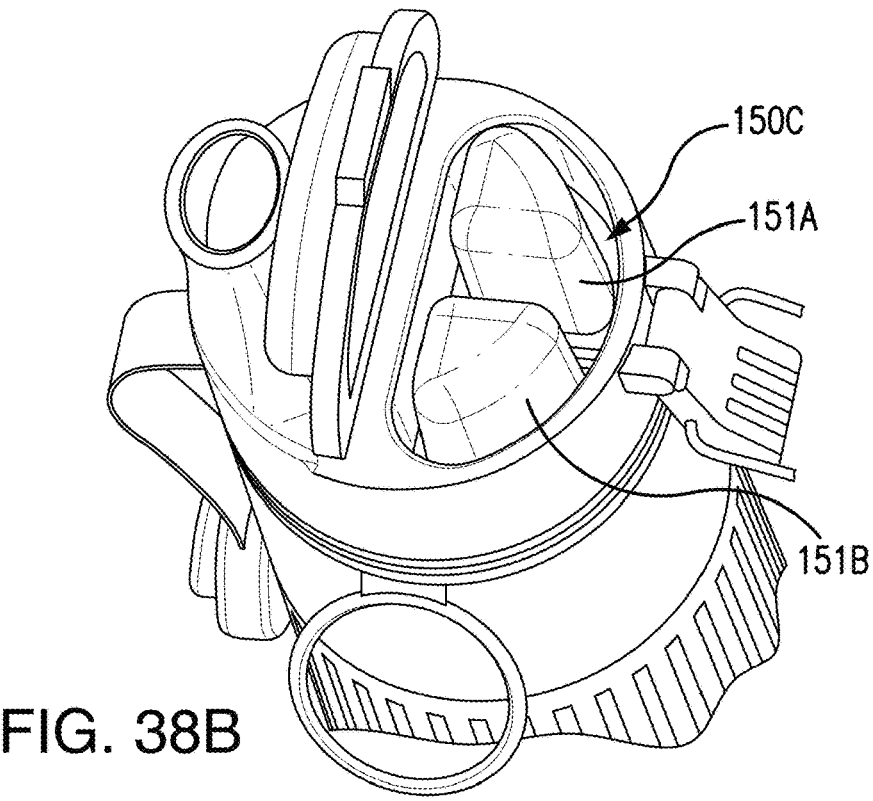
FIG. 38B illustrates the beverage dispensing system shown in FIG. 38A with a cartridge.

As shown in FIG. 32, cartridge receptacle 3034 may include a cutting portion 3035 that includes a set of teeth or edges to cut or pierce the top of cartridge 3050. In some embodiments, cutting portion 3035 may be shaped to follow the circumference of cartridge cover 3054 so that when cutting portion 3035 pierces cover 3054 more than half of the circumference of cover 3054 is cut (e.g. almost the entire circumference). In other embodiments, cutting portion 3035 may be located at distinct locations around the circumference of cartridge cover 3054. For example, and, as will be described in further detail in relation to FIGS. 38-40, cutting portion may comprise two or more cutting portions that are disconnected from each other.

Beverage dispensing system 3000 may be a "two-step" opening system. This is unlike some "one-step" embodiments disclosed herein, where closing of cartridge pressure member causes the cutting portion to open the cartridge. In beverage dispensing system 3000, cartridge 3050 is not opened upon the closing of cartridge pressure member 3044. Rather, the opening of cartridge 3050 occurs in two steps, due to a dome portion 3055.

As shown in FIGS. 30A, 30B, 301A, 31B, and 32, dome portion 3055 is attached to cartridge pressure member 3044 such that dome portion 3055 covers cartridge 3050 when cartridge pressure member 3044 is in the closed position.

Dome portion 3055 may be comprised of a compressible material such that it is movable between a first position and a second position upon an externally applied pressure. In some embodiments, the material is silicone. However, other materials having similar characteristics are also envisioned.

When an externally applied pressure is applied to dome portion 3055, dome portion 3055 moves from the first position (e.g., in its un-compressed state) to the second position (e.g., in its compressed state). The pressure applied to dome portion 3055 is then transferred to cartridge 3050 through contact between dome portion 3055 and cartridge 3050. Because the body of cartridge 3050 is comprised of a material that is sufficiently rigid, the externally applied pressure causes the cartridge to move down towards container 3010, so that cover 3054 of cartridge 3050 is cut by cutting portion 3035. One way to characterize the rigidity of body of cartridge 3050 is by the vertical force that body of cartridge 3050 may withstand. In some embodiments, the body may withstand a vertical force that is equal to or greater than the force required to break the cartridge cover 3054. Some non-limiting materials that provide sufficient rigidity are polypropylene (PP), high-density polyethylene (HDPE), and polyethylene terephthalate (PET).

Figure 35:
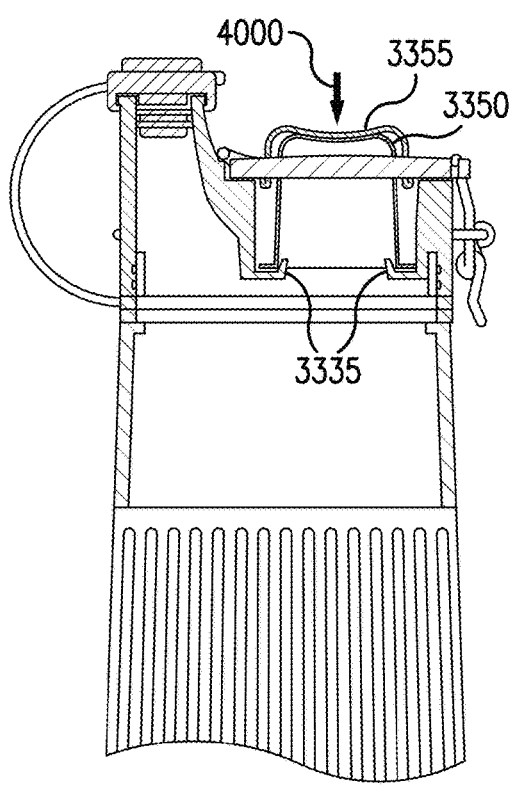
FIG. 35 illustrates another partial cross sectional view of the beverage dispensing system shown in FIG. 33A.

The cutting portion 3035 may generally cut or pierce the cartridge 3050, thereby releasing the contents of the cartridge 3050 into the container 3010. This cartridge opening mechanism may be described as a "two-step" process. In other words, the "first step" of the opening mechanism may be the closure of cartridge pressure member 3044. This is illustrated in FIGS. 32 and 30A. The "second step" may be the movement of dome portion 3055 from a first position to a second position. This is illustrated in FIG. 35, with externally applied pressure 4000. Dome portion 3055 may also be moveable from the second position back to the first position (e.g., it may move back to the first position automatically due to a natural material bias toward its shape in the first position) such that dispensing system 3000 may be repeatedly used.

Dome portion 3055 allows for beverage dispensing system 3000 to be used without cartridge 3050. For example, dome portion 3055 may cover receptacle 3034 when the user wishes to use beverage dispensing system 3000 to drink water. Additionally, while beverage dispensing system 3000 may use a "two-step" cartridge opening process, beverage dispensing system 3000 may also use a "one-step" cartridge opening process, which is described in more detail herein.

Figure 34:
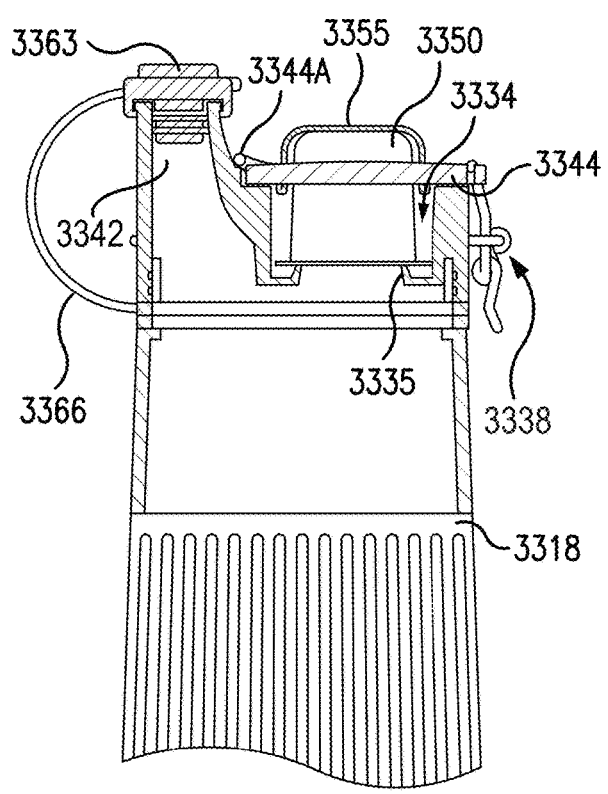
FIG. 34 illustrates a partial cross sectional view of the beverage dispensing system shown in FIG. 33A.

While dome portion 3055 is shown in FIG. 30A as being spaced apart from cartridge 3050 in the first position and directly contacting cartridge 3050 only when in the second position, in some embodiments dome portion may directly contact cartridge 3050 in the first position. This is shown in FIGS. 33A and 34. In embodiments where dome portion 3055 directly contacts cartridge 3050 in the first position, the opening of cartridge 3050 still occurs upon the movement of dome portion from the first position to the second position. This is described in further detail in relation to FIGS. 34 and 35.

Additionally, while dome portion 3055 is shown in the figures as being located or directly attached to cartridge pressure member 3044, in some embodiments, dome portion 3055 may be attached to other portions of attachment mechanism 3020. For example, dome portion 3055 may be directly attached to closure base 3030.

FIGS. 33A through 35 depict embodiments of a beverage dispensing system that are similar to the embodiments described above in conjunction with FIGS. 30A through 32. Similar reference numbers are used in FIGS. 33A through 35 as those used in FIGS. 30A to 32 to denote the same or similar parts.

FIGS. 33A through 35 illustrate beverage dispensing system 3300. Beverage dispensing system 3300 is similar to beverage dispensing system 3000 except for its spout cap 3363, gripping portion 3318, locking portion 3338, and dome portion 3355.

As shown in FIGS. 33A and 33B, spout cap 3363 is different from spout cap 3063 in that spout cap 3363 comprises a portion that extends into drinking spout 3342. In some embodiments, this portion comprises a double gasket. Additionally, spout cap 3363 differs from spout cap 3063 in that spout cap 3363 is not directly attached to cartridge pressure member 3344 like spout cap 3063. Rather, spout cap 3363 is directly attached to container 3310 through attachment member 3366. Additionally, as shown in FIG. 33B, spout cap 3363 may comprise raised features 3363A on its top side. Raised features 3363A are complementary to slots present in gripping portion 3318. The interaction of raised features 3363A and slots in gripping portion 3318 retain spout cap 3363 in the open position, as represented by the dotted lines in FIG. 33A.

As seen in FIG. 34, locking portion or locking member 3338 is different from locking portion or locking member 3038 because locking portion or locking member 3338 is a bale closure rather than a snap closure. Additionally, dome portion 3355 is different from dome portion 3055 because dome portion 3355 directly contacts cartridge 3350 when in the first position. This is shown in FIG. 34.

Even though dome portion 3355 directly contacts cartridge 3350 in the first position, the opening of cartridge 3350 still occurs upon the movement of dome portion 3355 from the first position to the second position. Thus, the opening of cartridge 3350 in beverage dispensing system 3300 is similar to the opening of cartridge 3050 in beverage dispensing system 3000. This is shown in FIGS. 34-35.

Figures 36A, 36B:
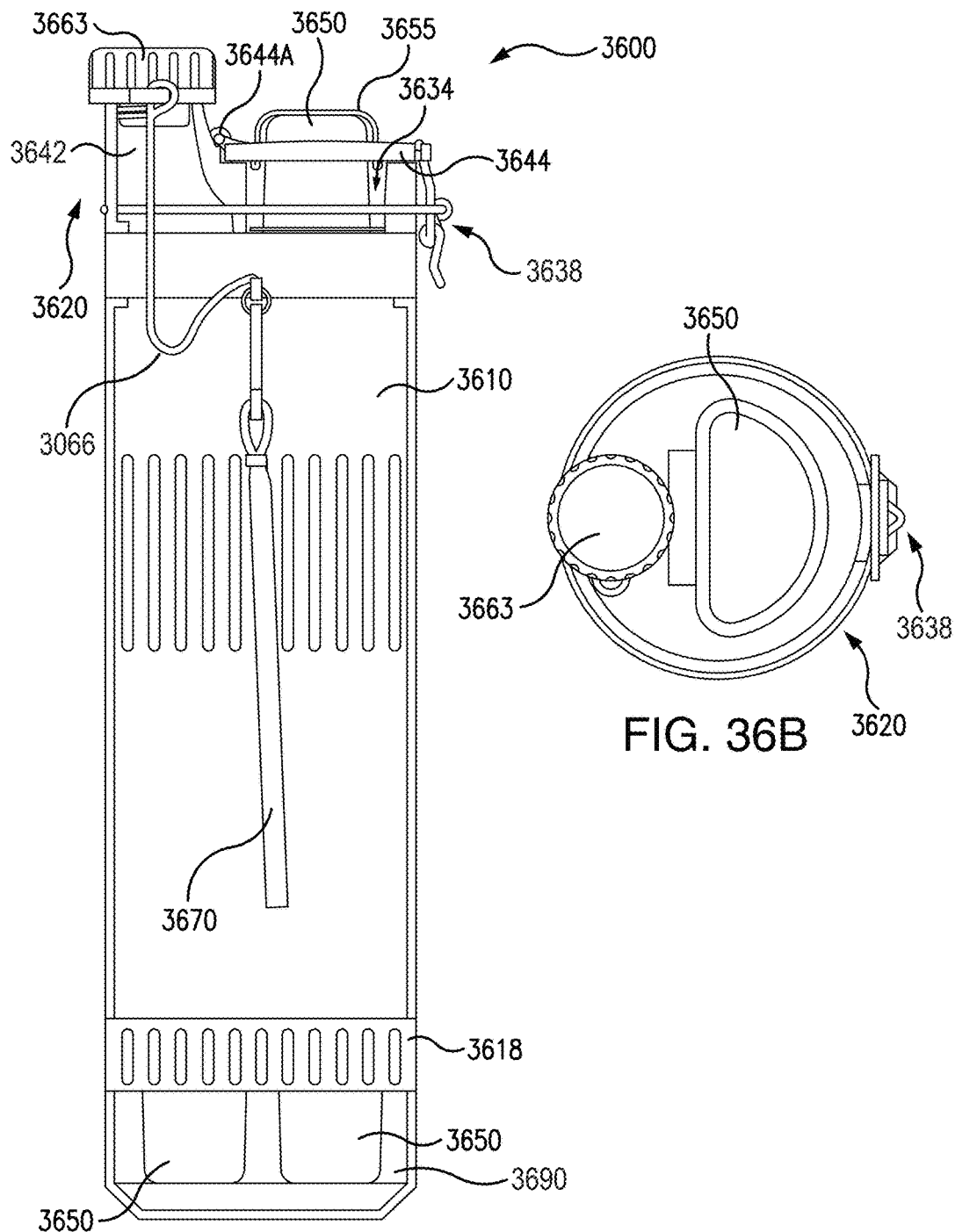
FIG. 36A illustrates a side view of a beverage dispensing system in accordance with the present invention.
FIG. 36B illustrates a top view of the beverage dispensing system shown in FIG. 36A.

FIGS. 36A through 36B depict embodiments of a beverage dispensing system that are similar to the embodiments described above in conjunction with FIGS. 30A through 32 and FIGS. 33A through 35. Similar reference numbers are used in FIGS. 36A through 36B as those used in FIGS. 30A to 32 and FIGS. 33A through 35 to denote the same or similar parts.

FIGS. 36A through 36B illustrate beverage dispensing system 3600. Beverage dispensing system 3600 is similar to beverage dispensing systems 3000 and 3300 except for its spout cap 3663, container 3610, and holding portion 3670.

As shown in FIGS. 36A and 36B, spout cap 3663 may include threads such that it twists off from drinking spout 3642. In some embodiments, spout cap 3663 is comprised of silicone. Spout cap 3663 is attached to container 3610 through attachment member 3666. As shown in FIG. 36A, holding portion 3070 may comprise a loop attached to container 3610 such that the loop is rotatable around the circumference of container 3610. In some embodiments, the loop may be comprised of nylon. However, other suitable materials are also envisioned.

As shown in FIG. 36A, container 3610 may comprise a silicone dome body. The opening of cartridge 3650 in beverage dispensing system 3600 is also a "two-step" process, similar to the manner that cartridges 3050 and 3350 are opened in beverage dispensing systems 3000 and 3300, respectively.

Figures 37A, 37B:
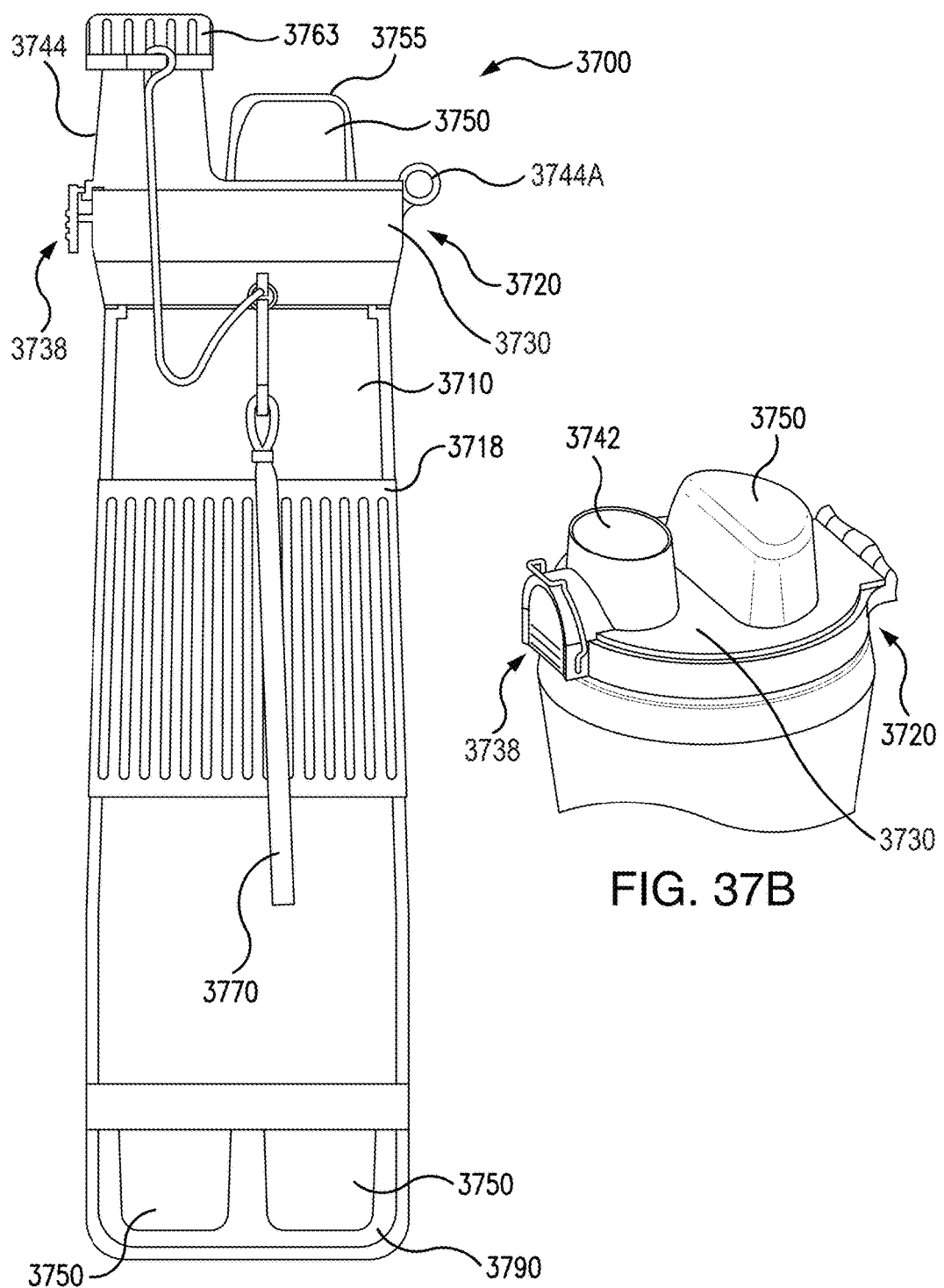
FIG. 37A illustrates a side view of a beverage dispensing system in accordance with the present invention.
FIG. 37B illustrates a perspective view of the beverage dispensing system shown in FIG. 37A.

FIGS. 37A-37B depict embodiments of a beverage dispensing system according to this invention similar to embodiments described in relation to FIGS. 30A through 32, FIGS. 33A through 35, and FIGS. 36A-36B. Similar reference numbers are used in FIGS. 37A through 37B as those used in FIGS. 30A to 32 to denote the same or similar parts.

FIGS. 37A through 37b illustrate beverage dispensing system 3700. Beverage dispensing system 3700 is similar to beverage dispensing systems 3000 and 3300 except that cartridge pressure member 3744 covers the entirety of closure base 3730 when closure base 3730 is in the closed position. In other words, when cartridge pressure member 3744 is in the closed position, cartridge pressure member 3744 covers drinking spout 3742 and cartridge 3750. FIG. 37A shows cartridge pressure member 3744 in a closed position. FIG. 37B shows cartridge pressure member in an open position, where drinking spout 3742, closure base 3730, and cartridge 3750 are visible. The opening of cartridge 3750 in beverage dispensing system 3700 is also a "two-step" process, similar to the two-step opening process of cartridges 3050 and 3350 in beverage dispensing systems 3000 and 3300, respectively.

Figure 39:
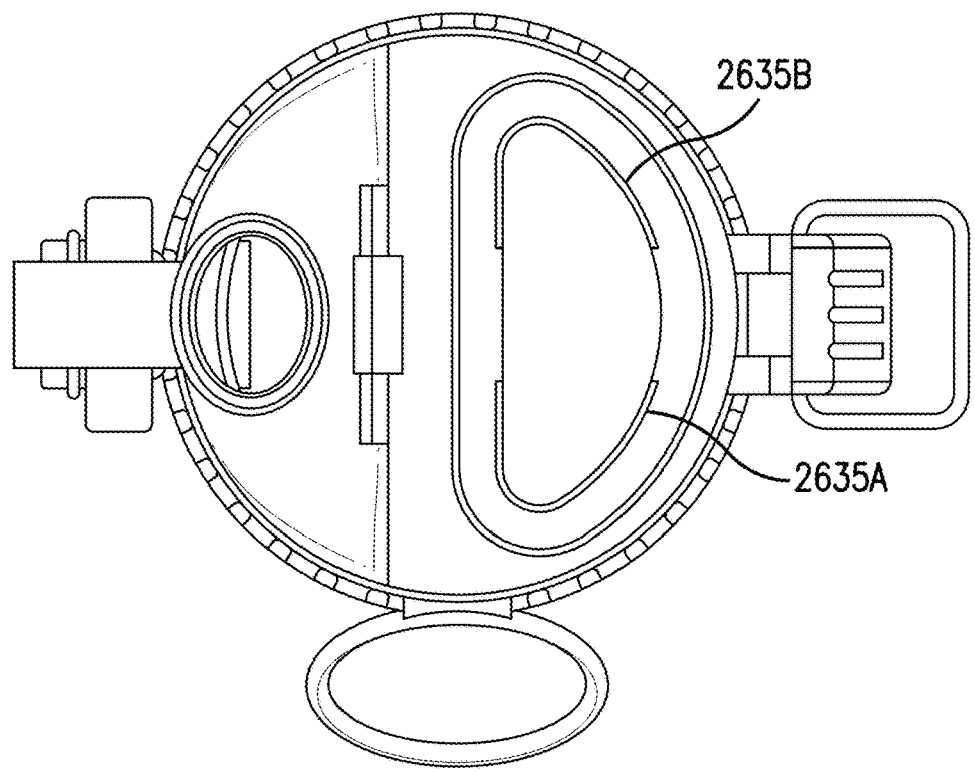
FIG. 39 illustrates a top view of the beverage dispensing system shown in FIG. 38A.
Figure 40:
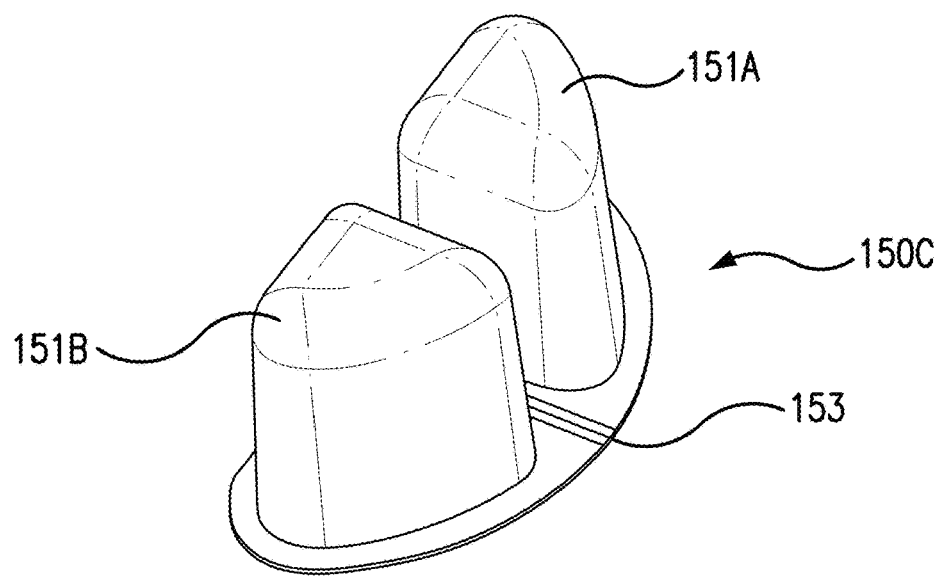
FIG. 40 illustrates an example cartridge in accordance with the present invention.

While cartridges 3050, 3350, 3650, and 3750 are illustrated as cartridges with one chamber defined by a single body, cartridges with multiple chambers may also be used. FIGS. 38A, 38B, 39, and 40 show the usage of a cartridge 150C with two chambers. As seen in FIG. 40, cartridge 150C comprises two different chambers, 151A and 151B. Each chamber 151A and 151B is defined by its own rigid body, own opening, and own pierceable cover. Additionally, cartridge 150C has a flange 153 located between the two chambers, allowing the cartridge to flex when one chamber is opened. This allows one chamber to move down towards a cutting portion and the other chamber to remain stationary.

In use, the two chambers 151A and 151B may be opened simultaneously or at different times. In some embodiments, cartridge 150C may be used with a beverage dispensing system with two cutting portions, as illustrated in FIG. 39. A first cutting portion 2635A may be used to cut and open chamber 151A and a second cutting portion 2635B may be used to cut and open chamber 151B. Two cutting portions may be desirable when the contents of the chambers 151A and 151B are to be added to the container at different times. For example, an external pressure may be applied on the dome portion such that only chamber 151A is moved down towards the cutting portion.

While specific configurations and features have been described in relation to specific figures and embodiments, it is envisioned that any feature described in relation to a specific embodiment or figure may be used in another embodiment or figure. For example, spout cap 3663 and attachment member 3666 may be used in beverage dispensing system 3000 in place of spout cap 3063 and attachment member (hinge) 3066.

Additionally, while the embodiments in FIGS. 30A through 40 have been described as a "two-step" cartridge opening process, the cartridges in these systems may also be opened with a "one-step" process. For example, the dome portions 3055, 3355, 3655, and 3755 may be configured such that upon closing of cartridge pressure members 3044, 3344, 3644, and 3744, the dome portions engage the cartridges 3050, 3350, 3650, and 3750 to push their respective openings against the cutting portions.

In the one-step process, dome portions 3055, 3355, 3655, and 3755, instead of being comprised of a compressible material like silicone, may be comprised of a rigid material. Non-limiting materials include polyethylene terephthalate (PET) and polypropylene (PP). With the one-step process, an externally applied pressure on the dome portion is not needed. Rather, the closing of the cartridge pressure member allows the dome portion to contact the cartridge and move the cartridge down towards the cutting portion. This may be achieved by an offset between the height of the cartridge and the height of the dome portion such that the height of the dome portion when the cartridge pressure member is closed is shorter than the height of the cartridge when the cartridge is placed in the receptacle.

In the one-step process, the rigidity of the body of cartridges 3050, 3350, 3650, and 3750 should be sufficiently rigid to withstand a vertical force that is equal to or greater than the force that opens the cartridge cover.

Described below is a detailed description of additional aspects of this invention, specifically a method of producing a beverage using a beverage dispensing system. Additional aspects of this disclosure relate to methods of producing a beverage using a beverage dispensing system in accordance with examples of this disclosure. Such methods may include, for example, one or more of the following steps in any desired order and/or combinations: (a) inserting a cartridge into a container, (b) rotating or positioning the cartridge into location within an attachment mechanism; (c) pressing on the cartridge thereby engaging the cartridge with the engagement assembly, releasing the valve assembly, and piercing the foil seal with the piercing portion; (d) mixing the contents of the container, (e) drinking the beverage from the container; and (f) releasing the cartridge from the container.

This application incorporates by reference U.S. Non-Provisional application, U.S. Ser. No. 14/256,735, filed Apr. 18, 2014, U.S. Non-Provisional application, U.S. Ser. No. 12/550,101, filed Aug. 28, 2009, U.S. Ser. No. 61/093,090, filed Aug. 29, 2008, and Provisional Application, U.S. Ser. No. 61/146,156, filed Jan. 21, 2009.

It is to be understood that the invention is not limited in its application to the details of construction and the arrangement of the components set forth herein. The invention is capable of other embodiments and of being practiced or being carried out in various ways. Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A beverage dispensing system comprising:
   a container;
   an attachment mechanism coupled to the container, the attachment mechanism comprising a receptacle, a cutting portion, and a cartridge pressure member, wherein the cartridge pressure member is rotatable between an open position and a closed position over the receptacle, and wherein the cartridge pressure member comprises a drinking spout; and
   a removable cartridge adapted to engage the attachment mechanism at the receptacle, the cartridge comprising a chamber, an opening, and a pierceable cover located over the opening of the cartridge,
   wherein in the closed position, the cartridge extends through the cartridge pressure member via an opening of the cartridge pressure member, and the cartridge pressure member pushes the cover against the cutting portion, thereby opening the cartridge and dispensing contents of the cartridge into the container, and
   wherein in the open position the cartridge is removable from the receptacle and replaceable with a different cartridge.

2. The system of claim 1, wherein the cartridge holds one or more beverage ingredients.

3. The system of claim 2, wherein the one or more beverage ingredients includes syrup, paste, powder, or granules.

4. The system of claim 2, wherein the one or more beverage ingredients includes nutrients, vitamins, herbs, supplements, particulates, gels, or fruit flavor bases.

5. The system of claim 1, wherein the cartridge comprises at least two chambers, and each chamber holds different beverage ingredients.

6. The system of claim 2, wherein the receptacle comprises a seal configured to prevent leaking of the one or more beverage ingredients from the system when the cartridge is opened.

7. The system of claim 1, wherein the cutting portion is configured to pierce the cover when the cover is pushed against the cutting portion.

8. The system of claim 1, wherein the cartridge pressure member is disposed on a spout portion that comprises a spout, and wherein the spout aligns with an opening of the container when the cartridge pressure member is in the closed position.

9. The system of claim 1, wherein the cartridge pressure member comprises a silicone dome.

10. The system of claim 1, wherein the cartridge pressure member engages a rim of the cartridge to push the cover against the cutting portion.

11. The system of claim 1, further comprising an overlid that, when closed, covers the attachment mechanism,
    wherein the overlid, the cartridge pressure member, and the receptacle are movable with respect to each other and are attached together at the same hinged connection.

12. The system of claim 1, wherein the cutting portion remains stationary relative to the container while the cartridge pressure member rotates between the open position and the closed position.

13. The system of claim 1, wherein the cartridge contains only beverage ingredients.

14. A beverage dispensing system comprising:
    a container;
    an attachment mechanism coupled to the container, the attachment mechanism comprising:
       a receptacle configured to receive a removable cartridge;
       a cutting portion disposed at a base of the receptacle; and
       a cartridge pressure member comprising a dome portion, wherein the cartridge pressure member is rotatable at a hinge between an open position and a closed position, wherein the dome portion is configured to deform between a first position and a second position to push a removable cartridge in the receptacle down against the cutting portion, to thereby open the cartridge, and wherein at least a portion of the dome is closer to the cutting portion in the second position than in the first position, when the cartridge pressure member is in the closed position.

15. The beverage dispensing system of claim 14, further comprising:
   the cartridge, wherein the cartridge comprises:
      a first chamber defined by a rigid body;
      an opening of the first chamber; and
      a pierceable cover located over the opening of the first chamber,
   wherein, in transitioning between the first position and the second position, the dome portion pushes the cover against the cutting portion, thereby causing the cutting portion to break through the cover, opening the first chamber and dispensing contents of the first chamber into the container.

16. The beverage dispensing system of claim 15, wherein in the first position, the dome portion is spaced apart from the rigid body, and wherein in the second position, the dome portion directly contacts the rigid body.

17. The beverage dispensing system of claim 15, wherein the cartridge further comprises:
   a second chamber defined by a rigid body;
   an opening of the second chamber; and
   a pierceable cover located over the opening of the second chamber,
   wherein the cutting portion comprises a first cutting portion and a second cutting portion, and
   wherein in transitioning between the first position and the second position, the dome portion simultaneously engages the rigid bodies of the first chamber and of the second chamber and simultaneously pushes the opening of the first chamber against the first cutting portion and the opening of the second chamber against the second cutting portion, thereby simultaneously opening the first chamber and the second chamber and dispensing contents of the first and second chambers into the container.

18. The beverage dispensing system of claim 17, wherein the cartridge comprises a flexible flange between the first chamber and the second chamber.

19. The beverage dispensing system of claim 14, wherein the beverage dispensing system can dispense its contents while a cartridge is received within the receptacle.

20. The beverage dispensing system of claim 14, wherein the dome portion is configured to deform between the first position and the second position when the cartridge pressure member is in the closed position.

21. The beverage dispensing system of claim 14, wherein the dome portion comprises silicone.

22. The beverage dispensing system of claim 14, wherein the dome portion deforms from the first position to the second position upon an externally applied pressure to the dome portion.

23. The beverage dispensing system of claim 14, wherein the dome portion is flexible.

24. The system of claim 14, wherein the cartridge pressure member comprises a drinking spout.

25. The system of claim 14, wherein the cutting portion remains stationary relative to the container while the dome portion deforms between the first position and the second position.

* * * * *